(12) United States Patent
Fedoruk et al.

(10) Patent No.: US 12,493,473 B1
(45) Date of Patent: Dec. 9, 2025

(54) AUTOMATED TOOL DISCOVERY AND INGESTION FOR ARTIFICIAL INTELLIGENCE AGENTS

(71) Applicant: Airia LLC, Alpharetta, GA (US)

(72) Inventors: Roman Fedoruk, Cumming, GA (US);
John Manton, Alpharetta, GA (US);
Spencer Reagan, Marietta, GA (US);
Gregory Roberts, Dunwoody, GA (US); Erich Stuntebeck, Johns Creek, GA (US)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 19/234,232

(22) Filed: Jun. 10, 2025

Related U.S. Application Data

(60) Provisional application No. 63/658,434, filed on Jun. 10, 2024.

(51) Int. Cl.
  *G06F 21/12* (2013.01)
  *G06F 9/445* (2018.01)

(52) U.S. Cl.
  CPC ............ *G06F 9/445* (2013.01); *G06F 21/121* (2013.01)

(58) Field of Classification Search
  CPC ......... G06F 9/445; G06F 21/121; G06F 21/12
  See application file for complete search history.

(56) References Cited

U.S. PATENT DOCUMENTS

| | | | |
|---|---|---|---|
| 9,495,133 B1 | 11/2016 | Righi et al. | |
| 10,009,375 B1 * | 6/2018 | Sites | ................... H04L 63/1483 |
| 11,616,801 B2 * | 3/2023 | Sjouwerman | ....... H04W 12/122 |
| | | | 726/25 |
| 11,748,634 B1 | 9/2023 | Kulkarni et al. | |
| 12,021,888 B1 | 6/2024 | Reed et al. | |
| 12,277,245 B1 * | 4/2025 | Morgan | .................. G06F 40/30 |
| 12,282,719 B1 | 4/2025 | Fedoruk et al. | |

(Continued)

FOREIGN PATENT DOCUMENTS

| CN | 115374515 A | 11/2022 |
|---|---|---|
| WO | 2019053488 A1 | 3/2019 |

OTHER PUBLICATIONS

Desfeux et al., Identification of a Series of Compatible Components using Artificial Intelligence, 2019, World Intellectual PropertyOrganization Patent Cooperation Treaty (PCT), pp. 1-34 (Year: 2019).

(Continued)

*Primary Examiner* — Jayesh M Jhaveri
(74) *Attorney, Agent, or Firm* — Clayton, McKay & Bailey, PC

(57) ABSTRACT

Systems and methods are described for tool discovery and ingestion for artificial intelligence ("AI") agents. An AI platform can discover a first tool specification that includes an action and a description. The first tool specification is ingested to create a first tool object. The first tool object includes the action and an endpoint. Tool labels are determined from the specification and applied to the first tool object. A user interface displays the tool object, and it is added to an AI agent. The AI agent includes a manifest file that is used to execute the AI agent. This includes determining whether the AI agent is authorized to perform the action, and providing the AI agent with access to a tool credential, wherein the tool credential is sent to the endpoint.

20 Claims, 18 Drawing Sheets

(56) References Cited

U.S. PATENT DOCUMENTS

| | | |
|---|---|---|
| 2011/0213712 A1 | 9/2011 | Hadar et al. |
| 2016/0063512 A1 | 3/2016 | Greenspan et al. |
| 2018/0152564 A1 | 5/2018 | Lang et al. |
| 2018/0173568 A1 | 6/2018 | El-Moussa et al. |
| 2018/0314971 A1 | 11/2018 | Chen et al. |
| 2019/0107968 A1 | 4/2019 | Wisnovsky et al. |
| 2019/0206390 A1 | 7/2019 | Rotem et al. |
| 2020/0257567 A1 | 8/2020 | Fontanari Filho et al. |
| 2020/0265509 A1 | 8/2020 | Kumar Addepalli et al. |
| 2022/0051112 A1 | 2/2022 | Wang et al. |
| 2022/0066905 A1 | 3/2022 | Lee et al. |
| 2022/0138004 A1 | 5/2022 | Nandakumar |
| 2022/0188691 A1 | 6/2022 | Katz et al. |
| 2023/0230001 A1 | 7/2023 | Draznin |
| 2023/0409654 A1 | 12/2023 | Ziv et al. |
| 2024/0184567 A1 | 6/2024 | Gao et al. |
| 2024/0202458 A1 | 6/2024 | Zha et al. |
| 2024/0281419 A1 | 8/2024 | Alfaras et al. |
| 2024/0296522 A1 | 9/2024 | Saito |

OTHER PUBLICATIONS

Ding et al, "Hybrid LLM: Cost-Efficient and Quality-Aware Query Routing", arXiv preprint arXiv:2404.14618 (Apr. 2024). (Year: 2024).

Geronimo, "Evaluating LLMs with Semantic Similarity," Mar. 2024 [retrieved on Nov. 30, 24], pp. 1-39, downloaded from :https://medium.com/@geronimo7/semscore-evaluating-llms-with-semantic-similarity-2abf5c2fadb9. (Year: 2024).

Hazelwood et al., "Applied Machine Learning at Facebook: A Datacenter Infrastructure Perspective," 2018 IEEE International Symposium on High Performance Computer Architecture (H PCA), Vienna, Austria, 2018, pp. 620-629, doi: 0.1109/H PCA.2018.00059 (Year: 2018).

Lin et al., A Pipeline Design Method For Domestic Design(translation), 2022, Chinese Patent Office, pp. 1-8 (Year: 2022).

Lins et al, "Artificial Intelligence as a Service", Bus Inf Syst Eng 63, 441-456 (2021 ). https://doi .org/10.1007 /s12599-021-00708-w (Year: 2021).

Marvin, "Prompt Engineering in Large Language Models," Jan. 2024 [retrieved on Nov. 30, 2024], pp. 387-402, downloaded from :https://link.springer.com. (Year: 2024).

Minsuk, "LLM Comparator: Visual Analytics for Side-by-Side Evaluation of Large Language Models," Feb. 16, 2024 [retrieved Mar. 19, 2025], pp. 1-7, downloaded from :https://arxiv.org/abs/2402.10524. (Year: 2024).

Niknazar et al. "Building a domain-specific guardrail model in production." arXiv preprint arXiv:2408.01452 (Jul. 2024). (Year: 2024).

OnO "PipelineProfiler: A Visual Analytics Tool for the Exploration of AutoML Pipelines," 2020 [retrieved on Nov. 30, 2024], pp. 390-400, downloaded from :https://ieeexplore.ieee.org. (Year: 2020).

Singh, An Autonomous Multi-Agent Framework using Quality of Service to prevent Service Level Agreement Violations inCloud Environment International Journal of Advanced Computer Science and Applications(IJACSA), 14 (3), 2023. http://dx.doi.org/10.14569/IJACSA.2023.014032 (Year: 2023).

\* cited by examiner

AUTOMATED TOOL DISCOVERY AND INGESTION FOR ARTIFICIAL INTELLIGENCE AGENTS

CROSS-REFERENCE TO RELATED APPLICATIONS

This application claims priority as a non-provisional application to U.S. provisional application No. 63/658,434, titled "Artificial Intelligence Agent Platform," filed on Jun. 10, 2024, the contents of which are incorporated herein in their entirety.

BACKGROUND

Machine learning ("ML") and artificial intelligence ("AI") can be used to discover trends, patterns, relationships, and/or other attributes related to large sets of complex, interconnected, and/or multidimensional data. To glean insights from large data sets, regression models, artificial neural networks, support vector machines, decision trees, naïve Bayes classifiers, and/or other types of AI models can be trained using input-output pairs in the data sets. In turn, the trained AI models can be used to guide decisions and/or perform actions related to new data.

Currently, most people use AI models, such as large language models ("LLMs") by simply asking a question, which the AI model answers. While useful, the AI models are limited in their responses. This is because the AI models are limited to the data they are trained on. AI models and AI agents using those models are limited in their ability to access and manipulate additional data that is not explicitly supplied by the user. In many cases, explicitly supplying the needed access and data is not practical. The user, for example, may with the AI agent could analyze and update various accounts regarding work matters. But the AI agent does not natively have access to those accounts, and even if it did, likely would not have the wherewithal to update the accounts.

Tools have been developed to bridge this gap. AI models can be equipped with tools, which include commands (e.g., API calls) that the AI model or other agent object can make to access services and functionality associated with the tool. This can allow an LLM to, for example, search the web (with a first tool) and then draft an email for review in the user's email client (with a second tool).

But because of the rapid changes in both tools available and commands available per tool, it is difficult for individuals and enterprises to stay up-to-date and ensure these tools are properly used in the workflows of AI agents. This is because setting up the tool for use with an AI agent is cumbersome. For example, the tool definition must be first recognized, then downloaded, then understood. The AI agent workflow must be redesigned or reprogrammed. Even then, the user is at risk of data loss based on new commands that can be included with the tool that the user might not understand how to use. And the user likewise may be unable to set up the tool with an agent object such that the agent object can correctly determine when to use the tool.

As the foregoing illustrates, what is needed in the art are more effective systems for dynamically ingesting tools for use with AI agents.

SUMMARY

Examples described herein include systems and methods for discovering and ingesting tools for use in AI agents. AI agents, also referred to as AI pipelines, can consist of multiple agent objects, including one or more dataset objects, AI model objects, prompt objects, and code objects. AI Agents are a configurable software system that performs tasks using artificial intelligence components to achieve specific goals. These agents can be backend-focused "AI Agents" processing data without user interaction, or user-facing "AI Assistants" providing conversational interfaces. AI Agents integrate various components (Agent Objects) including AI Models, Integrators, Data Sources, Tools, Prompts, Code Blocks, Datasets, Routers, Memory Objects, and others according to defined workflows and rules specified in their "Manifest Files."

An AI platform can execute on one or more servers. The AI platform can manage multiple AI agents, AI models, datasets, tools, and prompt packages. The AI platform can orchestrate AI agent execution.

An administrative user can access the platform with a user device, either through an application that executes on the user device or through a web application. The administrative user can set various management policies that control access characteristics of other users that either use the platform to build AI agents or are end users who use applications that execute the AI agents. Therefore, three different user types (administrative user, platform user, and end user) can interact with the system. A single user can be one or more of these user types. For example, the administrative user can also be a platform user that creates an AI agent. And that same user can be an end user when they utilize the AI agent.

In one example, prior to displaying the available agent objects, the server can authenticate the platform user and evaluate at least one management policy that applies to the platform user. For example, the management policy can specify required groups as part of determining which subset of agent objects are available to for use in agent creation or modification. The available subset of agent objects is then displayed in a menu that includes prompt objects, dataset objects, model objects, and executable code objects. The management policy can require the platform user to be inside or outside of a geofenced area. For example, an executive group can have access to different agent objects than a sales group.

The platform user can then select and connect agent objects within the UI. Doing so can cause the server or another device to generate a manifest file based on selected agent objects that are connected on the UI. The manifest file can keep track of specific versions of the agent objects and their position coordinates on the screen. The manifest all tracks dependencies, which include perquisite events and resources that are needed prior to executing one or more stages of the agent (e.g., prior to executing one or more agent objects). The server can cause the manifest file to be validated against dependency rules for the agent objects. The dependency rules can vary for different agent objects. For example, a language model might require a particular security-related prompt package and a particular library for use as part of pre or post processing. A search of a dataset can require prior ingestion and vectorization of the dataset. Dependencies can also be used by an agent executor (also called a "pipeline executor" or "pipeline engine"). For example, the agent executor can wait for a prerequisite condition before executing an agent object, such as waiting for dataset ingestion or waiting on vector search results prior to executing a next agent object.

The system can receive further inputs to the UI to arrange the selected agent objects in an AI agent. For example, the agent objects can be dragged into position and connected to one another. The connection causes an execution linking between the selected dataset object and AI model to be established. The UI visually represents the established execution linking between the agent objects. The system can generate a manifest file that stores the arrangement of agent objects in the AI agent. When the manifest is validated, the AI agent is displayed as an execution flow within the UI. Validating the manifest can include checking the agent objects against dependency rules. Dependency rules dictate events that must occur before at least one of the selected agent objects can execute. The UI can display a validation of the manifest file. A validation service can perform the validation.

The designed AI agent can then be tested within the UI in a simulated execution. The simulated execution can execute an agent that corresponds to the validated manifest file. The agent can be active and available at an endpoint, or inactive and not currently available at an endpoint. To initiate the simulated execution, a platform user can select an option on the UI. The user can input a test query or select a series of test queries for use in the simulated execution. Either way, the system can receive a test query in the UI. The system then causes the selected agent objects to be executed in an order that follows the execution linking displayed within the UI. The test query can be an input at one or more of the agent objects, just depending on the agent design. The system can then cause an output of the simulated execution to be displayed in the UI based on the test query.

The administrator can identify at least one execution metric to monitor as part of the simulated execution. The execution metric can include outputs from the agent objects or the output of the agent. The execution metric can also include execution durations for the agent or one or more agent objects. Cost metrics and token metrics can also be execution metrics. The simulated execution then causes the selected execution metrics to be displayed on the UI. For example, the various outputs can display in the UI, the cost of execution can display, and the number of tokens can display.

When the platform user selects a deployment option, the system can cause the AI agent to be deployed. This can include indicating that a version identifier of the tested agent is now the active version. The deployed AI agent is accessible by at least one AI application through a generated endpoint. The endpoint, including an access key, can be distributed to applications on user devices, allowing the application to interact with the deployed AI agent. When the endpoint is accessed with the key, then an agent executor can execute the active version of the agent. At least one application can access the endpoint, causing the deployed agent to execute in stages dictated by the manifest file. End users can therefore connect to and utilize the AI agent.

Management policies can apply to end users as well. The system can also cause a management policy to be applied to pre-processing of inputs to the AI agent. For example, the management policy can include a network configuration requirement for the AI agent to fully execute. The management policy can be selected from multiple pre-defined policies, with a conditional code block dictating what to do when various compliance levels are achieved. In one example, the management policy requires that an end user attempting to access the AI application is authorized to access the dataset object based at least in part on the end user being associated with an identifier of an authorized group and a client device of the end user being compliant with at least one agent end user policy. The client device of the end user can be a computing device through which the access to the AI application is attempted. The UI can visually represent the application of the management policy to the dataset object.

The selected agent objects can be selected from a displayed menu that includes the prompt objects, the dataset objects, the model objects, and a code object. The code object can be a conditional object that includes an if-then statement for determining which of at least two branches of the AI agent to execute.

Additionally, the UI can display an agent object marketplace. The user can add an agent object from the marketplace to the AI agent in the UI, causing revalidation of the manifest file. The marketplace can allow third parties to sell their models and other agent objects. The manifest file can include position coordinates for each agent object in the AI agent, and wherein the UI displays the agent objects at the corresponding coordinates.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1A:
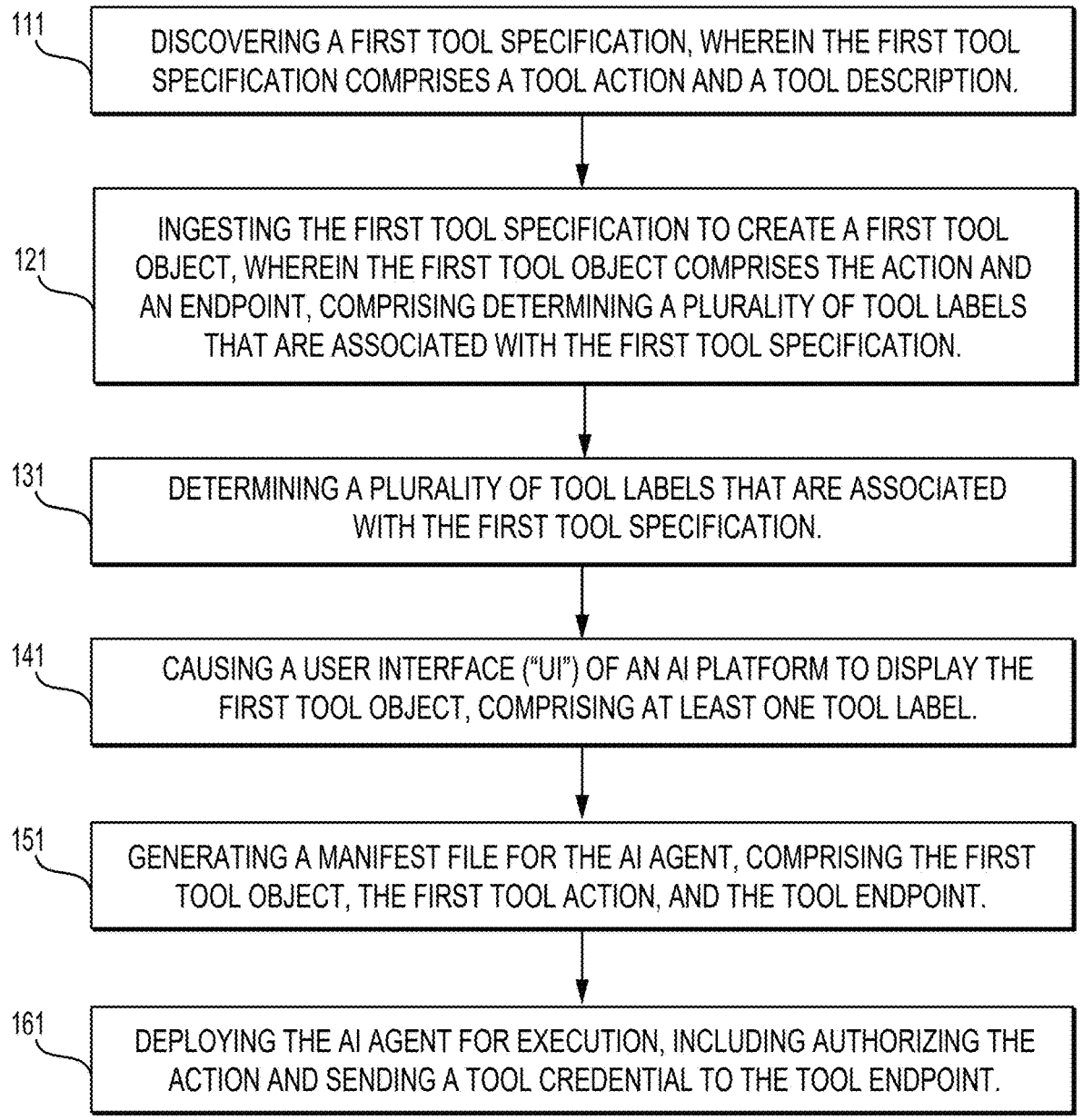
FIG. 1A is an example flow chart of a method for automated tool discovery and ingestion for AI agents.

In the following description, numerous specific details are set forth to provide a more thorough understanding of the various embodiments. However, it will be apparent to one skilled in the art that the inventive concepts may be practiced without one or more of these specific details. Several terms are discussed below, with discussion of the figures following the terms discussion.

AI Agents are a configurable software system that performs tasks using artificial intelligence components to achieve specific goals. These agents can be backend-focused "AI Agents" processing data without user interaction, or user-facing "AI Assistants" providing conversational interfaces. AI Agents integrate various components (Agent Objects) including AI Models, Integrators, Data Sources, Tools, Prompts, Code Blocks, Datasets, Routers, Memory Objects, and others according to defined workflows and rules specified in their "Manifest Files".

Manifest Files (also called "configuration files" or "manifest files") are structured documents that formally define an AI Agent's composition and behavior. Typically written in XML, JSON, or YAML formats, these files specify the included Agent Objects, execution order and workflow sequencing, conditional rules governing operation, authentication details and permission scopes, and component parameter configurations. Manifest Files serve as both documentation and operational blueprints, enabling the Execution Engine to instantiate and run the AI Agent with consistent behavior across environments while facilitating version control of agent configurations.

Agent Objects are the modular components or building blocks that make up an AI Agent's functional capabilities. These discrete elements can be assembled, configured, and orchestrated to create complete AI workflows. Each Agent Object performs a specific function within the overall agent architecture, such as processing data, making decisions, storing information, or interacting with external systems. Agent Objects include AI Models (for intelligence and processing), Integrators (for connectivity), Data Sources (for information access), Tools (for actions), Prompts (for model guidance), Code Blocks (for custom processing), Datasets (for knowledge), Routers (for traffic management), Rule Enforcers (for governance), Memory Objects (for context retention), and various specialized systems like Knowledge Retrieval or Orchestration Engines. The modularity of Agent Objects enables flexible composition of AI Agents with varying capabilities tailored to specific use cases.

AI Models refer to the underlying machine learning models that power AI capabilities within a platform. These include large language models (LLMs) like GPT-4, Claude, or open-source alternatives like Llama; image generation models like DALL-E or Stable Diffusion; speech recognition models; and specialized models for specific tasks. In an AI platform context, these models are typically accessed via API calls, with the platform managing aspects like model selection, versioning, parameter configuration, and the orchestration of multiple models for complex workflows.

Integrator modules serve as a connection gateway between the AI platform and external services. It standardizes the way the platform interacts with various data sources and tools through APIs. The integrator handles authentication, data formatting, protocol differences, rate limiting, and maintains a consistent interface regardless of the underlying service being accessed. This abstraction layer allows users to focus on building workflows rather than dealing with the technical details of individual integrations.

Data Sources are authenticated connections to storage repositories and databases that the AI Agent's user is authorized to access. These include cloud storage services (like Google Drive, Dropbox), databases (SQL, NoSQL), knowledge bases, document management systems, and similar repositories. The AI platform manages OAuth authentication and permissions, allowing agents to securely access, read, and potentially write to these sources while respecting user permissions and data governance policies.

Tools are services that an AI Agent can use to perform specific actions or access specific functionalities. Unlike data sources that primarily provide information, tools enable the AI to take actions like sending emails, creating calendar events, querying APIs, or modifying data. Tools can be unauthenticated public services or authenticated through OAuth to act on behalf of the user. The platform typically provides a standardized way to discover, configure, and invoke these tools within workflows.

Prompts are structured instructions or templates that guide the behavior of language models. In an AI platform context, prompts can be stored, categorized, and reused across different workflows. Prompt libraries allow organizations to standardize interactions with AI models, implement best practices, and maintain consistent outputs. Advanced platforms often include prompt management systems with versioning, performance tracking, and the ability to parameterize prompts for different use cases.

Code blocks are executable Python environments within the platform that allow for custom data processing, transformation, or algorithmic operations. These blocks can run Python code to perform tasks that might be difficult to accomplish using pre-built components, such as complex data analysis, custom API integrations, or specialized business logic. Code blocks typically include access to common libraries and can interact with other platform components, allowing for powerful hybrid workflows that combine AI models with traditional programming.

Datasets are structured collections of information that can be used for training, fine-tuning, retrieval augmentation, or reference. These may include company documents, knowledge bases, industry-specific information, or specialized data collections. In an AI platform, datasets are typically processed and indexed for efficient retrieval, with metadata management and versioning capabilities. They serve as the foundation for retrieval-augmented generation (RAG) and can be used to ground AI outputs in specific knowledge domains.

Routers (also referred to as "if-then-conditional code blocks") are intelligent components that direct the flow of information and execution within the AI platform. They monitor agent behavior and make routing decisions based on configurable rules, load balancing requirements, or content-based criteria. Routers can direct requests to specific models based on their capabilities, distribute workloads for performance optimization, implement failover mechanisms, or route certain types of queries to specialized handling components. Advanced routers may use their own AI models to make sophisticated routing decisions.

Memory objects are structured data representations that allow AI agents to maintain contextual awareness and persistence across interactions. These objects store various types of information such as conversation history, user preferences, previously accessed data, intermediate computational results, and state information. Memory objects can be short-term (session-based), long-term (persistent across sessions), or episodic (organized by interaction episodes). Advanced platforms implement different memory management strategies including summarization, prioritization, and forgetting mechanisms to handle memory constraints while maintaining context relevance. Memory objects enable agents to recall previous interactions, build on past work, and provide personalized experiences based on historical context.

Agent executors (also called "pipeline engines" and "execution engines") are the core operational component responsible for actually running the AI agent's processes according to its defined configuration. An agent executor handles the low-level execution of individual tasks, manages computational resources, monitors process health, and maintains execution state. The agent executor instantiates model instances, loads necessary libraries, establishes connections to external services, and handles the technical aspects of task processing. It's responsible for error handling at the execution level, logging operational metrics, and reporting execution status back to other components. The agent executor also implements features like parallel processing, batching operations for efficiency, and failover mechanisms to ensure reliability during execution.

Rule enforcers are governance components that ensure all platform operations comply with configured policies and constraints. They serve two primary functions: (1) enforcing configurations and settings across the platform, including agent behavior, model parameters, and security policies; and (2) monitoring for specific triggering conditions and applying predefined actions when those conditions are detected. Rule enforcers are critical for implementing guardrails, content moderation, cost controls, compliance requirements, and other governance measures that ensure the platform operates within established boundaries.

FIG. 1A is an example flow chart of a method for automated tool discovery and ingestion for AI agents.

At stage 111, an ingestion agent or other process and discover a first tool specification. The tool ingestion agent can be a type of AI agent that builds tool objects based on ingesting tool specifications. Tool specifications can be any description of a tool that includes a tool action and a tool description. The tool description explains functionality of the tool or action. Discovering the first tool specification can include scraping tool documentation from a website. For example, a scraper process that executes on behalf of the AI platform can monitor the website for updates and pull down the tool description, which can act as the first tool definition. In some cases, the AI platform can subscribe to a tool specification provider and receive tool specifications as tools are updated or new tools are created. Discovering the first tool specification can include subscribing to a service that provides tool specifications. In still other cases, a latest tool definition can be received through an API call to a provider, requesting a list of tool actions and/or specifications. The API call can request the first tool specification.

The tool action can be any type of command, including an API call. For example, an API specification for the tool can include numerous tool actions. The tool can provide the AI agent with access to particular functions, services, and accounts defined in the tool specification. For example, tools can exist for interacting with email clients, calendars, and most application types.

Discovering the first tool specification can include identifying the endpoint. The endpoint can be part of the first tool specification.

At stage 121, the ingestion agent can ingest the first tool specification to create a first tool object. A tool object can be displayed in the UI of the AI platform, for easy addition to an AI agent. The created first tool object includes at least one tool action and a tool endpoint. The endpoint is where the tool action can be invoked. For example, to execute the tool action, an API call can be made to the endpoint. In one example, the ingestion agent determines a semantic meaning of an application programming interface ("API") description of the tool specification. From this, a description of the action can be generated.

The ingestion agent can determine a plurality of tool labels that are associated with the first tool specification. The tool labels can describe various aspects of the tool. For example, each tool action can have a tool label. One tool label can be a name (e.g., label) of the tool itself, which is presented in the UI. The action tool labels likewise can be presented, so that an administrative user knows which actions to turn on and off. Another tool label can indicate an industry vertical. This can allow the AI platform to recommend the tool object based on templates and AI agents that are built for that industry vertical. Still another tool label can be a system prompt. The system prompt can be used by an agent object, such as an AI model, in determining when to use the tool action (or other tool actions) of the tool object. Agent objects include AI models, datasets, prompts, tool objects, and code blocks. These basic building blocks can define the workflow of the AI agent. In one example, a platform user can utilize an agent builder UI to define which agent objects are included and how they interact together.

Determining the plurality of tool labels can include determining a semantic meaning of the first tool specification. A trained AI model can read the first tool specification and deduce functionality of the command, for example. The functionality can then be described as a tool label.

In another example, determining the plurality of tool labels is based on tool labels of other tool objects with semantically similar tool actions to the tool action of the first tool object. An AI model can identify similar tool objects and ensure that the tool labels for the same types of tool actions are consistent. The this can help ensure consistent naming for the first tool object and a consistent description of the tool action.

The AI model can also identify or generate a system prompt that is used during execution of the AI agent to determine when to perform the action. In another example, keyword searching can identify a supplied prompt that is part of the tool specification. The system prompt can be stored as part of the tool object.

The ingestion can also include ingesting code for local execution in performing the action. In some cases, scripts can be run that act as interfaces to the tool. In other cases, the tool itself can run locally as a script. This can allow the AI platform to run the script on behalf of users.

At stage 131, the tool ingestion agent can apply the plurality of tool labels to the first tool object. This can include formatting the tool labels for consistency among tool objects, and writing the tool labels to the tool object. The tool object can also include a tool credential, such as a token for authenticating access and using the command.

At stage 141, a platform user or administrator can access the AI platform UI. The UI can display the first tool object, including at least one of the plurality of tool labels. For example, the name of the tool and/or action can be displayed. Additional descriptions of the tool and action can also display. This can allow the user to understand the usefulness of the tool object.

At stage 151, the first tool object can be added to an AI agent. This triggers generation of a manifest file for the AI agent. To add the first tool object, a user can drag the tool object, on the UI, into contact with an agent object of the AI agent. This execution linking can trigger generation of the manifest file. The manifest file identifies the first tool object, such as with a tool identifier. Specifically, the manifest file can identify the tool action and the tool endpoint, for use by an agent executor during execution. As will be described herein, the manifest file describes relationships between the agent objects, including tool objects. Additional details on AI agent creation and manifest file generation are provided with respect to FIGS. 15 and 16.

At stage 161, the AI platform can deploy the AI agent for execution. This can include activating the AI agent, making it available at an agent endpoint (e.g., at a server, at a client device, or in the cloud). An agent executor executes the AI agent according to the manifest file. Execution can be triggered when the endpoint receives an input from a client device of an end user. The agent executor at the endpoint reads the manifest file and makes execution decisions based on compliance with a management profile.

In one example, the agent executor determines whether the AI agent is authorized to perform the action. This can include determining if the user has authorization to use the tool. This can be based on an analysis of the user profile, device compliance, and the like. For example, the user may need to be part of a tenant and group that is authorized to use the tool. In addition, the user may need to grant permission to use the tool, particularly when the tool accesses personal data of the user.

In an instance in which the AI agent is authorized to perform the action, the agent executor can cause the command to be executed. This can include receiving the tool credential from the tool object and causing it to be sent to the tool endpoint. The tool credential can be a stored token or a username and password. This effectively authenticates the AI agent to use the tool on the user's or AI platform's behalf. To execute the tool action, a command, such as an API call, and the tool credential are sent to the endpoint identified in the tool object.

The tool object can also define format expectations for an output from the tool based on the tool action. The output can be incorporated into the AI agent execution, such as by providing the tool output to an AI model as part of responding to a user request. For example, emails returned by the tool can be inputs to the AI model, allowing the model to better answer a user query that involved email communications.

The tool action can be one of multiple API calls included in an API definition of the first tool object. The tool action can likewise be one of multiple tool actions viewable in the UI for the first tool object. The manifest file can be automatically generated based on a UI selection to add the first tool object to the AI agent.

Additionally, the tool object can be automatically added to the AI agent based on information of a platform user. For example, the AI platform can automatically generate an AI agent based on user questions. The AI platform UI can receiving user information from a first platform user. Based on the user information, the AI platform can automatically select a first template from a plurality of templates. The templates can be tied to different industry verticals, such as legal or medical, in an example. The AI platform can then generate the AI agent based on the first template, including automatically adding the first tool object to the AI agent. For example, the template-defined AI agent can add a legal research tool to an AI model that is included in the AI agent. The first tool object can be part of an industry-specific toolset that applies to the first template.

Additional discussion of the tool ingestion and tool object creation is included with regard to FIG. 2, below.

Additional discussion of how the tool can be dynamically invoked is provided as follows. The agent executor can also retrieve or receive a user profile. A user identifier can be used to identify the user profile. The user identifier can be received with the input or determined based on an input credential, such as the key or a username and password. The user profile can include management criteria, such as group identifiers, which are linked to various user management policies.

Together, these various identified policies can make up the identified management profile. For example, the management profile can include a user profile, device profile, AI model policy, a dataset policy, a tools policy, and a prompts policy. All of these can be applied in configuring inputs to and build parameters for an AI model specified in the manifest file.

The agent executor can apply the management profile in real time and in different ways to different agent objects. The agent executor can dynamically configure access to the agent objects based on applying the management policy. A management policy is applied to at least one of a device status, a user profile, or a network configuration. One or more of the agent objects can include an agent object policy identifier. The agent object policy can specify requirements for authorizing access to the agent object, including requirements related to device status, the user profile, and the network configuration. Likewise, tool objects for potential use by the agent object can also have requirements related to device status, the user profile, and network configuration.

A user profile can identify one or more groups and tenants to which the user belongs. The agent object profile, such as for the tool object, can require one or more of these groups for access purposes. For example, a dataset might only be accessible by a particular tenant and group within that tenant, and the user profile can specify whether the user meets those requirements. Similarly, the network configuration can be determined at the server and based on information supplied by the management controller at the user device. The network configuration can include details on connectivity, network security (e.g., encryption details), network bandwidth, and the like.

At stage 151, the agent executor can execute a workflow of the first AI agent that dynamically selects whether to use the tool or action. For example, the manifest file can indicate a first agent object that can use the tool when the user meets requirements of a management profile. For example, the user may need to belong to a particular group, which has access to the tool object.

The agent executor can also transmit an output to the client application on the client device. The output can be generated by the workflow. The output can be usable within the client application.

Figure 1B:
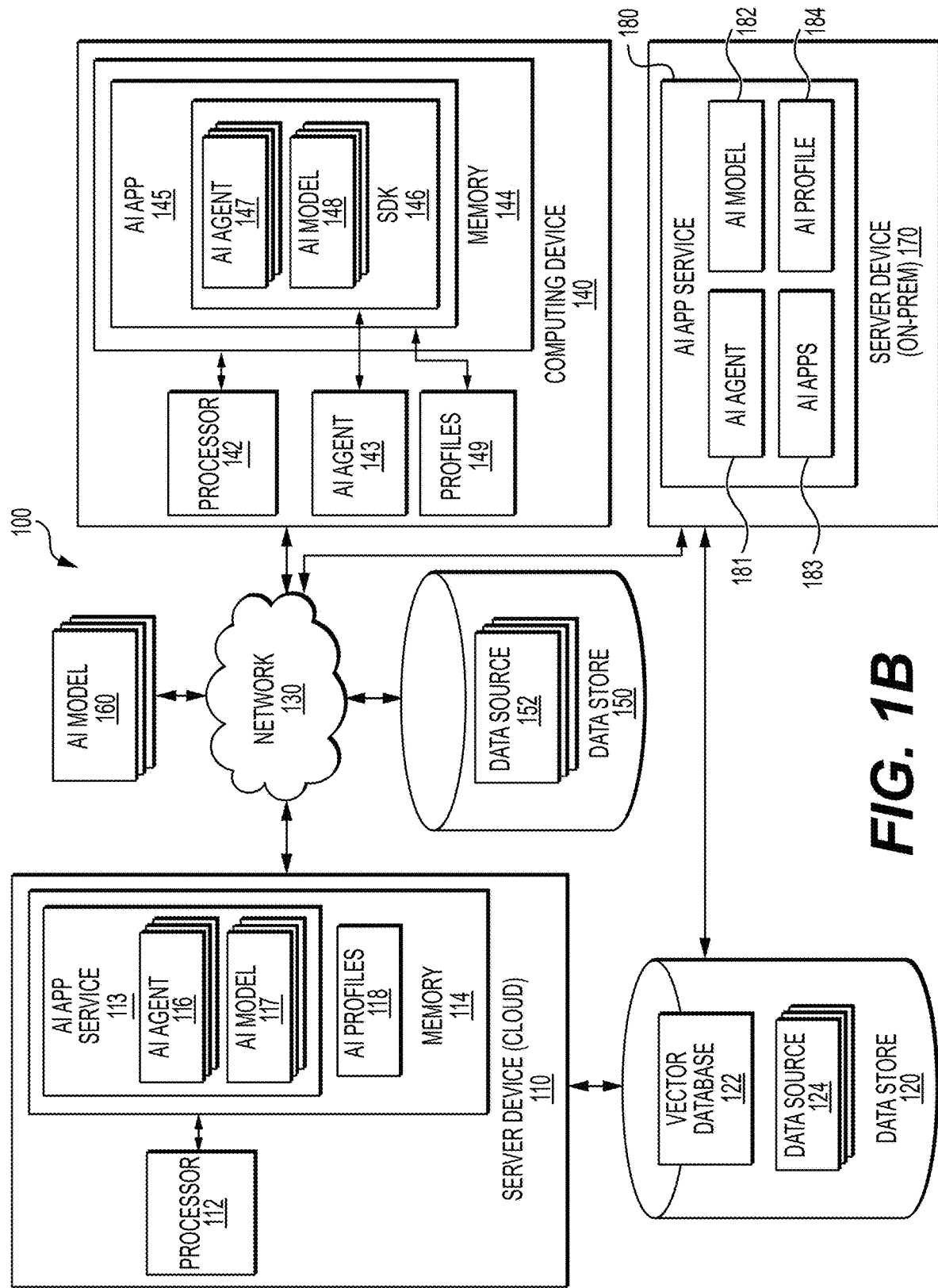
FIG. 1B illustrates a block diagram of a computer-based system configured to implement one or more aspects of the various embodiments.

FIG. 1B illustrates a block diagram of a computer-based system 100 configured to implement one or more aspects of at least one embodiment. As shown, the system 100 includes a server device 110 in communication with a data store 120, another data store 150, artificial intelligence (AI) models 160 (referred to herein collectively as AI models 160 and individually as an AI model 160), and a computing device 140. Illustratively, the server device 110, the AI models 160, the data store, and the computing device 140 (called "client device") are in communication over a network 130, which can be a wide area network (WAN) such as the Internet, a local area network (LAN), a cellular network, and/or any other suitable network.

As shown, an artificial intelligence ("AI") application ("app") service 113 (also called "AI platform") executes on one or more processors 112 of the server device 110 and is stored in a system memory 114 of the server device 110. The AI app service 113 can act as an AI platform that provides customers with a way to easily create, deploy, and manage AI agents 116. Customers can create AI agents 116 that uniquely suit their needs. The AI app service 113 can present a graphical user interface (UI) that allows the user to design and manage the AI agents 116. The AI agents 116 can utilize AI models 117 to perform tasks for a wide range of enterprise and personal AI applications. An enterprise AI application can be used in a work setting, with managed access to various functions and datasets that are part of the application. A personal AI application can be one that a user downloads for personal use. The AI app service 113 can execute on a cloud server (server device 110), or on one or more servers 170 that are located on premises at an enterprise.

AI profiles 118 can be stored at the AI platform for use in managing functionality of AI agents 116. The AI profiles 118 can be user specific, such that a user is assigned an AI profile 118 with information that impacts functionality with respect to that user. For example, the AI profile 118 can indicate a usage tier or enterprise group that applies to the user. The AI profile 118 can also track the user's activities at the AI app service 113. The AI app service 113 can use this information to determine which AI agents 116, datasets, AI models 117, prompts, and tools are available to the user.

An AI app service 180 that executes at an on-premises ("on-prem") server 170 can provide a customer with similar AI agent design and administration. But being on-prem can allow for some AI agents 181 and/or objects within those agents to securely execute within an enterprise's own trusted infrastructure, in an example. The AI app service 180 can include AI agents 181, AI models 182, AI profiles 184, and AI apps 183. The AI apps 183 can be managed enterprise applications in an example. These can be accessed through a secure dashboard by users who are enrolled and in compliance with the AI app service 180. For example, a content application can allow enterprise users access to enterprise documents. But the documents can be intelligently surfaced or expanded through use of AI agents 181 that operate with the content application according to a user's AI profile 184. The AI models 182 can run locally or in a trusted outside environment so as to not compromise sensitive enterprise data.

Users can access the AI app service 113, 180 though use of a computing device 140, which can be any processor enabled device. Examples include a laptop, phone, tablet, headset, and personal computer. An AI agent 143 (referred to above as a "management controller") can execute on the computing device 140. The AI agent 143 can allow the AI platform (e.g., app service 113, 170) to manage what functionality of the AI agents 116, 181 is available to the computing device 140. In one example, the AI agent 143 is installed on the computing device 140 as part of device enrollment at the AI platform, or as part of installation of an AI app 145 that interacts with the AI platform (e.g., AI app service 113, 180). The AI agent 143 can be part of an AI app 145 or operating system. Alternatively, the AI agent 143 or can execute as a stand-alone application.

The AI agent 143 can ensure that the computing device 140 complies with management policies and vary access to objects at the AI platform based on the level of compliance. For example, a compliant computing device 140 can download or access an AI app 183 and/or objects of an AI agent 181. But the AI platform can prevent a non-compliant computing device from executing the AI agent 181 or specific objects within the agent, such as specific AI models 182, tools, datasets, or prompt packages. Alternate AI agents 116, 147, 181 can be provided based on the level of compliance of the computing device 140.

One or more user or device profiles 118, 184 can be maintained at the platform and fully or partially maintained at the computing device 140 as profiles 149. Any or all of these profiles 118, 149, 184 can track user and device information that are utilized by the AI platform. The profile information can be updated by the AI platform, such as by storing query and result history, and learned aspects about the user that are relevant to an AI app 145 that utilizes the AI platform. The profile 118, 149, 184 itself can be an input to an AI agent 116, 147, 181.

A compliance management service can execute at the platform and can communicate with the AI agent 143 to ensure that a computing device 140 remains compliant with compliance rules as a requisite to AI agent operation.

Compliance rules can encompass configurable criteria that must be met for a client device to be considered "in compliance" with the AI agent management service. These rules can be determined based on various factors such as the geographical location of the client device, its activation and management enrollment status, authentication data (including data obtained by a device management system), time, date, and network properties, among others. User profiles associated with specific users can also influence the compliance rules. User profiles are identified through authentication data linked to the client device and can be associated with compliance rules that take into account time, date, geographical location, and network properties detected by the device. Furthermore, user profiles 149 can be connected to user groups (also called "management groups"), and compliance rules can be established based on these group associations.

Compliance rules set predefined constraints that must be satisfied for the AI agent management service or other applications to allow access to enterprise data or other features of the client device. In certain cases, the AI agent management service interacts with a management application, migration application, or other client application running on the device to identify states that violate one or more compliance rules. These non-compliant states can include the detection of viruses or malware on the computing device 140, the installation or execution of blacklisted client applications, or the device 140 being "rooted" or "jailbroken," which grants root access to the user. Other problematic states can involve the presence of specific files, suspicious device configurations, vulnerable versions of client applications, or other security risks. Sometimes, the migration service provides the compliance rules, which are based on the rules of the previous management service. Alternatively, the compliance rules can be directly configured in the AI agent management service by an administrator.

Returning to the functionality of the server device 110, 170, one or more processors 112 receive user input from input devices, such as a keyboard or a mouse. In operation, the one or more processors 112 may include one or more primary processors of the server device 110, controlling and coordinating operations of other system components. In particular, the processor(s) 112 can issue commands that control the operation of one or more graphics processing units (GPUs) (not shown) and/or other parallel processing circuitry (e.g., parallel processing units, deep learning accelerators, etc.) that incorporates circuitry optimized for graphics and video processing, including, for example, video output circuitry. The GPU(s) can deliver pixels to a display device that can be any conventional cathode ray tube, liquid crystal display, light-emitting diode display, and/or the like.

The system memory 114 of the server device 110 stores content, such as software applications and data, for use by the processor(s) 112 and the GPU(s) and/or other processing units. The system memory 114 can be any type of memory capable of storing data and software applications, such as a random-access memory (RAM), a read-only memory (ROM), an erasable programmable read-only memory (EPROM or flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a secure digital card, an external flash memory, a portable compact disc read-only memory (CD-ROM), an optical storage device, a magnetic storage device, and/or any suitable combination of the foregoing.

The server device 110 shown herein is for illustrative purposes only, and variations and modifications are possible without departing from the scope of the present disclosure. For example, the number of processors 112, the number of GPUs and/or other processing unit types, the number of system memories 114, and/or the number of applications included in the system memory 114 can be modified as desired. Further, the connection topology between the various units in FIG. 1B can be modified as desired. In some embodiments, any combination of the processor(s) 112, the system memory 114, and/or GPU(s) can be included in and/or replaced with any type of virtual computing system, distributed computing system, and/or cloud computing environment, such as a public, private, or a hybrid cloud system.

In some embodiments, the AI platform application 115 is configured to facilitate the design, instantiation, modification, testing, and/or execution of AI agents 116 (referred to herein collectively as AI agents 116 and individually as an AI agent 116) that use one or more AI models 117 (referred to herein collectively as AI models and individually as an AI model 117), as discussed in greater detail below in conjunction with FIGS. 2-4. Generated AI agents, such as AI agents 147 (referred to herein collectively as AI agents 117 and individually as an AI agent 147), and AI models, such as AI models 148 (referred to herein collectively as AI models 148 and individually as an AI model 148), can also or instead be deployed to execute elsewhere, such as in a client application 145, which as shown includes a software development kit (SDK) that includes the API agents 147 and the AI models 148. Illustratively, the client application 145 is stored in a system memory 144, and executes on a processor 142, of the computing device 140, which can be similar to the processor 112 and the memory 114 of the server device 110, respectively. A machine learning (ML) model is one type of AI model.

In one example, a local AI agent 147 and AI Model 148 can be used as part of a larger AI agent 181 of the AI platform. This can allow for preprocessing locally, such as the redaction of personally identifiable information ("PII"). The local AI agent 147 and AI Model 148 can recognize PII in content before the content is sent to a cloud server (server device 110), in an example. A discriminative model can run locally on the computing device 140, not relying on generative AI, such as LLMs, whether run locally or in the cloud. The recognized PII can be replaced with encrypted information, and a decryption mechanism, such as a key, hash, password or other information, can be supplied by the AI agent 143 to the AI platform. The decryption mechanism can be stored separately from the content with the removed PII, in an example. The decryption mechanism can allow the user or other authorized users to decrypt and reinsert the PII at a later time.

Each of the data store 120 and the external data store 150 can include any storage device or devices, such as fixed disc drive(s), flash drive(s), optical storage, network attached storage (NAS), and/or a storage area-network (SAN). Although shown as distinct from the server device 110, in at least one embodiment the server device 110 can include the data store 120 and/or the data store 150. Illustratively, the data stores 120 and 150 store data sources 124 (referred to herein collectively as data sources 124 and individually as a data source 124) and 152*i* (referred to herein collectively as data sources 152 and individually as a data source), respectively. In addition, the data store 120 stores a vector database 122. In operation, execution of the AI agents 116 and/or 147 can include use of local AI models (e.g., AI models 117 or 148) and/or remote AI models (e.g., AI models 160) that process input data along with data from one or more data sources 124 and/or 152 that are identified via an embedding search using the vector database 122 and provided to the local and/or remote AI models as context, as discussed in greater detail below in conjunction with FIGS. 2-5 and 11.

Although a server device 110 and a computing device 140 are shown for illustrative purposes, in some embodiments, each of the AI platform application 115 (also called AI App Service) and/or client applications can be implemented in any combination of software and/or hardware and can execute in any technically feasible type of computing system, such as a desktop computer, a laptop computer, a mobile device, a virtualized instance of a computing device, a datacenter computing system, a distributed and/or cloud-based computing system, and so forth.

Figure 2:
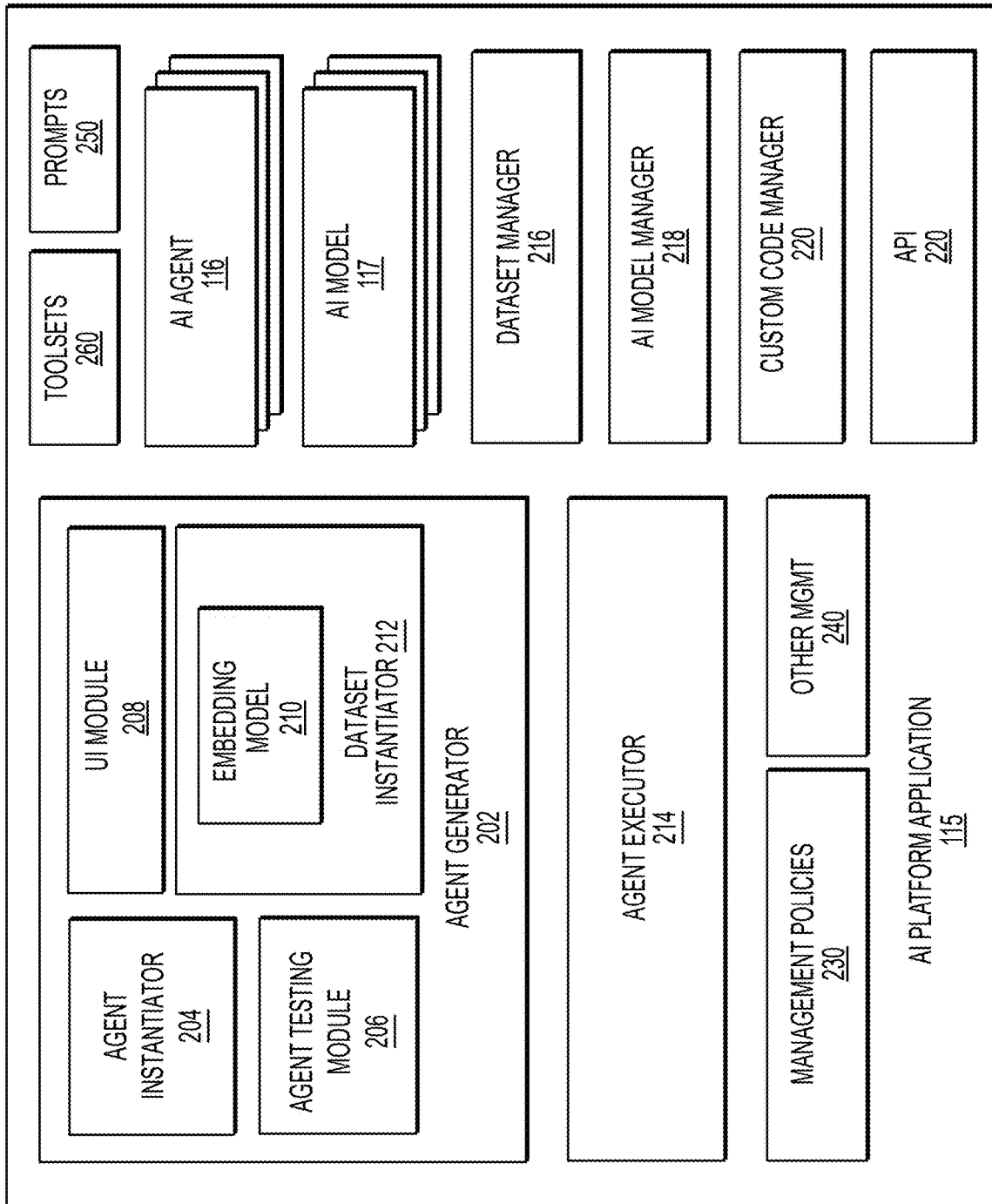
FIG. 2 is a more detailed illustration of the artificial intelligence (AI) platform application of FIG. 1B, according to various embodiments.

FIG. 2 is a more detailed illustration of the AI platform application 115 of FIG. 1B, according to various embodiments. As shown, the AI platform application 115 includes an agent generator module 202, an agent executor module 214, the AI agents 116, the AI models 117, a dataset manager 216, an AI model manager 218, a custom code manager 220, and an application programming interface (API) 222.

The agent generator 202 includes an agent instantiator module 204, an agent testing module 206, a user interface (UI) module 208, and a dataset instantiator module 212. In operation, the UI module 208 generates one or more UIs that permit a user, such as an information technology (IT) administrator, to define AI agents that each include one or more objects having associated parameters, as well as relationships between the object(s). In some embodiments, each AI agent can include a directed graph that includes multiple objects and indicates how the outputs of one or more objects are input into, or otherwise depend on, other object(s). Given user input defining objects (including parameters thereof) and/or agents of objects, the agent instantiator 204 instantiates the objects and/or agents, such as by adding the objects and/or agents to a database and/or generating program code for the objects and/or agents, as discussed in greater detail below in conjunction with FIGS. 8-10. In some embodiments, one particular type of object is a dataset object that defines a dataset from which chunks of text that are relevant to input can be retrieved for inclusion, along with the input, in the context window of a prompt that is input into an AI model. In such cases, to instantiate a dataset object, the dataset instantiator 212 (1) divides text data from a data source associated with the dataset object into chunks that can be referenced for later use, and (2) processes the chunks using a trained embedding model 210 that generates embeddings of the chunks in a high-dimensional latent space.

Then, the dataset instantiator stores the embeddings of the chunks in the vector database 122 for use in embedding searches, as discussed in greater detail below in conjunction with FIGS. 3 and 9. The agent testing module 206 permits users to test instantiated agents against various input data to see what outputs are generated by those agents, as discussed in greater detail below in conjunction with FIG. 7. The agent executor 214 executes agents that have been instantiated and tested. For example, the client application 145 could make a call via the API 222 to execute an agent, or the AI platform application 115 itself could execute an agent.

The platform can also store prompt packages 250 for use in the AI agents. An administrator user (of the platform or customer of the platform) can create enterprise prompts that end users do not see. The enterprise prompts can be fed into an LLM in an agent to guide the LLM towards results that are usable by the AI apps. This can include ensuring that the results include particular content and exclude other content, and that the results are formatted for use with the AI application. The platform can also track user prompts, which can be prompts created by an end user.

The platform also stores toolsets 260 (also called "tools") for inclusion in the AI agents. Toolsets 260 can include scripts and code for various processing, including pre- and post-processing.

Tools 260 can be ingested through an API to the AI platform. The API Ingestion process can utilize an API definition file in an example. Alternatively, tools can be ingested based on tool documentation or a website. For example, an ingestion agent can ingest the text, identify APIs, determine semantic meaning of the API description, and create a Tool Action in the agent builder. The ingestion agent can also add API calls, add authentication keys, and make the tool available as a dropdown in the UI under the Tool object. In this way, a Third Party Service can be made accessible via the APIs.

One embodiment of the AI platform enables automated ingestion and integration of third-party tools. Tool information can be received from various sources, including API definition files, textual documentation, or online sources such as developer websites. The platform processes this information through a tool ingestion agent that identifies API operations, interprets semantic descriptions, and automatically generates corresponding tool objects. Tool objects include the commands and API calls that the AI platform derives from the tool information. The tool actions can include an endpoint to call, parameters for inclusion in the command or API call, authentication details, and expect responds types or formats.

Once ingested, tool objects are stored as selectable, reusable objects and are accessible to AI agents, with generated code facilitating seamless interaction with the underlying APIs. The tool objects can be included in menus within the AI agent builder UI for inclusion in AI agents. The tool objects can be dragged into AI agents or AI models within those AI agents, with relevant API endpoints and authentication details already configured.

The ingestion agent can receive tool information from various sources, including but not limited to structured API definition files (e.g., OpenAPI, Swagger), unstructured tool documentation (e.g., developer guides, help files), and publicly accessible websites. Ingestion may involve parsing text, scraping structured markup, or applying natural language processing to extract API-relevant content.

As part of ingestion, the system applies semantic analysis to endpoint descriptions, parameter names, and response schemas to infer the purpose and usage of each API operation. This enables automatic labeling of the tool objects (for presentation in the UI), generation of human-readable prompts, and context-aware parameter defaults. The context-aware parameter defaults are pre-filled API parameters with default values selected based on semantic understanding of the API's purpose and the surrounding tool description context. For example, the ingestion agent can analyze names and descriptions of API parameters (such as city, userID, timestamp) and the overall function of the tool command (such as, "get current weather"). A default parameter value can be set to the city where the platform user lives, to be replaced by a city value from an end user profile.

The ingestion agent may also generate executable code artifacts, including function stubs, request templates, authentication handlers, and integration wrappers, that allow AI agents or agent objects to interact with the ingested API directly. These code artifacts may be embedded within the platform or exported for external use.

Once a tool is ingested, it becomes available as a selectable and configurable object within the agent builder interface. Users may drag and drop tool objects into a workflow, view automatically populated parameters, and connect these actions with other components. The platform may also visually indicate authentication requirements or dependencies for each tool.

Ingested tool objects are stored as part of a centralized toolset repository. Each tool object can include metadata, action definitions, authentication configurations, and source information. Toolsets, or collections of tool objects, may be versioned and reused across AI agents, shared among users, or exported for deployment in external systems.

The platform can include an interactive tool refinement interface where users can review auto-generated tool objects and edit labels or default parameters. These edits act to confirm or reject the semantic interpretations that were used to create the tool objects with the respective labels and default parameters. Feedback from this process may be used to retrain models used in the ingestion agent, improving future ingestion accuracy.

In one example, a router object can be used within an AI agent to select between various approved tools. For example, the router object can perform a semantic evaluation of tool categories and tool actions based on an input. This can surface one or more tools, which can be services or single command actions, that are semantically related to the input. The input can then be sent to the service(s) and/or the command actions can be executed. The results (i.e., outputs) can then be utilized within the workflow of the AI agent.

To perform semantic evaluation, the agent executor can vectorize the input and perform a vector search of available tools. The available tools can be represented as vectors that correspond to description of the user of the respective tool and/or a command of the respective tool. The vector comparison can commands and uses that are related to the input.

Alternatively, to perform the semantic evaluation, the agent executor can supply the input and tool descriptions to an LLM, along with system prompts for selecting relevant tools. The LLM can decide which of the tools (including specific commands) are relevant to the input. The tool descriptions transmitted to the LLM can be limited to those tools that are approved for use with the particular AI agent and/or user. The output from the LLM can be one or more tool services or commands.

Additional compliance rules can include data privacy and security rules. These can ensure that sensitive company data is not shared with AI applications without proper authorization. Data encryption can be enforced on secure communication channels when interacting with AI systems. User access to AI applications 145, 183 can be restricted based on user groups, roles, and permissions.

Prompt policies can prohibit the use of AI applications to generate content that infringes on copyrights, trademarks, or patents. The AI platform can implement content filtering and monitoring mechanisms to detect and prevent the generation of protected intellectual property. The prompt policies can prohibit the generation of harmful, discriminatory, or biased content. The AI platform can enforce management policies 230 against using AI for malicious purposes, such as creating fake news, deepfakes, or engaging in social engineering attacks.

As additional security measures, the AI platform can maintain a centralized repository of approved AI models and datasets for employee use. The AI platform can implement version control and model lineage tracking to ensure the integrity and reproducibility of AI-generated outputs. The platform can also regularly audit and validate AI models for accuracy, fairness, and absence of bias.

Access controls and authentication can be added to the AI platform. The system can implement strong authentication mechanisms, such as multi-factor authentication, for accessing AI applications. The system can also enforce least privilege principles, granting employees access only to the AI features and data necessary for their job functions.

The AI platform can also run logging and monitoring services. This can enable comprehensive logging of AI application usage, including user activities, input prompts, and generated outputs. The AI platform can also perform real-time monitoring and run alerting systems to detect anomalous or suspicious AI usage patterns. An administrative agent can regularly review logs and audit trails to ensure compliance with established policies.

As part of third-party AI application management, a vetting process can be executed on third-party AI applications before allowing their use within the organization. In general, this can include assessing the security, privacy, and compliance posture of external AI providers to ensure they align with the organization's standards.

The AI agents 116 and AI objects (e.g., e prompts 250, toolsets 260, AI models 117, and datasets) available on the platform can vary per tenant (e.g., per enterprise), per subtenant (e.g., per customer of an enterprise), and per administrator that accesses the platform (i.e., based on administrator rights).

The instantiator 204 can include an endpoint and key generator. The endpoint can be a uniform resource locator ("URL") for an AI agent that resides on the user device or remotely, such as in the cloud. The key can be used as part of accessing the AI agent. When the user performs a search within the application, the content query is sent to the AI agent at the endpoint, along with the key. The endpoints and keys can be stored on the platform.

The AI agents 116 can include a manifest file that describes which platform objects are used in the agent, the sequences of those objects, where the objects display within the UI of the administrator console, dependencies for those objects, and management policy identifiers for looking up relevant management policies.

Continuing with FIG. 2, the agent executor 214 can include a rules engine that applies management policies 230 to the execution of the agent. The management policies 230 can relate to users, computing devices, AI models, prompts, datasets, toolsets, and agent endpoints. For example, the management policies 230 can include various compliance requirements for a computing device to access any one of the agent objects. The AI agent on the computing device can report the compliance information to the platform, which can be utilized by the rules engine in comparing the compliance information to the management policies 230. Additionally, profiles in the platform can track which users and devices are part of which groups, such as enterprise groups or access tier groups. The management policies 230 can be applied to the groups to determine which agent objects are available to the user or computing device. As an example, an executive group can have access to multiple AI agents whereas a marketing group might have access to only a subset of the same AI agents.

Management groups and rules can determine which AI-enabled Apps, AI agents, and agent objects are accessible to a user. For example, an AI application catalog can be selected within the UI for the AI platform. The AI applications within that catalog can differ depending on which group(s) the user belongs to.

Management groups provide a way to control access to specific subsets of AI applications, agents, and objects while restricting access to others. These management groups often mirror the organizational structure and user roles within a company. When users browse the AI application catalog to find applications to deploy, they are presented with the option to choose a management group for each specific AI application deployment. After the AI applications, agents, and objects are deployed, they can only interact with and access other AI components within their designated management group. This ensures that AI resources are properly segregated and accessible only to authorized users and applications.

In some cases, the system can infer a user's management group automatically based on their user profile or device information. The same attributes used to log into the AI application catalog can be cross-referenced to determine the user's assigned management group, which is stored in the AI management service's database.

The AI application catalog may also offer multiple variations of the same AI application, each tied to a different management group. This allows for tailored deployments based on a user's specific access level and requirements within the organization.

By utilizing management groups, organizations can maintain tighter control over their AI resources, ensuring that applications, agents, and objects are only accessible to those who need them for their specific roles and responsibilities. This helps to enhance security, prevent unauthorized access, and streamline the deployment and management of AI components across the enterprise.

In one scenario, the management service oversees a collection of client devices by executing management tasks related to that specific group of devices. To facilitate this, the management service may record the definitions of one or more "management groups" (i.e., groups of client devices) within the management database of the management server. These management groups can then be employed by the management service whenever a management operation needs to be carried out.

Management groups can be categorized into two types: static and dynamic. A static management group, also known as a "location group" or "user group," can include client devices that remain largely unchanged. In other words, a client device (or the user associated with that device) assigned to a static management group can maintain its membership indefinitely until an authorized administrator modifies the group composition.

Conversely, a dynamic management group, or "smart group," determines its member client devices based on one or more group inclusion criteria. These criteria are evaluated to decide which client devices (or users) should be incorporated into the management group. Dynamic management groups may reassess their membership based on a threshold condition, such as a time duration, or they may determine their members on an as-needed basis whenever the group is to be used.

Regardless of the type, the management service typically offers an administrative dashboard that allows authorized users, such as administrators, to create and configure management groups according to their specific requirements. This provides a flexible and efficient way to manage and apply policies to subsets of client devices within the managed environment.

In one example, a device management server or the AI agent 143 can provide the rules engine or its AI management service with updated device status. The AI management service can use the updated device status for rule evaluation as relates to whether user/device is authorized to (1) use native (e.g., iOS, ANDROID) AI applications, (2) access cloud-based AI applications 183 from the client device 140, (3) access the AI platform from the client device 140, etc.

An administrator can create rules (e.g., management policies) that use device status in providing conditional access to agent objects. For example, a menu or drop-down list in the administrator UI can allow the administrator to select between available device statuses for inclusion in rules. The rules can be stored and assigned as management policies to the agent objects.

Several example device statuses are described for use in rule creation and evaluation. A device enrollment status can indicate whether a device is enrolled, not enrolled, pending enrollment, or has failed enrollment with a management service or with the AI platform. These statuses can cause the AI platform to allow access to different AI agents and agent objects.

Device security statuses include: status and configuration of device, storage, and communication encryption; authentication mechanisms including passcodes and biometrics; detection of rooting, jailbreaking, and tampering; remote wipe capability and logs; secure boot and trusted execution environments; developer and USB debugging modes; device compliance with security policies and management systems; firewall and virtualization status; removable storage and system encryption; runtime protection, threat detection, and integration with mobile security platforms.

Operating system and software compliance includes: versioning, patch level, and update status for OS, firmware, baseband, and kernel; app lifecycle management and permissions; malware and certificate monitoring; configuration of email, browser, and network settings; management system enrollment and compliance (MDM, EMM, UEM); containerization, VPN, and ZTNA configurations; telemetry, accessibility, and profile settings; software inventory and SBOM tracking.

Network and connectivity compliance includes: status and configuration of Wi-Fi, cellular, Bluetooth, NFC, USB, VPN, tethering, and hotspot connections; authentication and encryption methods; roaming and usage metrics; peripheral connectivity; SD-WAN, NAC, and WIPS integrations; protocol security, DNS configurations, and captive portal detection; voice and data communication technologies.

Hardware and performance compliance includes: monitoring of power, thermal, memory, CPU, GPU, and storage performance; sensor usage (motion, biometric, environmental); device component status (camera, mic, display, audio, input); tamper and shock detection; hardware condition and integrity assessment.

Data and storage compliance includes: local and cloud backup status, encryption, scheduling, and restoration; removable media usage and protection; data synchronization, archiving, and migration; enforcement of retention, loss prevention, and access controls; encryption, integrity, anonymization, and recovery protocols; regulatory compliance for storage and deletion.

Location and geofencing compliance includes: device location tracking, accuracy, and data sources; geofencing setup and enforcement; location-based access controls, analytics, and behavior tracking; privacy management and third-party access; integration with RTLS, IPS, and beacon systems.

User and identity compliance includes: User authentication, roles, and account lifecycle; access controls, MFA, SSO, and token-based mechanisms; user onboarding/offboarding, usage policies, and remote access; privacy, training, and compliance with regulatory and corporate standards; ownership models (BYOD, COBO, COPE).

Device compliance includes compliance with security, privacy, network, user, OS, hardware, and app policies; adherence to industry regulations (e.g., HIPAA, GDPR, NIST, PCI-DSS); management of data encryption, access, retention, and usage policies; risk assessment, remediation, auditing, and certification under corporate and regulatory frameworks. Endpoint and device states can include endpoint power on/off status, boot and startup status; endpoint network and connectivity status; endpoint peripheral and device attachment status; Endpoint user and activity status; endpoint location and geofencing status; endpoint remote access and control status; endpoint backup and recovery status; endpoint disposal and decommissioning status; endpoint software and license inventory status; endpoint hardware and asset inventory status; endpoint mobile device and app management status; Endpoint IoT and sensor management status; among others.

Any combination of the above device statuses can be used to create management policies 230 that are applied as conditional checks within an AI agents. For example, because the functionalities and security features related to the OS can differ, the AI platform can use this information to determine which agent objects can be accessed by the computing device 140.

Likewise, different compliance states can cause the AI platform to allow access to different agents and agent objects. The compliance status can be used to determine access to sensitive information, such as corporate documents or sensitive personal documents with personally identifiable information (PII). For example, a less sensitive agent can be made available when compliance is pending, with a most sensitive agent being available to a compliant device. A public AI agent can be available to a non-compliant device, and no service at all provided to a failed compliance device.

Additionally, the input and outputs to the AI agent can dynamically change based on network connectivity, with a slow connection being limited to text characters instead of, for example, large images, audio, or video. The battery status can be checked before executing a time-consuming AI agent, in an example. Likewise, the battery status can be checked before allowing ingestion of very large content, since the computing device 140 could run out of battery before the document is fully uploaded, unnecessarily leaving an ingestion agent and any dependencies in an unwarranted waiting state.

In one example, access to an AI agent or dataset can be contingent on the device being located within a geofence, such as at an office location, or outside of a geofence, such as in a foreign country or at competitor's office location. Information regarding installed apps can be used to detect blacklisted or whitelisted apps that are either disallowed or needed in order for an AI agent or agent object to be accessed.

Configuration profiles can also be enforced against computing devices 140 that are managed by the platform or a device management service. For example, a device management service integrated with the AI management service can require particular device setting configurations as prerequisite to accessing particular AI-enabled apps, AI agents, and AI agent objects. Configuration profile parameters define structured, enforceable settings that control the behavior of AI model objects (e.g., NLP, CV, time series, recommender systems). These parameters can be applied at different agent stages—during model creation, data ingestion, preprocessing, postprocessing, or runtime—and support centralized enforcement of model governance policies.

Device passcode settings may include requiring a passcode to unlock the device, setting rules for length and complexity, limiting failed attempts before wipe, enforcing expiration and history, auto-locking after inactivity, disabling biometrics, requiring two-factor authentication, and mandating passcode changes on enrollment or role change. Access to agent objects like document datasets can depend on these settings. Data encryption settings may enforce device-level encryption, secure storage of sensitive data, encrypted communications, cloud and database encryption, file-level and backup encryption, and secure key management. App restriction settings may include allowing or blocking specific apps, limiting app store access, restricting built-in app use, requiring VPNs per app, isolating app data, limiting app permissions, enforcing expiration and deletion, wrapping corporate apps, checking licenses, and blocking sideloading.

Network security settings may require encrypted Wi-Fi, restrict unsafe networks, enforce VPNs, apply access controls, limit cellular data, require secure Wi-Fi profiles, filter DNS, mandate secure protocols, and detect anomalies or intrusions. Additional settings are described below. Email and calendar settings may enforce approved email clients, require encryption, control attachments and event sharing, apply retention rules, enable DLP, secure gateways, phishing protection, and manage calendar access. Web browsing settings may enforce approved browsers, filter and block content, limit site access, disable browser features, apply safe browsing rules, log activity, use firewalls, enforce HTTPS, and block malicious sites.

DLP settings may block copying, screenshots, and file sharing; enable remote wipes; require data labeling; monitor for data leaks; use masking or tokenization; enforce retention and disposal; and support data discovery. Authentication and access control settings may include multi-factor authentication, role-based access, idle-time reauthentication, auto-lock, risk-based login, password managers, SSO, certificates, and biometrics for sensitive apps. Update settings may require regular OS and security patches, control update timing, block downgrades, enforce app updates, track software versions, verify firmware integrity, enforce secure boot, and support OTA updates.

Location and time-based settings may include access limits by location, geo-restrictions, time-based access rules, geofencing, location tracking, location-aware authentication, travel compliance, and location-based wiping or encryption. Monitoring settings may include logging device activity, tracking compliance, sending real-time alerts, centralizing logs, running audits, analyzing user behavior, using threat intelligence, and supporting forensic investigations.

Removable media settings may restrict external storage access, require encryption, control allowed file types, whitelist devices, log usage, wipe media on unenrollment, and support secure file transfers. Incident response may include remote lock/wipe, breach reporting, drills, automation, disclosure policies, digital forensics, and coordination with external responders. User education policies may require regular training, explain compliance rules, encourage reporting, run phishing tests, share secure usage tips, offer incentives, give quizzes, and provide timely security reminders. Mobile threat defense settings may require threat detection apps, scan for malware, check app reputations, verify device integrity, block risky devices, support threat intelligence and hunting, integrate with SIEM, and score mobile risks.

Privacy settings may include consent management, transparency on data use, limiting data collection, supporting data rights, complying with regulations (e.g., GDPR), privacy impact reviews, anonymization, and privacy-by-design principles. Certificate and key management may include trusted certificates, certificate-based login, key rotation and secure storage, revocation and validation, secure key generation, and strong encryption algorithms with recovery mechanisms. Network access controls may include device compliance checks, registration enforcement, blocking non-compliant access, network segmentation, traffic analysis, software-defined networking, and controls for IoT devices. Secure app development may include coding standards, security testing, approved libraries, code signing, secure app configuration, containerization, least-privilege enforcement, and runtime protection features.

Third-party risk management may include evaluating the security of third-party apps and services, conducting vendor assessments, enforcing contractual security terms, monitoring access to corporate data, applying data sharing controls, ensuring regulatory compliance, managing SLAs, and performing regular audits and penetration tests.

Cloud security may involve securing cloud service configurations, using CASB tools, enforcing encryption and key management, applying IAM controls, auditing usage and compliance, managing cloud security posture, and deploying mobile threat monitoring in the cloud. IoT and peripheral security may include enforcing policies for connected IoT devices, requiring authentication and access control, encrypting communications, detecting anomalies, managing firmware updates, securing peripheral connections like Bluetooth and NFC, and using whitelisting/blacklisting.

Compliance management may involve meeting industry regulations (e.g., HIPAA, PCI), mapping requirements, enforcing data location rules, maintaining audit trails, performing compliance audits, enabling automated monitoring and alerts, and training employees. Business continuity and disaster recovery may include device backup and restore procedures, encrypting stored backups, enabling remote wipe and provisioning, planning for mobile outages, testing recovery processes, using geographically distributed device management, and enforcing sync and replication policies. Future-proofing may include monitoring emerging tech (e.g., 5G, AI), securing AR/VR apps, enforcing policies for wearables and smart devices, protecting mobile payments, conducting risk assessments for new tech, and engaging with industry groups on evolving security standards.

A management rule can enforce use of approved natural language processing ("NLP") models, limits model complexity, and controls sensitive task behaviors (e.g., entity recognition). The management rules can define permissible settings for tokenization, vocabulary, embedding techniques, sequence length, attention mechanisms, and model architecture (e.g., transformer variants like BERT or GPT). Parameters also constrain downstream tasks like sentiment analysis, translation, and summarization.

Management rules for computer vision can control image input formats, data augmentation methods, convolutional layer settings, detection/segmentation architecture types, normalization strategies, and model adaptation techniques. This ensures compliant image processing agents, restricts use to validated architectures (e.g., YOLO, U-Net), and supports auditability of vision-based predictions.

Management rules can also relate to AI model analysis or recommendations. The rules can govern temporal model parameters such as lookback windows, forecasting horizons, statistical model types (ARIMA, exponential smoothing), and evaluation metrics. This can maintain consistent forecasting methodologies across deployments, supports robust anomaly/change detection, and enables explainability through parameter transparency. Rules can set allowed similarity measures, filtering strategies, embedding dimensions, hybrid modeling techniques, and performance metrics. These types of management rules help ensure fairness and consistency in personalized recommendations, support explainable logic for content delivery, and constrain recommendation scope across domains.

Dataset management rules can apply transformation or validation rules at dataset ingestion or during AI agent execution (e.g., scaling, encoding, sampling). These parameters can be tied to specific datasets or agent stages. These rules help enforce preprocessing policies, ensure consistent data quality, and mitigate model training risks (e.g., data leakage or imbalance).

Management rules can also relate to infrastructure. Infrastructure management rules can be based network architecture. For example, parameters include layer types (dense, convolutional, recurrent, transformer, attention), layer counts and sizes, activation functions, dropout rates, normalization settings, skip and attention mechanisms, pooling and upsampling strategies, convolutional kernel configurations, recurrent layer variants (LSTM, GRU), transformer hyperparameters (e.g., heads, hidden sizes, positional encoding), and techniques such as sparse connectivity and weight sharing.

Training Configuration management rules can be based on parameters that include loss functions, optimizers and their hyperparameters, learning rates and decay schedules, momentum settings, batch size, epochs, early stopping, gradient clipping, regularization, initialization methods, data augmentation, class/sample weighting, label smoothing, mixed precision and distributed training support.

Hyperparameter Tuning object parameters include search algorithms (grid, random, Bayesian, evolutionary), parameter ranges and distributions, validation strategies, scheduling (e.g., learning rate, dropout), search space pruning, early stopping, parallel tuning, and multi-objective optimization. Regularization Techniques object parameters include dropout probability (standard, variational, Gaussian), L1/L2 regularization, early stopping, weight decay, gradient noise, stochastic depth, cutout, label smoothing, activation constraints, and semi-supervised techniques such as consistency regularization and pseudo-labeling.

Data Preprocessing object parameters include techniques used for normalization, scaling, splitting, shuffling, handling missing and categorical data, feature selection and extraction (e.g., PCA, UMAP, autoencoders), preprocessing for text, image, sequence, and audio data, batch generation strategies, outlier removal, and domain-specific feature engineering.

Model Evaluation and Selection object parameters include evaluation metrics for classification, regression, and generation tasks; validation and test strategies; threshold optimization; model selection criteria; ensembling methods; compression (e.g., pruning, distillation); interpretability (e.g., SHAP, LIME); statistical significance testing; and task-specific performance metrics.

Optimization and Deployment parameters include inference batch size and performance tuning, hardware targeting (CPU, GPU, TPU, edge), serving frameworks, containerization and orchestration, CI/CD, A/B testing, model versioning, compression, profiling, explainability, security, privacy, and regulatory compliance.

Still more management policies can relate to data processing (e.g., ingestion). The rules can define and enforce permissible behaviors and configurations for data acquisition, processing, and governance. When applied via configuration profiles, they ensure data integrity, compliance, consistency, and operational efficiency throughout an AI agent. Data source object parameters can define the origins, methods, and frequency of data acquisition (e.g., sensors, APIs, web scraping); ensuring data quality, security, versioning, and controlled access. These rules enforce trusted sources, secure collection, approved storage formats, retention policies, and ingestion schedules.

The management rules can relate to data validation and testing. These rules can be used for automated quality checks, including constraints, data consistency, completeness, and type validation. These enforce threshold-based rejection, automated alerts, and validation prior to use in model training or analytics. Data privacy enforcement can define privacy-preserving techniques (e.g., anonymization, masking, encryption) and compliance measures (e.g., GDPR, HIPAA). This enforces data minimization, consent policies, secure transmission/storage, and access restrictions. Such rules also control versioning strategies, data lineage tracking, schema evolution, metadata, and access controls. This helps ensure reproducibility, audit trails, and regulatory compliance across data lifecycle stages.

Data pre-processing object parameters define the permissible transformations and operations applied to raw data prior to model training or analytical processing. These parameters may govern data cleaning techniques such as handling missing values, outlier detection, and normalization; transformation methods including feature scaling, encoding, dimensionality reduction, and feature extraction; and security measures such as anonymization, encryption, and access control. The configuration may also specify strategies for data partitioning, indexing, compression, and parsing, as well as techniques for handling various data types, including tabular, text, image, audio, video, time series, graph, and geospatial datasets. Additional parameters may define rules for data splitting and partitioning into training, validation, and test sets using deterministic or random sampling methods, stratification, or time-based splits to ensure reproducibility and prevent data leakage. The pre-processing configuration may further encompass data augmentation settings tailored to specific modalities, such as image transformations, text paraphrasing, audio perturbation, or synthetic oversampling for imbalanced datasets. Labeling and annotation parameters may define approved tools, workflows, and quality control mechanisms to ensure accurate and consistent ground truth generation. Data visualization parameters may specify approved visualization libraries and methods for exploratory analysis, interpretability, and stakeholder communication. Performance-related parameters may define optimization techniques for storage, transfer, indexing, and distributed processing to ensure efficient agent execution. The use of these parameters facilitates consistent, secure, and policy-compliant data preparation across agent executions.

Data post-processing object parameters define operations applied to processed or analyzed data to validate results, transform outputs, integrate with external systems, or prepare data for downstream use, reporting, or storage. These parameters may govern post-processing validation checks to ensure data integrity, consistency, completeness, uniqueness, and anomaly detection, along with automated reporting, dashboard integration, and quality monitoring. Transformation and enrichment settings may include additional data normalization, encoding, filtering, aggregation, and anonymization, as well as enrichment with external sources or derived attributes. Integration and consolidation parameters may define permissible extract-transform-load (ETL) operations, schema alignment, data merging, and synchronization with other platforms or governance frameworks. Aggregation parameters may include statistical summarization, pivoting, rollup operations, time series resampling, and summarization of text, audio, video, or spatial data. These post-processing configurations support compliance with data governance policies, enhance data usability, and ensure that final outputs conform to organizational, regulatory, and performance standards.

Figure 3:
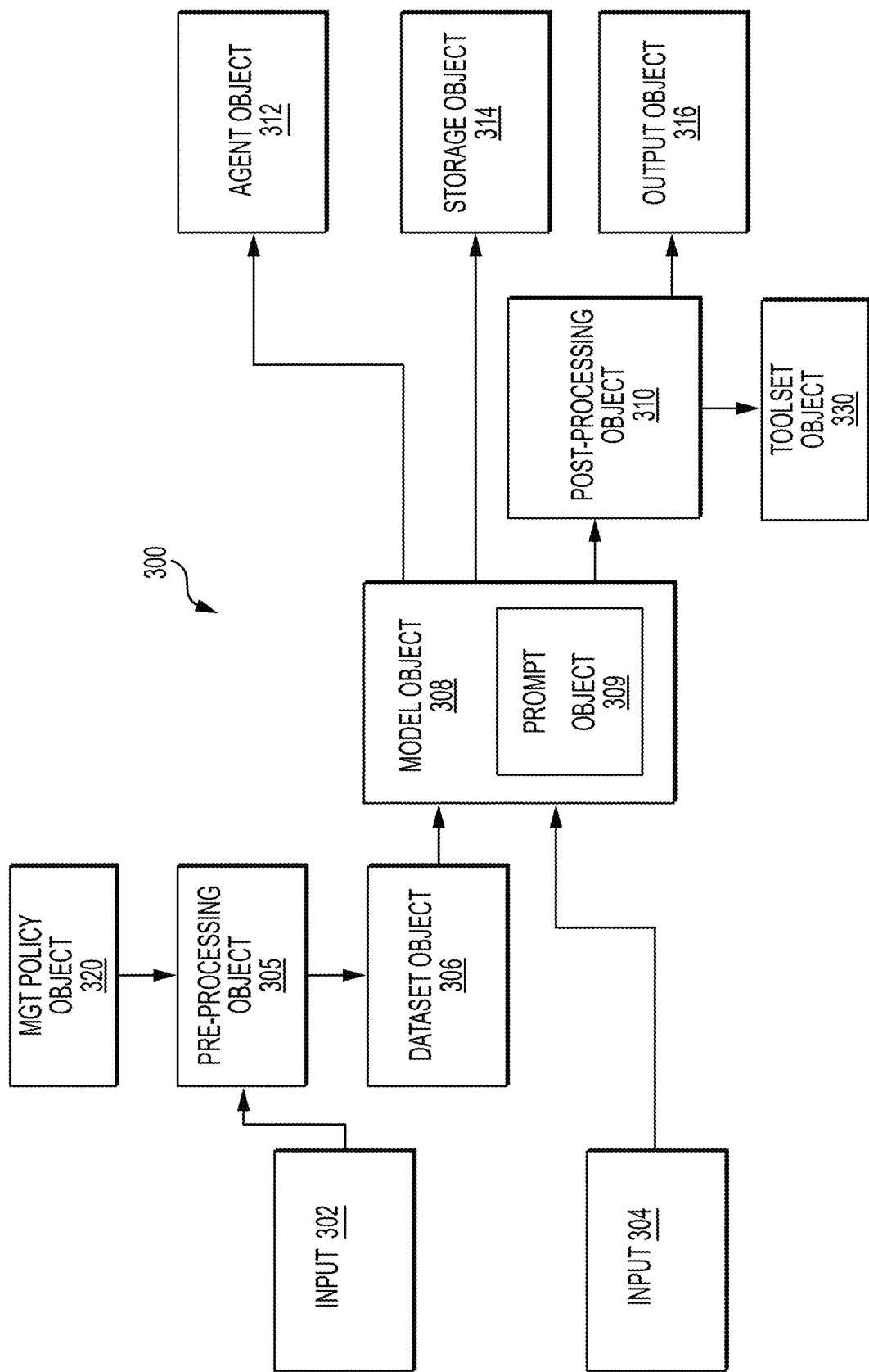
FIG. 3 illustrates an exemplar AI agent, according to various embodiments.

FIG. 3 illustrates an exemplary AI agent 300, according to various embodiments. The AI agent 300 can display on a UI of an administrator console, and each agent object can be placed in the UI to create the AI agent 300. As shown, the AI agent 300 includes two input objects 302 and 304, a preprocessing object 305, a dataset object 306, a model object 308, a prompt statements object 309, a post-processing object 310, an agent object 312, a storage object 314, an output object 316, a management policy object 320, and a toolset object 330. Further, the AI agent 300 indicates the relationships between objects 302, 304, 306, 308, 309, 310, 312, 314, and 316.

The system can cause display of the UI by sending code from a server to a user device, which renders in a browser. In another example, the server sends code to a different client application, causing the UI to display in the client application.

The input objects 302 and 304 define inputs into the AI agent 300. In some embodiments, each of the input objects 302 and 304 can define a user input or stored data to be retrieved as input. For example, the user input could be a question entered by a user into a UI provided by the AI platform application 115 or the AI application 145. As another example, the stored data could include a profile, or a summarization of previous conversations with an AI model by the same user that is retrieved from a database. Both input objects 302, 304 can be defined to receive a particular type of content or information from the AI application 145.

A preprocessing object 305 can include code that examines or modifies the content of input object 302 as a prerequisite to further stages in the AI agent. For example, the preprocessing object 305 can check for malicious code, such as embedded prompts, queries that attempt to reveal system prompts, and other attempts to harm the system or circumvent controls. The pre-processing can also format the input for use within further stages of the agent. For example, images in an email signature line can be stripped out before the email content is passed to an embedding model for vectorization.

As another example, the preprocessing object 305 can be used for redacting PII before it is sent to a generative model, such as an LLM. The recognized PII can be replaced with encrypted information, and a decryption mechanism, such as a key, hash, password or other information, can be supplied by the AI agent 143 to the AI platform. The decryption mechanism can be stored separately from the content with the removed PII, in an example. The decryption mechanism can allow the user or other authorized users to decrypt and reinsert the PII at a later time.

In another example, a management policy object 320 can be used to apply management policies to the pre-processing object 305 or other objects in the AI agent 300. The management policy can allow an administrator to define conditions that are user specific and based on compliance. For example, a user or application might only be able to access a dataset from within an AI application on a compliant device, when the user is located within a whitelisted geography or outside of a blacklisted geography.

The management policies can be stored on a server and can relate to a user, device, model object, prompt object, dataset object, toolset object, and endpoint. For example, user policies can be specific to a user or a group of users. Device policies can apply to specific devices or device types. Model policies can govern use of particular AI models. Prompt policies can govern which prompts must be included and which ones are disallowed. Dataset policies can control which datasets or portions of those datasets are available for use in the agent. Toolset policies can govern what code and software is executable as part of an agent. And endpoint policies can generally govern access and execution of the agent itself.

Management policies related to the agent itself can limit model types that are available for use. For example, an agent policy can disallow public model inference endpoints such as OPENAI or ANTHROPIC. An agent policy can require only platform-hosted models, only on-prem hosted models, or only specific model files that have been validated for security. The policy can be applied to the entire agent or just specific console users, specific dataset objects, and the like. In one example, a model policy can be applied that allows only models below a configured cost per token to be used in the agent. Cost per token for different models can be configured in a fixed configuration or pulled dynamically from the model provider(s).

In the agent 300, the preprocessing object 305 can include a management policy check based on management policy object 320. If the user and device comply with the management policy check, then the dataset object can be accessed. If not, then information from the dataset object 306 is not fed to the model object 308.

Another management scenario arises when a UI administrative user has access to a dataset for purposes of adding the dataset to an agent but does not have access to some or all of the content of the dataset. In this case, permissions can be validated at agent runtime to ensure that whatever content from the dataset is needed by the model(s) is in fact accessible to the end user executing the agent.

The dataset object 306 defines a dataset from which chunks of text that are relevant to input from the input output 302 can be retrieved for inclusion, along with outputs of the input object 302 and the input object 304, in the context window of a prompt that is input into an AI model defined by the model object 308. In some embodiments, the dataset is generated by (1) dividing text data (e.g., text from documents) in a data source into chunks of a predefined length (e.g., a predefined number of tokens), and (2) processing the chunks using a trained embedding model that generates embeddings of the chunks in a high-dimensional latent space. For example, in some embodiments, each of the embeddings can be a vector of numbers that represents the semantic meaning of a corresponding chunk of text data. Once generated, the embeddings can be stored in, e.g., the vector database 122 and used to perform embedding searches that identify chunks of text data that are relevant to one or more inputs. The chunks of text can then be included in the context window of a prompt to an AI model with an instruction for the AI model to, for example, only answer based on the relevant chunks. As another example, the relevant chunks can be included as few-shot examples in a prompt. In some embodiments, the dataset object 306 can specify (1) one or more data sources, (2) a chunk size, (3) one or more embedding models used to generate embeddings from chunks, (4) a similarity metric used in embedding searches to compare embeddings of inputs with the embeddings generated from chunks, and (5) a similarity threshold for selecting a number of chunks and/or a maximum a number of chunks to include in the context window of a prompt. In some embodiments, the dataset object 306 can also specify a schedule for generating embeddings of chunks of source data so that the embeddings are updated if the source data changes. Although described herein primarily with respect to generating embedding using a single selected embedding model, in some embodiments, any number of embeddings can be generated for each dataset using any number of embedding models specified in a dataset object.

In one example, the chunks are not a predefined length. For example, the chunks can be sentence-based. In that approach, chunking uses a sentence-segmentation technique, such that individual sentences are treated as chunks, regardless of their length or punctuation. Chunks with this technique can be of variable length.

Chunking can also be done using semantic understanding. In this technique, text can be sent to a LLM, with prompt instructions to split it into individual chunks that best capture meaning. Based on how the prompt instruction are given, chunks with this technique can be fixed or variable length.

The model object 308 defines an AI model (e.g., one of the models 117, 148, or 160) to use. Any technically feasible AI model can be specified by the AI model 308 in some embodiments. For example, an artificial neural network, such as a language model (e.g., a large or small language model), a generative pre-trained transformer (GPT) model, a multi-modal model, a visual language model, and/or the like can be specified in some embodiments. The AI model can also be trained from scratch or a fine-tuned version of a previously trained model. Further, the specified AI model can execute locally on the same computing device or remotely, such as in a datacenter or cloud computing environment. In addition, in some embodiments, the model object 308 can abstract away the conversion and/or normalization of data into a format that is suitable for input into the AI model, so that a user does not need to The prompt statements object 309 defines zero or more statements to include in the context window of prompts that are input into the AI model of the model object 308. Any suitable user-specified or predefined statement(s) can be included in some embodiments. For example, the following statement could be used to instruct the AI model to generate an answer only using information from the chunks of data generated by execution of the dataset object 306, and to cite a reference and document name used to generate the answer: "You are a helpful assistant. Above is some helpful context. Answer the question, and only use the information above. Cite the exact reference and document name you used to answer." Such a statement could be entered by a user or selected by the user from a predefined list of statements. As another example, the following statement could be used to instruct the AI model to not mention product X when answering a question: "When answering the question, do not mention product X in your answer." As a further example, one or more statements can be used to specify one or more tools, such as publicly available tools (e.g., tools for checking the weather, retrieving or sending data, etc.) that are accessible via application programming interfaces (APIs), that the AI model can use and how to access such tools. As yet another example, a statement can instruct the AI model to respond that it cannot answer a question if no chunks of relevant text included in a prompt to the AI model.

The post-processing object 310 defines post processing to be performed on an output of the AI model defined in the model object 308. Any technically feasible post processing can be performed in some embodiments. For example, the post-processing could include redacting an answer generated by the AI model using another AI model or custom program code to remove sensitive and/or undesirable information. As another example, the post-processing could include transforming the answer generated by the AI model from one format to another format.

Post-processing can also include moderation. For example, code can check that the answer is within acceptable formatting, limits, and subject matter relevance. The moderation can also check for issues, such as prompt leakage.

Post-processing can also unredact previously redacted portions of a dataset or other data if the user has the required privileges to do so. If redaction is carried out by the pre-processing step, the post-processing step can support unredaction of the content back to the original fields. In one example, if the redacted information belongs to the user, then the post-processing can unredact that information. Similarly, a user having access to redacted information can cause the post-processing object 310 to unredact the information. In an example where the user has the requisite access criteria, a stored mechanism for unredaction, such as a key, can be retrieved based on a content identifier or chunk metadata associated with the content. The unredaction mechanism can then be applied against redacted information to decrypt it.

The agent object 312 defines another agent that takes as input an output of the AI model defined by the model object 308. Any suitable other agent can be specified by the agent object 312. For example, the other agent can include (1) an input object that specifies the agent object 316 as an input source; and (2) one or more other objects, such as dataset object(s), model object(s), etc., that define how the output of the AI model defined by the model object 308 is processed.

The storage object 314 defines a manner of storing output generated by the AI model of the model object 308. In some embodiments, the storage object 314 can specify any technically feasible storage mechanism. For example, in some embodiments, one type of storage object can define that output of the AI model and other conversation history is stored in memory. As another example, in some embodiments, one type of storage object can define that output of the AI model and other conversation history is summarized in a particular format (e.g., JavaScript Object Notation (JSON) format) by the same or a different AI model, and the summary is stored in a database. In such cases, an input object (input object 302 or 304) of the AI agent 300 or another AI agent can also define that the output of the AI model and the conversation history that is stored in memory or summarized and stored in the database is retrieved for inclusion in the context window of a prompt.

The output object 316 defines how to output the post-processed output generated by executing the post-processing object 310. Any suitable output can be specified by the output object 316 in some embodiments. For example, the output object 316 could specify that the post-processed output is displayed to a user. As another example, the output object 316 could specify that the post-processed output is transmitted to another application for further processing.

Although the AI agent 300 that includes the objects 302, 304, 306, 308, 310, 312, 314, and 316 is shown for illustrative purposes, in some embodiments, a user can define any suitable AI agent that includes one or more input objects, one or more model objects, and zero or more other objects, as well as any suitable relationships between the objects. More generally, in some embodiments, the AI platform application 115 can permit a user to define any suitable objects by specifying parameters thereof, and then add one or more of the objects to AI agents that relate the added objects. Examples of other types of objects include a pre-processing object that defines pre-processing to perform on inputs and/or retrieved chunks of text data from a dataset, a custom code object that defines custom program code to execute, a throttling object that throttles the use of an agent by a user so that users cannot abuse the agent, a data retention policy object that causes certain data generated by an agent to be stored for a certain period of time. For example, the custom program code could be used to perform pre-processing, to perform post-processing, to provide a tool that performs any suitable functionality, and/or the like. In some embodiments, the relationships between objects can also include relationships in which the output of one object is input back into a previous object.

In some embodiments, an AI agent can also define how timeouts and failure scenarios are handled, such as when an AI model does not respond. In some embodiments, an AI agent can also define a schedule (e.g., weekly, daily, etc.) for executing the AI agent, or that the AI agent is executed only via an API call. In some embodiments, an AI agent can also define trying one model (e.g., a low cost model) before another model (e.g., a high cost model).

The agent objects of FIG. 3 can also be set according to object parameters. The parameters available can vary depending on the administration mode. In one example, a simplified mode provides summaries of parameter object parameter packages that are selectable. An expert or developer mode, meant for developers, can allow an administrator to access a more full compliment of available object parameters. For example, in expert mode, the administrator can see and edit the configuration of different blocks and connections via a text-based interface.

Returning to FIG. 2, the dataset manager 216, the AI model manager 218, and the custom code manager 220 manage dataset objects generated by the dataset instantiator 212, model objects, and custom program code required to execute objects, respectively. For example, in some embodiments, the dataset manager 216 can manage the generation of datasets for dataset objects by the dataset instantiator and storage usage of generated datasets; the AI model manager 218 can manage the generation (e.g., training and/or fine tuning) of AI models for model objects and the execution thereof; and the custom code manager 220 can manage the generation, storage, and execution of custom program code for custom code objects.

Other managers 240 can also execute on the AI app service 113, 180. For example, a prompts manager can manage the generation or editing of prompt packages. A toolsets manager can manage the generation or editing of toolsets, such as scripts and code. An endpoint manager can manage the creation and storage of agent endpoints and keys.

A policy manager (also called the AI management service) can manage the generation or editing of management policies. As discussed at length above, computing device 140 access to an AI-enabled app, AI agents, and agent objects can be driven by management policies and compliance rules. These can depend on device states, device configurations, network configurations, datacenter management policies, agent object states, infrastructure states, management groups, and tenancy.

These various states and configurations can be combined to create management policies 230 that are set by the AI management service. As a result of an administrator creating a configuration profile specifying particular settings/values that must be implemented, the AI management service can monitor the various states and configurations to ensure that the management policies are met. The monitoring can determine a user's authorization to execute or access AI-enabled applications, AI agents, and AI agent objects.

The AI management service can monitor agent object states. These monitored states can be data ingestion states, model development and training states, model evaluation and testing states, model deployment and serving states, model monitoring and maintenance states, infrastructure states, and agent and workflow states.

The agent executor 214 orchestrates the execution of AI agents. In some embodiments, the agent executor 214 can orchestrate the execution of each object of an AI agent according to the relationships between the objects. In such cases, execution of the AI agent can proceed from input object(s) to object(s) that take as input the output of the input object(s), and so forth, until all objects of the AI agent have been executed.

The API 222 exposes functions that can be called by other software, such as the client application 145, to interact with AI platform application 115. For example, in some embodiments, the functions can include functions for defining objects and AI agents, functions for testing AI agents, functions for executing AI agents subsequent to testing, and/or the like.

Compliance rules can encompass configurable criteria that must be met for a client device to be considered "in compliance" with the AI agent management service. These rules can be determined based on various factors such as the geographical location of the client device, its activation and management enrollment status, authentication data (including data obtained by a device management system), time, date, and network properties, among others. User profiles associated with specific users can also influence the compliance rules. User profiles are identified through authentication data linked to the client device and can be associated with compliance rules that take into account time, date, geographical location, and network properties detected by the device. Furthermore, user profiles can be connected to user groups, and compliance rules can be established based on these group associations.

Compliance rules set predefined constraints that must be satisfied for the AI agent management service or other applications to allow access to enterprise data or other features of the client device. In certain cases, the AI agent management service interacts with a management application, migration application, or other client application running on the device to identify states that violate one or more compliance rules. These non-compliant states can include the detection of viruses or malware on the device, the installation or execution of blacklisted client applications, or the device being "rooted" or "jailbroken," which grants root access to the user. Other problematic states can involve the presence of specific files, suspicious device configurations, vulnerable versions of client applications, or other security risks. Sometimes, the migration service provides the compliance rules, which are based on the rules of the previous management service. Alternatively, the compliance rules can be directly configured in the AI agent management service by an administrator.

Figure 4:
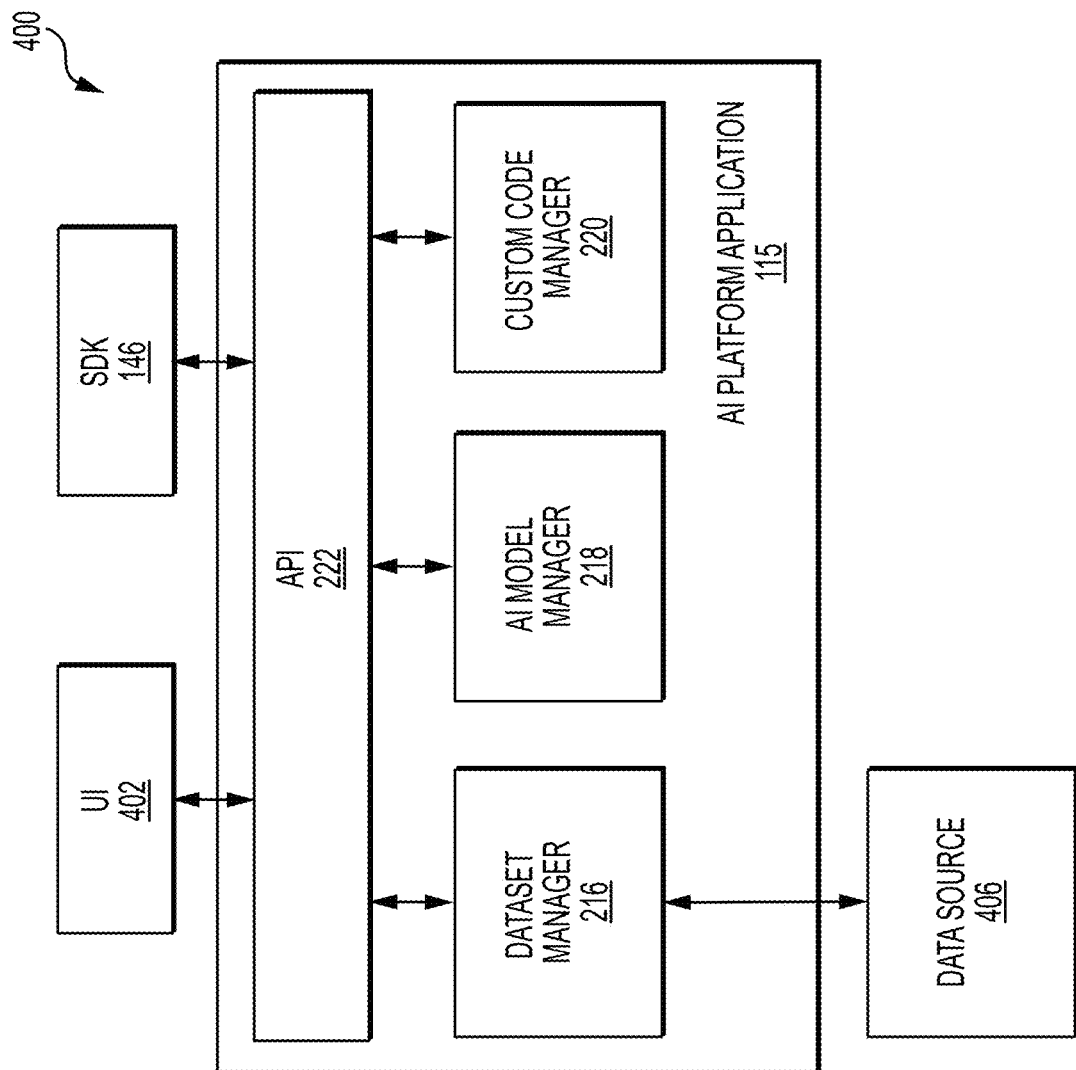
FIG. 4 illustrates exemplar interactions with the AI platform application of FIG. 1B, according to various embodiments.

FIG. 4 illustrates exemplary interactions 400 with the AI platform application 115 of FIG. 1B, according to various embodiments. As shown, a UI 402 and the software development kit (SDK) 146 of the client application 145 communicate with the API 222 of the AI platform application 115. Further, the API 222 is in communication with the dataset manager 216, the AI model manager 218, and the custom code manager 220. In addition, the dataset manager 216 is in communication with a data source 406. In operation, a user, such as an IT administrator, can use the UI 402 to define an agent, including objects thereof and relationships between the objects. User interactions with the UI 402 are translated (by, e.g., a web application or software develop application) to API calls to the API 222, which in turn cause the dataset manager 216, the AI model manager 218, and the custom code manager 220 to, based on the API calls, manage the generation and storage of dataset objects from the data source 406 (and/or other data sources), model objects, and custom code objects, respectively, as described above in conjunction with FIG. 3.

The SDK 146 of the client application 145 permits the client application 145 to make API calls to the API 222 to access AI agents 116 maintained by the AI platform application 115. For example, in response to a user of the client application 145 entering a question into a text field within a UI provided by the client application 145, the client application 145 could use the SDK 146 to make an API call to the API 222 to execute one of the AI agents 116 for processing the question. In some embodiments, the SDK 146 can also include agents and/or AI models that permit local execution of the agents and/or AI models, without having to access the API 222.

The UI 402 can present different functions and options based on which mode the administrator selects. In a developer mode, a full complement of parameters can be available. Whereas in a normal mode, a more limited but understandable set of options can be presented that triggers preset packages of parameters for the agent objects.

Figure 5:
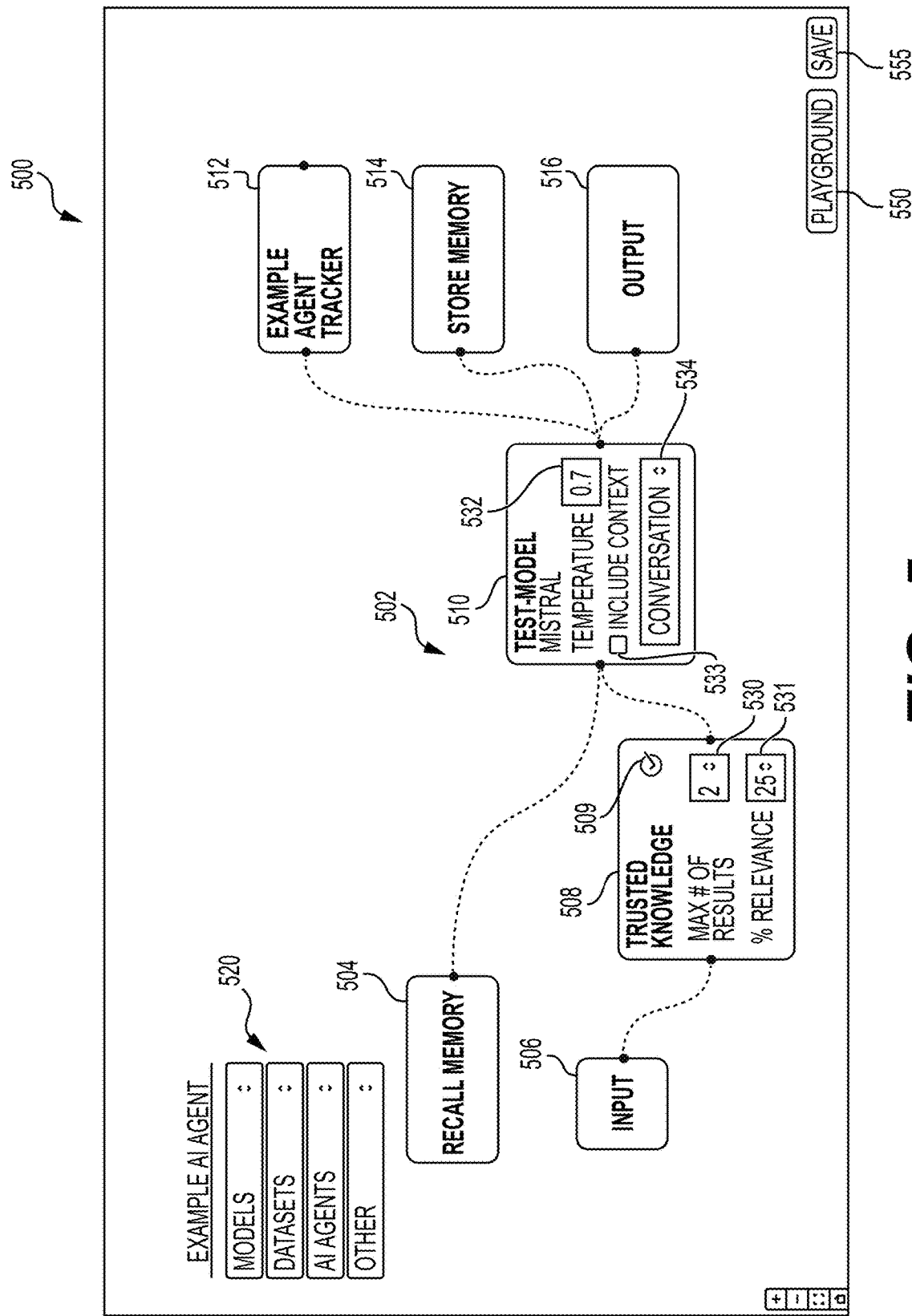
FIG. 5 illustrates how an AI agent can be designed using an exemplar UI, according to various embodiments.

FIG. 5 illustrates how an AI agent can be designed using an exemplar UI, according to various embodiments. As shown, a UI 500 displays a graphical representation of an AI agent 502 named "Example Agent." The graphical representation of the AI agent 502 includes boxes 504, 506, 508, 510, 512, 514, and 516 representing objects in the AI agent 502 and dashed lines between certain boxes representing relationships between the objects that are represented by the boxes. The UI 500 also includes a menu section 520 that provides menus for a user to select model objects, dataset objects, agents, and/or other objects for inclusion in the API agent 502. Using the menu section 520, a user can drag-and-drop objects from the menus and add relationships (shown as dashed lines) between such objects and one or more other objects to design an AI agent, such as the AI agent 502. The UI 500 also permits a user to move the boxes 504, 506, 508, 510, 512, 514, and 514 within the UI 500, as well as to change the relationships between objects.

Illustratively, the box 504 represents an input object named "Recall Memory" that retrieves a conversation history, and the conversation history is stored in memory by an output object named "Store Memory" that is represented by box 514. The box 506 represents another input object named "Input" that specifies a user input, such as a question entered into a text field within a UI provided by the client application 145.

The box 508 represents a dataset object named "Trusted Knowledge", and the box 508 includes input fields 531 and 530 that can be used to specify (1) a requirement percentage relevance when retrieving text chunks using an embedding search against the dataset, and (2) a maximum number of text chunks to output, respectively. In addition, the box 508 includes a status indicator 509 that can indicate whether the dataset is ready for use, is being instantiated, is being updated, etc. Illustratively, the status indicator 509 shows a green check mark, indicating the dataset is ready for use. Another status indicator, such as a red X, could be used to indicate that the dataset is not ready for use.

The box 510 represents a model object named "jjm-test-model." Illustratively, the box 510 includes an input field 532 that can be used to adjust a temperature parameter used by an AI model of the model object, a checkbox field 532 that can be selected to include data (e.g., a user role that affects how the AI model should response) from a predefined source in the context window of a prompt, and a drop-down selection field 534 that can be used to select a prompt statements object (i.e., prompt object). As shown, a prompt statements object named "conversation" has been selected. Accordingly, statements defined by the "conversation"

prompt statements object will be included in the context window of each prompt that is input into the AI model of the AI object represented by the box 510. The include context option 533 can allow the user to specify that the AI model should receive contextual information regarding the input, such as device type, time, location, and user information that is known to the system.

The box 512 represents an agent object named "Example Agent—Tracker." The agent object causes outputs generated by the AI model of the model object represented by the box 510 to be input into another AI agent named "Example Agent—Tracker."

The box 514 represents a storage object named "Store Memory" that causes outputs generated by the AI model of the model object represented by the box 510 to be stored, along with other conversation history from a current conversation, in memory (e.g., memory 114). As described, the input object named "Recall Memory" that is represented by the box 504 can retrieve the conversation history that is stored in memory for further processing via the AI agent 502.

The box 516 represents an output object named "Output" that causes outputs generated by the AI model of the model object represented by the box 510 to be displayed to a user. For example, the AI model output could be displayed via a UI provided by the AI platform application 115 or the client application 145.

To test the AI agent 502, the user can select the Playground option 550. The playground can open a query box such that the user can test different queries and inputs to the agent. A separate pane can show the output of the agent. In one example, a package of input queries can be fed into the agent as part of the playground. This is further discussed in connection with FIG. 7, below.

Changes to the agent can be saved by selected the save button 555. The saved agent can then be saved for future retrieval or deployment.

Figure 6:
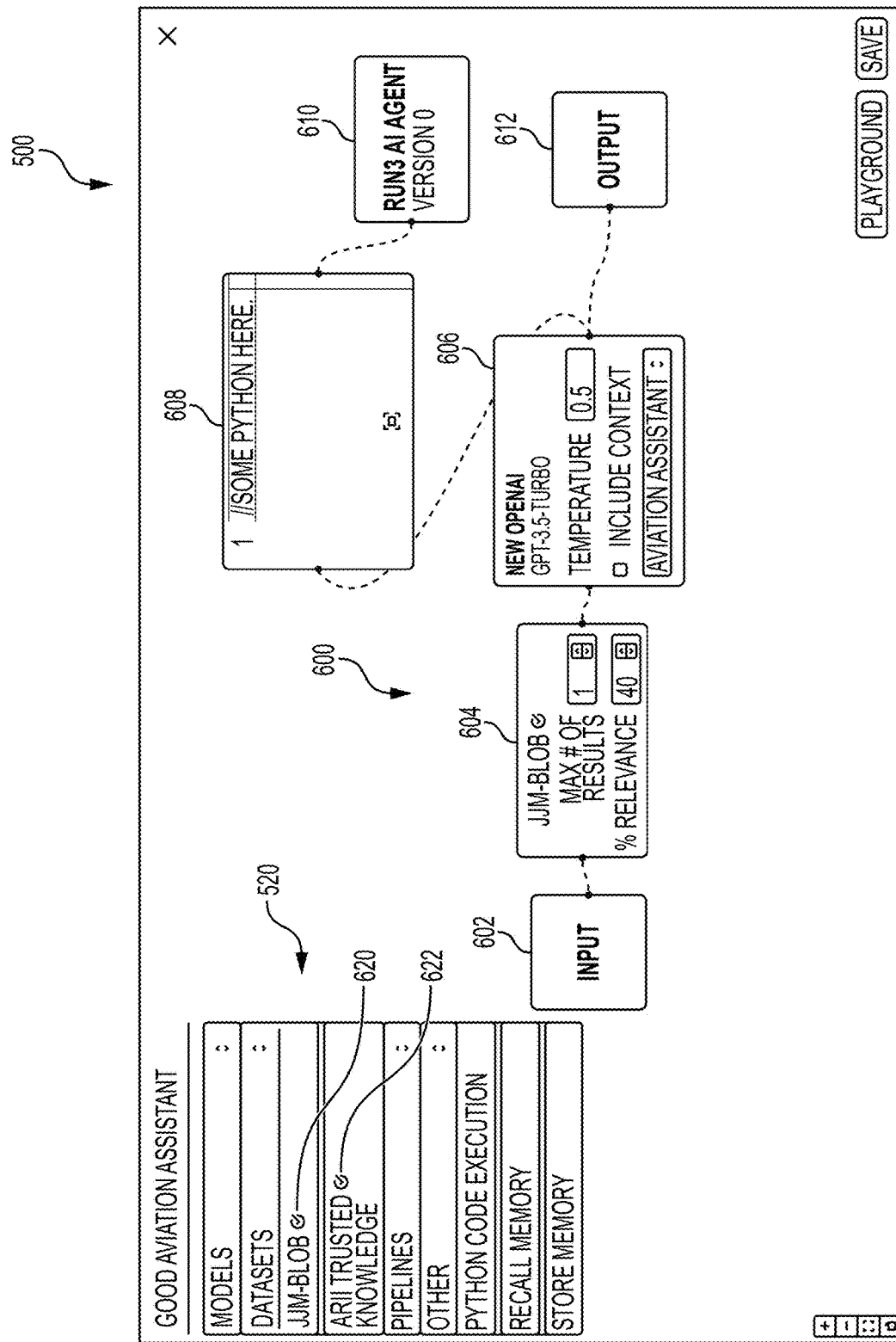
FIG. 6 illustrates how another AI agent can be designed using the exemplar UI of FIG. 5, according to various embodiments.

FIG. 6 illustrates how another AI agent can be designed using the exemplar UI 500 of FIG. 5, according to various embodiments. As shown, a user can select a "Datasets" drop-down menu and an "Other" drop-down menu in the menu section 520 to view available dataset objects and other available objects, respectively. Illustratively, in the "Datasets" drop-down menu, statuses of a "jjm-blob" dataset object and an "Trusted Knowledge" dataset object are indicated using status indicators 620 and 622, shown as checkmarks. By dragging-and-dropping objects from the menu section 520, a user can design an AI agent. For example, to quickly switch from using an outdated AI model to using a new AI model, a user can replace a model object associated with the outdated AI model with a model object associated with the new AI model in an AI agent.

As shown, a UI 600 displays a graphical representation of an AI agent 600 named "Good Aviation Assistant," and the representation of the AI agent 600 includes a box 602 that represents an input object named "Input"; a box 604 that represents a dataset object named "jjm-blob" and permits a user to specify a percentage relevance to use in an embedding search of the dataset and a maximum number of results to output; a box 606 that represents a model object named "New OpenAI" and that permits a user to specify a temperature to use, select to include data from a predefined data source, and select a prompt statements object (shown as a prompt statements object named "Aviation Assistant") to use; a box 610 representing an agent object named "Run3 Agent"; a box 612 representing an output object; as well as the relationships between objects. In addition, the graphical representation of the AI agent 600 includes a box 608 that represents a custom code object and permits a user to input program code for the custom code object. The box 600 can be used to enter any suitable custom code, such as code for post-processing of outputs generated by the AI model of the model object 606, code for other tools, and/or the like. In some embodiments, the user can input any desired program code into a custom code object, such as code for redacting certain information from text data, or code to otherwise modify text data.

The agent objects 604, 606, 608 are connected with dashed lines that visually indicate execution linking. The agent 600 begins at input block 602 and follows the visualized execution flow according to the established execution linking.

Figure 7:
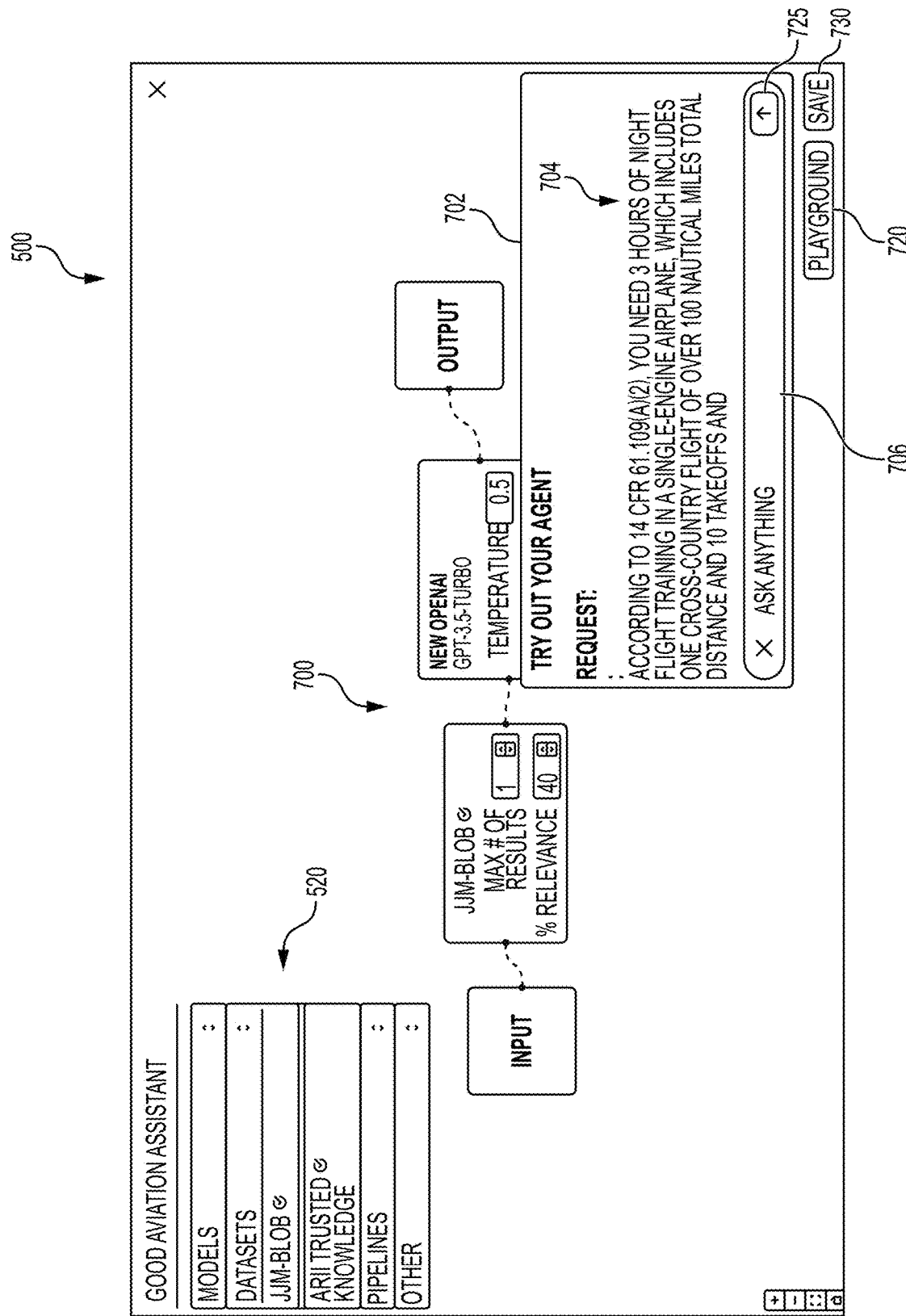
FIG. 7 illustrates testing an AI agent using the exemplar UI of FIG. 5, according to various embodiments.

FIG. 7 illustrates testing an AI agent using the exemplar UI 500 of FIG. 5, according to various embodiments. As shown, using the menu section 520 of the UI 500, a user has designed an AI agent 700 named "Good Aviation Assistant." Illustratively, the UI 500 includes the menu section 520, a representation of the AI agent 700, and an overlay section 702, also referred to herein as the "Playground," that permits a user to test the AI agent 700. In particular, the user can select the playground button 720, and the overlay section 702 is then presented. The overlay section 702 provides an input field 706 that permits a user to enter a question. The user can submit the question by selecting button 725. Given such a question as input, the AI platform application 115 executes the agent 700 to generate an answer to the question. Thereafter, the AI platform application displays an output 704 of the agent 700 in the overlay section 702. Accordingly, after designing an agent, a user can test the agent to understand what outputs the agent generates.

Although the testing of one AI agent using one user question is shown for illustrative purposes, in some embodiments, the AI platform application 115 can present a UI, referred to herein as a "Battleground," that permits a user to test multiple AI agents (e.g., different versions of an AI agent) on the same and/or different inputs and compare outputs generated by the AI agents. In some embodiments, the AI platform application 115 can also present a UI that permits a user to test an AI agent using multiple different inputs in a batch of inputs (e.g., by computing an average score based on outputs of the multiple inputs) and/or one or more inputs that include various conversation histories (including conversation histories generated by previous use of the AI agent). In some embodiments, the AI platform application 115 can also "step through" objects of an AI agent, executing the objects one by one and displaying the output of each object after execution so that a user can debug the AI agent and objects therein. Battleground functionality can be used to test new models and compare results to previous models. The UI can show differential results in an easy to digest way.

In one example, a semantic comparison of the results is performed by using a comparison agent. The comparison agent can score the semantic similarity of each result in a batch. This can be based on sending both results to an LLM, or by vectorizing the results with an embedding model and comparing the vectors. Comparing the results at each step of a batch of queries can be helpful in determining and visualizing where the semantic difference occurs.

In one example, when a semantic difference occurs, the battleground agent can automatically request an additional prompt that would cause the new model to track the semantic meaning of the outputs from the prior model.

In one example, the battlefield can be performed against a historical batch. The answers of the historical batch can be saved. The same questions from the historical batch can be fed into the current agent. The comparison agent can score the semantic similarity of each result in a batch. This can be useful, for example, in detecting semantic drift for the same model without an obvious update. Such differences can arise, for example, when system prompts at the AI model are changed without the public being aware.

The user can commit changes to an AI agent with the save button 730.

AI agents can run in real time. For example, one-to-ten test cases can be performed based on live input. Or the AI agent can run batch jobs. For example, the AI platform can run a new background removal model on existing images.

Figure 8:
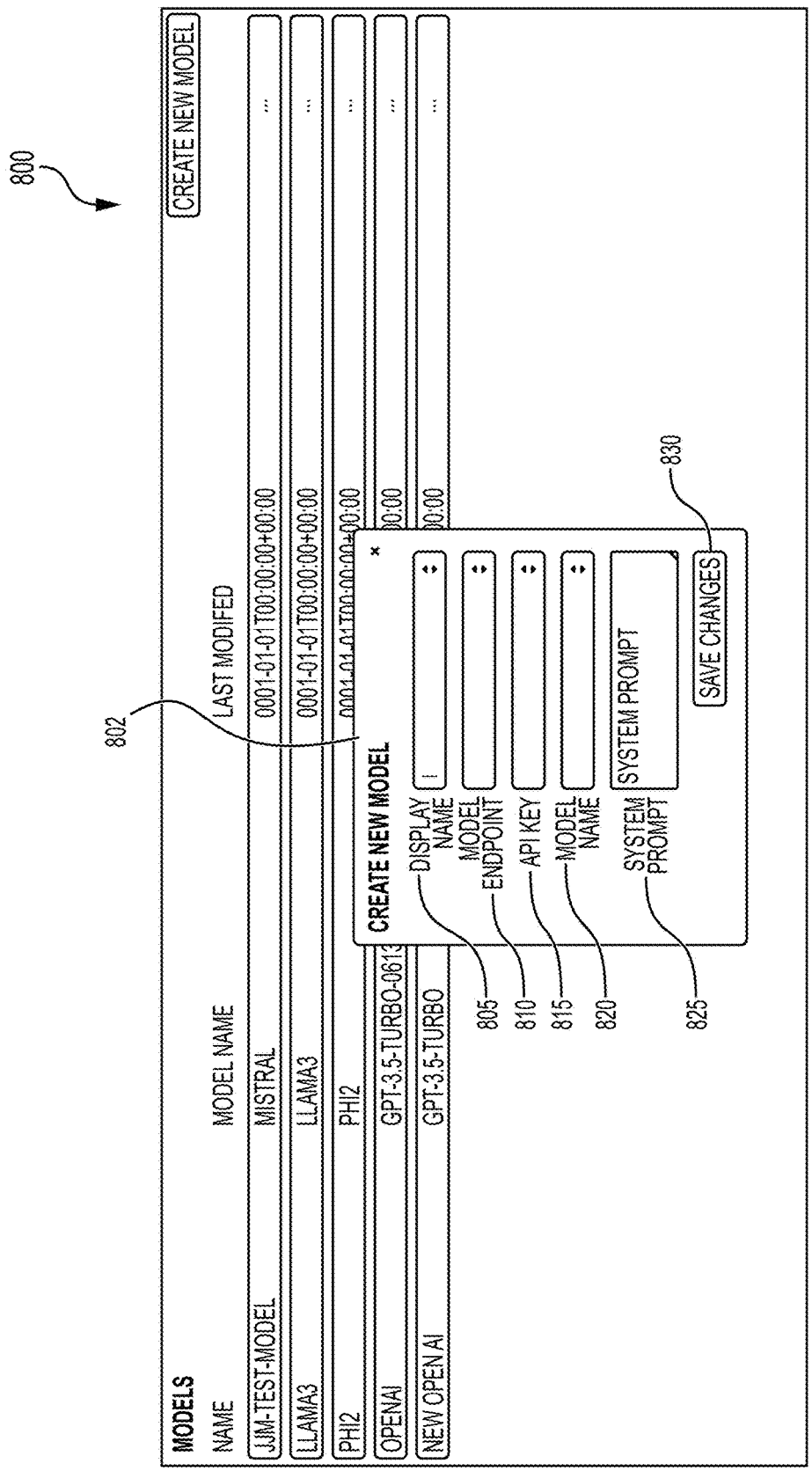
FIG. 8 illustrates an exemplar user interface (UI) for defining a model object, according to various embodiments.

FIG. 8 illustrates an exemplar UI for defining a model object, according to various embodiments. As shown, a UI 800 includes an overlay section 802 named "Generate New Model" that permits a user to define a new model object. Illustratively, the new model object can be defined by inputting, via the overlay section 802, parameters including a displayed name 805 of the model object, and a model endpoint 810 (e.g., a universal resource locator (URL) of an API endpoint for accessing an AI model, a pointer to a local model, or the like) where an AI model for the model object can be accessed. The AI platform 115 can generate an API key 815 for authenticating the AI platform application 115 or other application that calls an API to access the AI model, a name 820 of the AI model, and a system prompt message 825 to include in a context window of each prompt input into the AI model. Given such input parameters, when saved via button 830, the AI platform application 115 generates a new model object. The AI platform application 115 can generate the new model object in any technically feasible manner in some embodiments. For example, in some embodiments, the AI platform application 115 can add, to a database, one or more entries associated with the new model object and including the input parameters. As another example, in some embodiments, the AI platform application 115 can generate code (e.g., using a template and the input parameters) for accessing and utilizing the specified AI model. The generated code can then be executed by the AI platform application 115 and/or deployed to client applications (e.g., client application 145).

Figure 9:
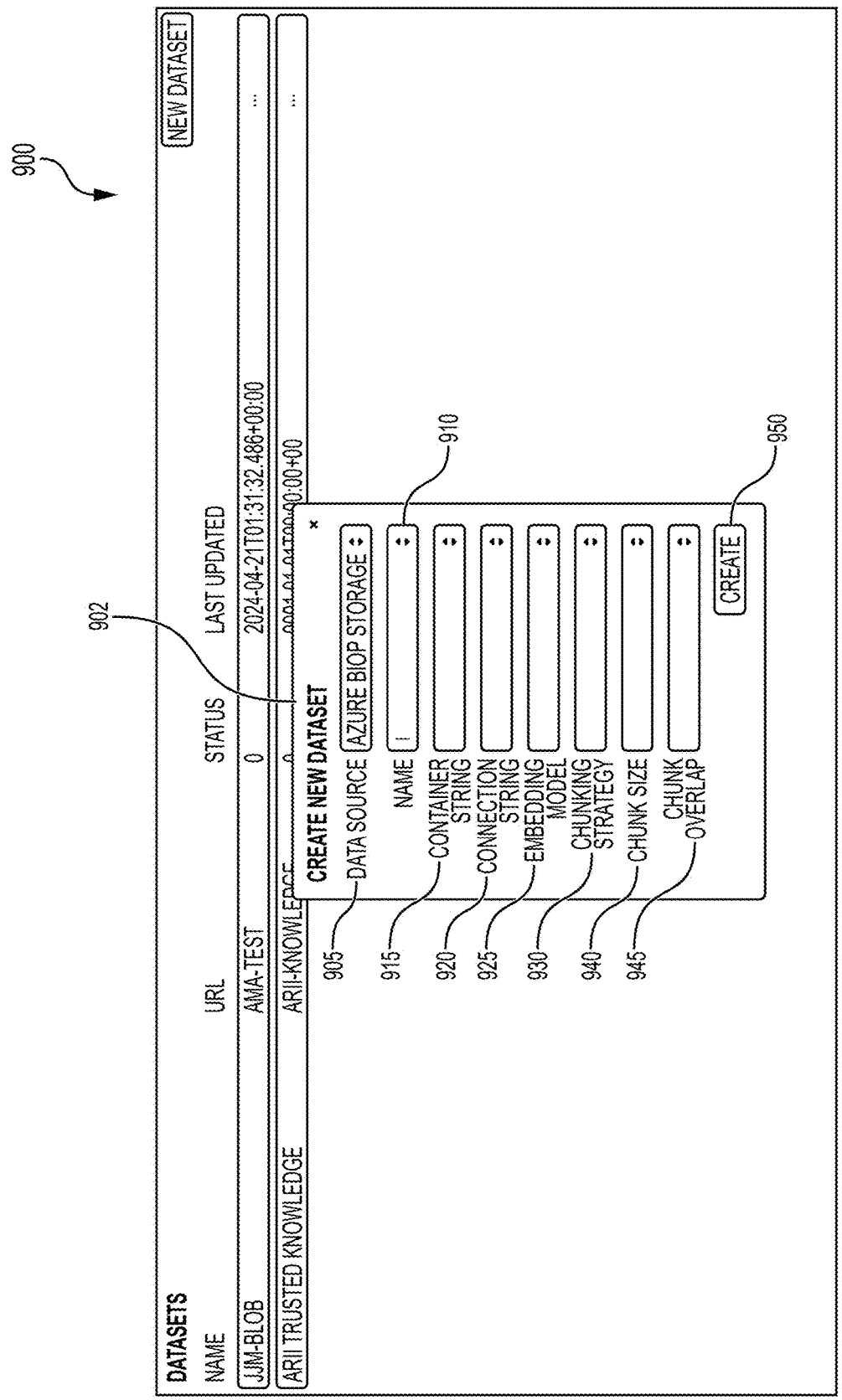
FIG. 9 illustrates an exemplar UI for defining a dataset object, according to various embodiments.

FIG. 9 illustrates an exemplar UI for defining a dataset object, according to various embodiments. As shown, a UI 900 includes an overlay section 902 that permits a user to define a new dataset object. Illustratively, the new dataset object can be defined by selecting the dataset in the data source field 905. The UI allows for inputting, via the overlay section 902, parameters including a name 910 of the dataset object, a name of a container 915 storing a data source, a connection string 920 for connecting to the container, an embedding model 925 for embedding chunks of text data from the data source. The overlay section 902 an also include a chunking strategy 930 for dividing the text data into chunks, a chunk size 940 specifying the size of each chunk (which can be dynamic), and a chunk overlap 945 specifying by how much chunks overlap. The chunk size can actually be a type, such as "paragraph" or "sentence." This can allow for chunking different datasets according to what will provide the most useful semantic meaning. When the user is done making selections, the user can select button 950 to begin the vectorizing of the dataset.

Given such input parameters, the AI platform application 115 instantiates a new dataset object. The AI platform application 115 can instantiate the new dataset object in any technically feasible manner in some embodiments. For example, in some embodiments, the AI platform application 115 can process text data (e.g., documents) from the data source according to the chunking strategy to divide such text data into chunks having the chunk size and overlapping by the chunk overlap. Then, the AI platform application 115 can use the specified embedding model to generate embeddings of the chunks and store the embeddings in, e.g., the vector database 122 for use in embedding searches. In addition, the AI platform application 115 can add, to a database, one or more entries associated with the new dataset object and including one or more of the parameters, and/or the AI platform application 115 can generate code (e.g., using a template and the input parameters) for performing embedding searches on the generated embeddings. The generated code can then be executed by the AI platform application 115 and/or deployed to client applications (e.g., client application 145).

Figure 10:
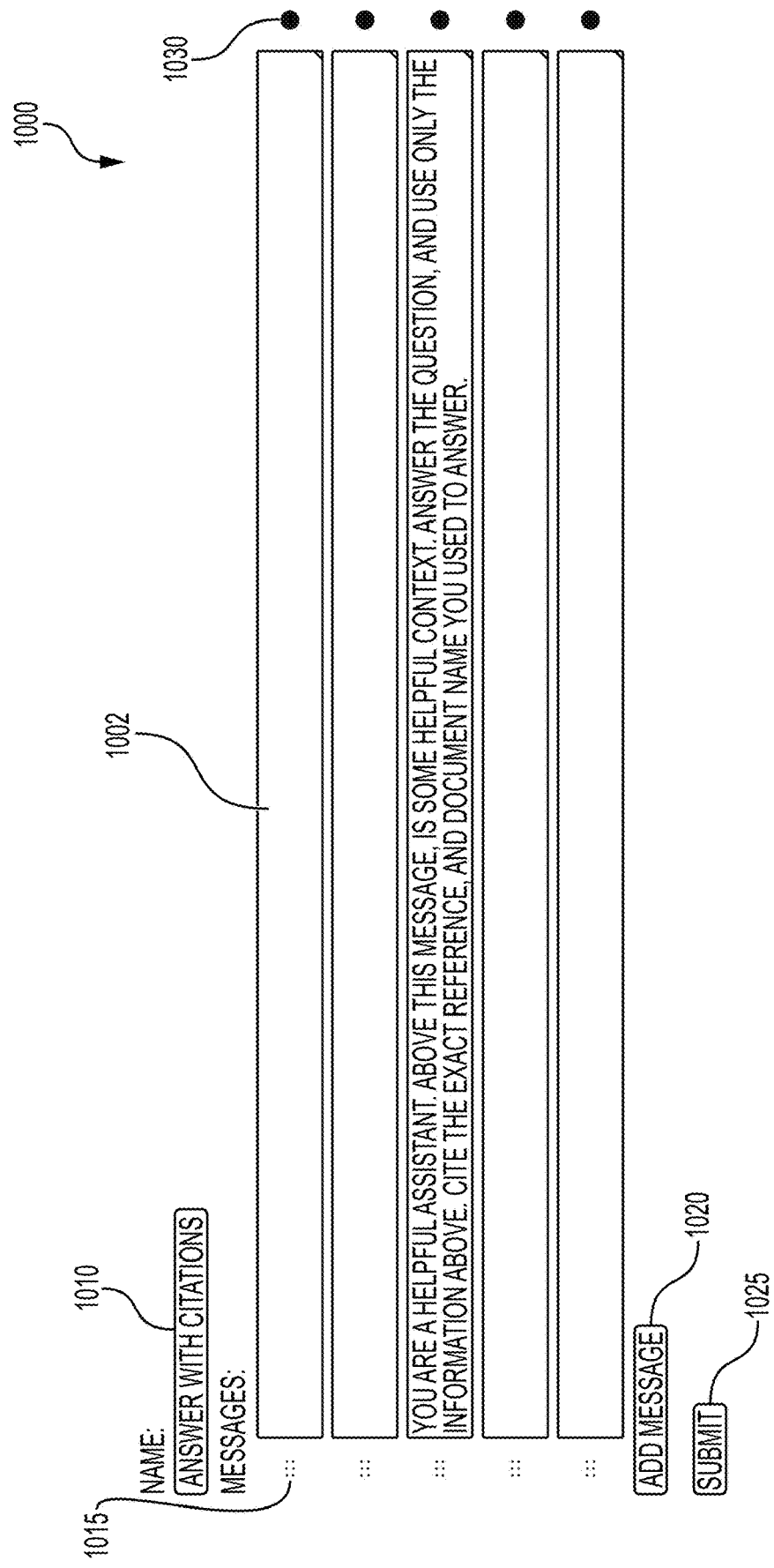
FIG. 10 illustrates an exemplar UI for defining a prompt object, according to various embodiments.

FIG. 10 illustrates an exemplary UI for defining a prompt object (also called a "prompt package" or "prompts"), according to various embodiments. As shown, a UI 1000 permits a user to define a new prompt statements object. Illustratively, the new prompt statements object can be defined by inputting, via input fields 1002 (referred to herein collectively as input fields 1002 and individually as an input field 1002) of the UI 1000, one or more statements to be included in the context window of a prompt that is input into an AI model.

The UI 1000 permits the user to add, edit, and/or remove prompt statements. To add a prompt, the user can select the add message button 1020. In this example, the prompt package is named 1010 "answer with citations." When the user is done editing the prompt package, they can select the submit button 1025 to save any changes.

In addition, the UI 1000 permits the user to re-order the prompt statements, which can affect the behavior of an AI model. The user can reorder the prompts by dragging row indicator 1015 to a different row. The dot 1030 can allow the user to insert a new row at that location. Given the user-input prompt statement(s), the AI platform application 115 can add, to a database, one or more entries associated with the new prompt statements objects and including the prompt statement(s), and/or the AI platform application 115 can generate code for performing generating prompts that include prompt statements. The generated code can then be executed by the AI platform application 115 and/or deployed to client applications (e.g., client application 145).

Figure 11:
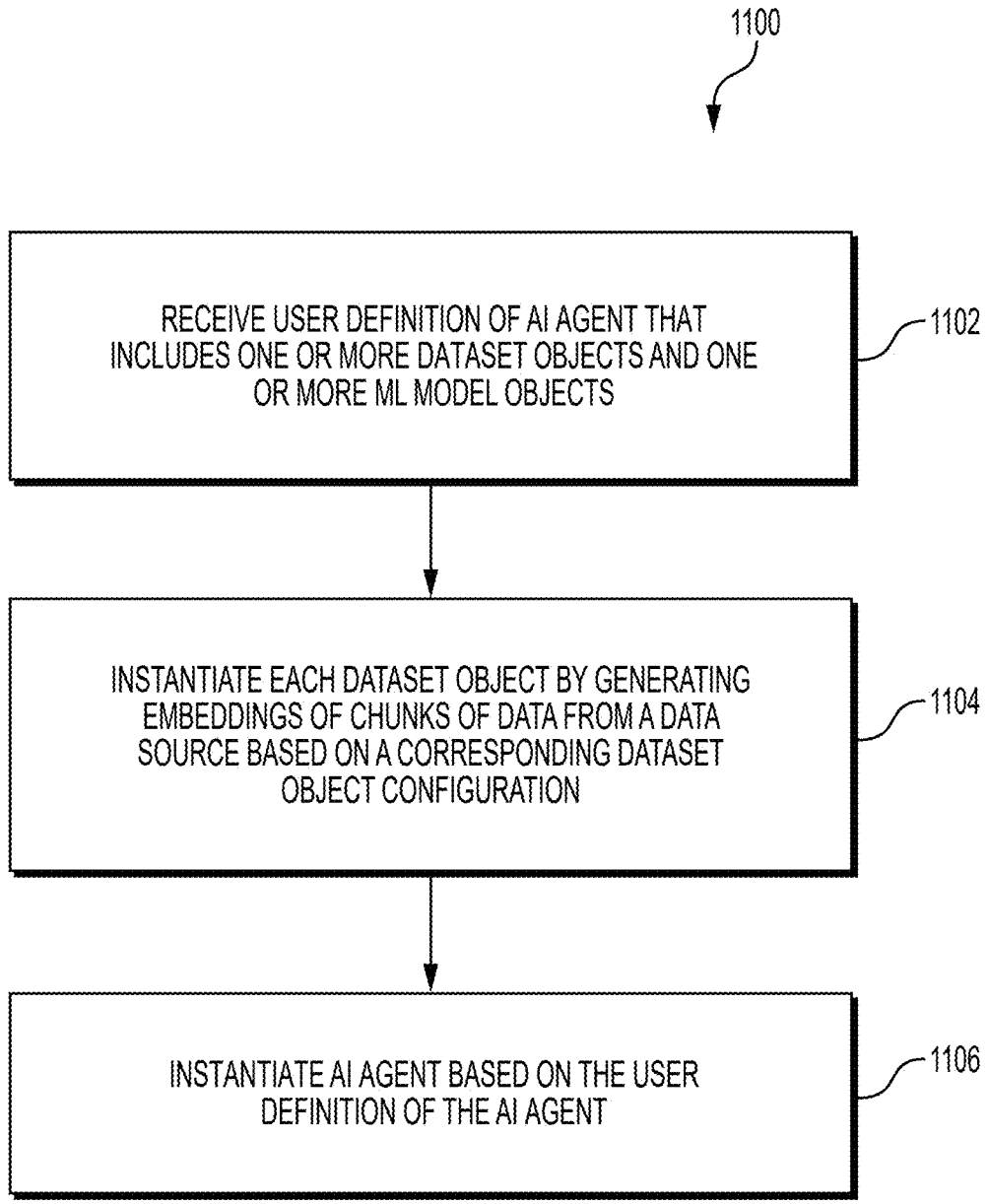
FIG. 11 is a flow diagram of method steps for generating an AI agent, according to various embodiments.

FIG. 11 is a flow diagram of method steps for generating an AI agent, according to various embodiments. Although the method steps are described in conjunction with the systems of FIGS. 1-10, persons skilled in the art will understand that any system configured to perform the method steps in any order falls within the scope of the present embodiments.

As shown, a method 1100 begins at step 1102, where the AI platform application 115 receives a user definition of an AI agent that includes one or more dataset objects and one or more model objects. In some embodiments, the AI platform provides one or more UIs that permit users to (1) define objects by specifying associated parameters, and (2) drag-and-drop and connect such objects to define an AI agent, as described above in conjunction with FIGS. 5-10.

Before allowing a UI connection between objects when building an agent, the AI platform can validate that the output of the first block being connected matches the expected input format of the block it is being connected to. If it does not, the AI platform can indicate the format mismatch on the UI and either prevent the connection of the two blocks in the UI or allow the connection but flagged it as an error condition. In one example, the UI suggests an available format conversion code block as an intermediate step between the two blocks. This can be the case when a code object exists for reformatting the output of the first block into a usable format for the second block.

At step 1104, the AI platform application 115 instantiates each of the dataset object(s) by generating embeddings of chunks of data from a data source based on a corresponding dataset object configuration.

At step 1106, the AI platform application 115 instantiates an AI agent based on the user definition of the AI agent. In some embodiments, the AI platform application 115 can instantiate the AI agent in any technically feasible manner, such as generating program code for the AI agent and/or adding one or more entries associated with the AI agent to a database for future use, similar to the description above in conjunction with instantiating objects in FIGS. 8-10.

Figure 12:
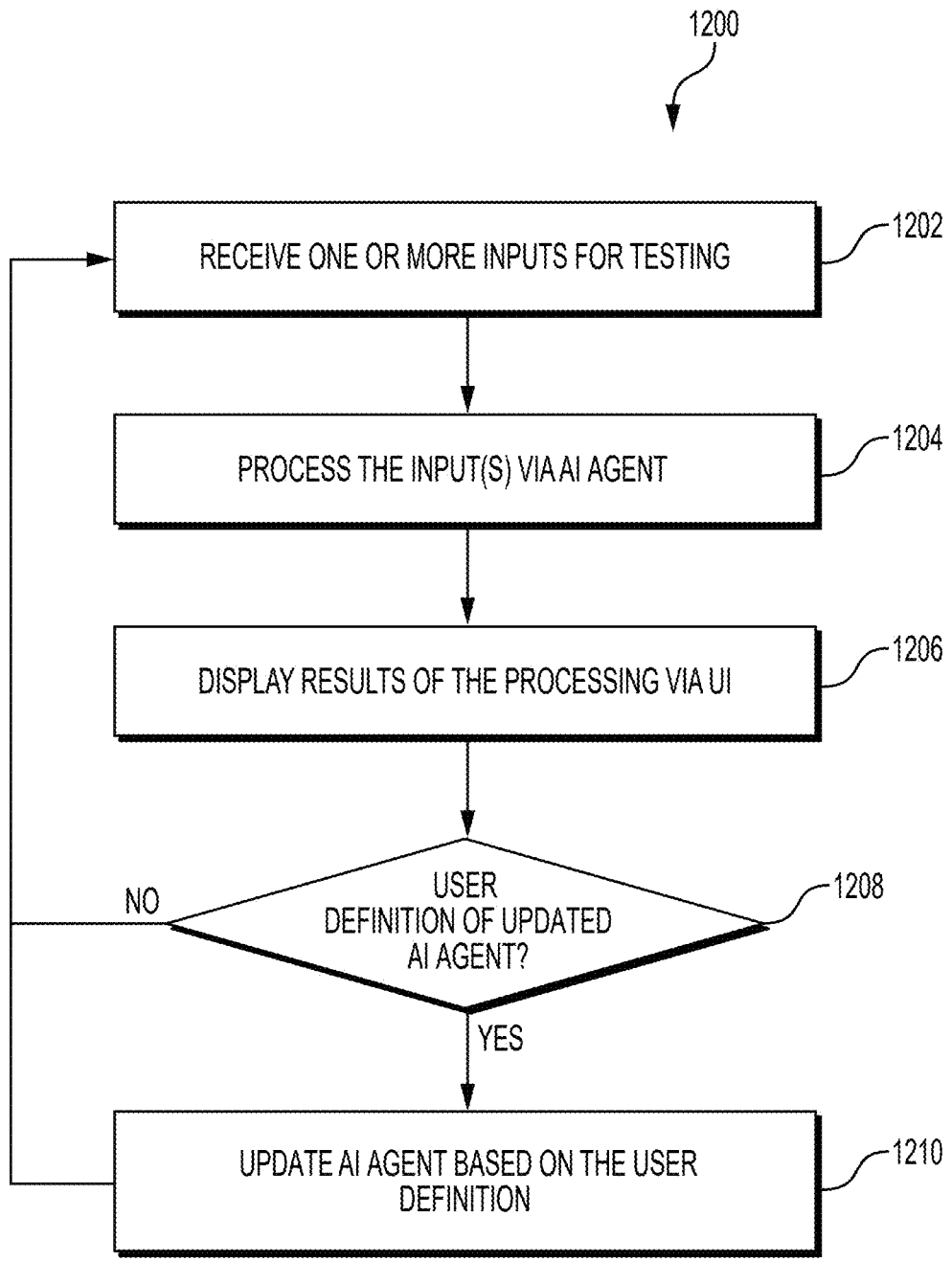
FIG. 12 is a flow diagram of method steps for testing an AI agent, according to various embodiments.

FIG. 12 is a flow diagram of method steps for testing an AI agent, according to various embodiments. Although the method steps are described in conjunction with the systems of FIGS. 1-10, persons skilled in the art will understand that any system configured to perform the method steps in any order falls within the scope of the present embodiments.

As shown, a method 1200 begins at step 1202, where the AI platform application 115 receives one or more inputs for testing an AI agent. In some embodiments, the input(s) can be received via a UI, such as the "Playground" UI described above in conjunction with FIG. 7. In some embodiments, multiple test inputs can be received, such as in a batch. In some embodiments, the inputs can include a conversation history.

At step 1204, the AI platform application 115 processes the input(s) received at step 1202 via the AI agent that is being tested.

At step 1206, the AI platform application 115 causes results of the processing to be displayed via a UI. For example, the AI platform application 115 could display the results of the processing via the "Playground" UI described above in conjunction with FIG. 7.

At step 1208, if the AI platform application 115 receives a user definition of an updated AI agent, then the method 1200 continues to step 1210, where the AI platform application 115 updates the AI agent based on the user definition.

After the AI platform application 115 updates the AI agent, or if the AI platform application 115 does not receive a user definition of an updated AI agent, the method 1200 returns to step 1202, where the AI platform can receive more input(s).

Figure 13:
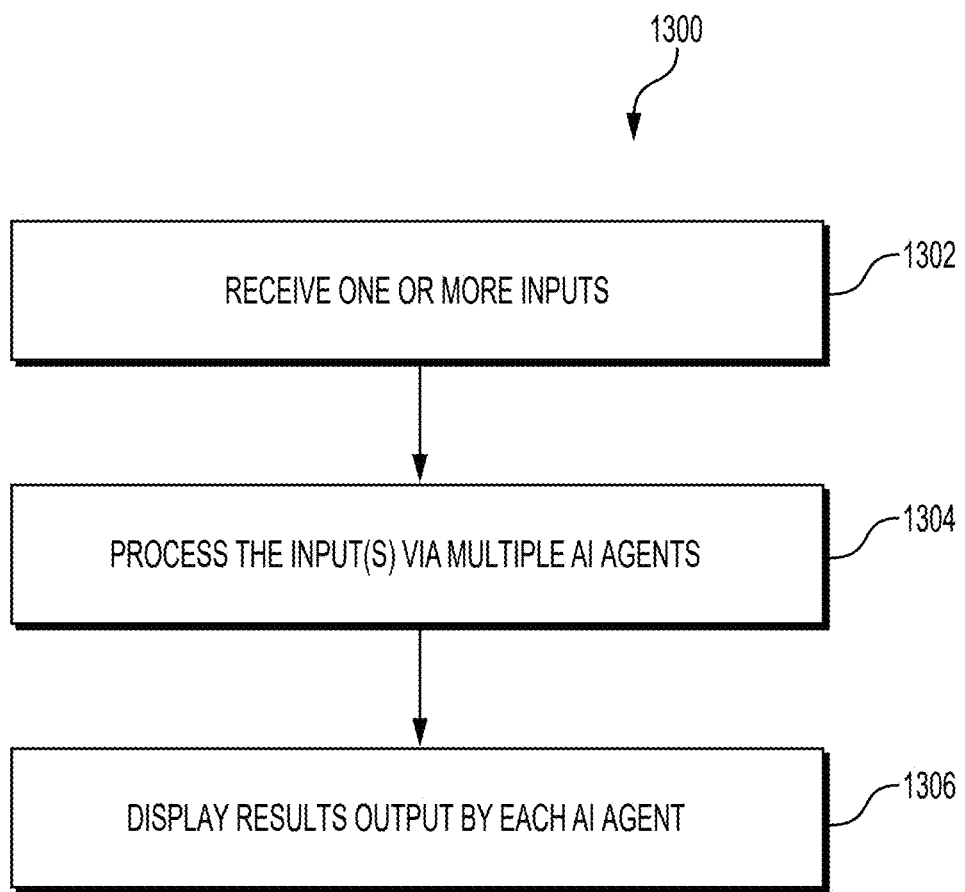
FIG. 13 is a flow diagram of method steps for comparing AI agents, according to various embodiments.

FIG. 13 is a flow diagram of method steps for comparing AI agents, according to various embodiments. Although the method steps are described in conjunction with the systems of FIGS. 1-10, persons skilled in the art will understand that any system configured to perform the method steps in any order falls within the scope of the present embodiments.

As shown, a method 1300 begins at step 1302, where the AI platform application 115 receives one or more inputs. In some embodiments, the input(s) can be received via a UI. In some embodiments, multiple test inputs can be received, such as in a batch. In some embodiments, the inputs can include a conversation history.

At step 1304, the AI platform application 115 processes the input(s) via the multiple AI agents. In some embodiments, the input(s) can be processed in parallel using the multiple AI agents that are being compared.

At step 1306, the AI platform application 115 causes results output by each AI agent to be displayed. Thereafter, a user, such as an IT administrator, can modify the definitions of one or more of the AI agents, select one of the AI agents for use, etc., as appropriate.

Figure 14:
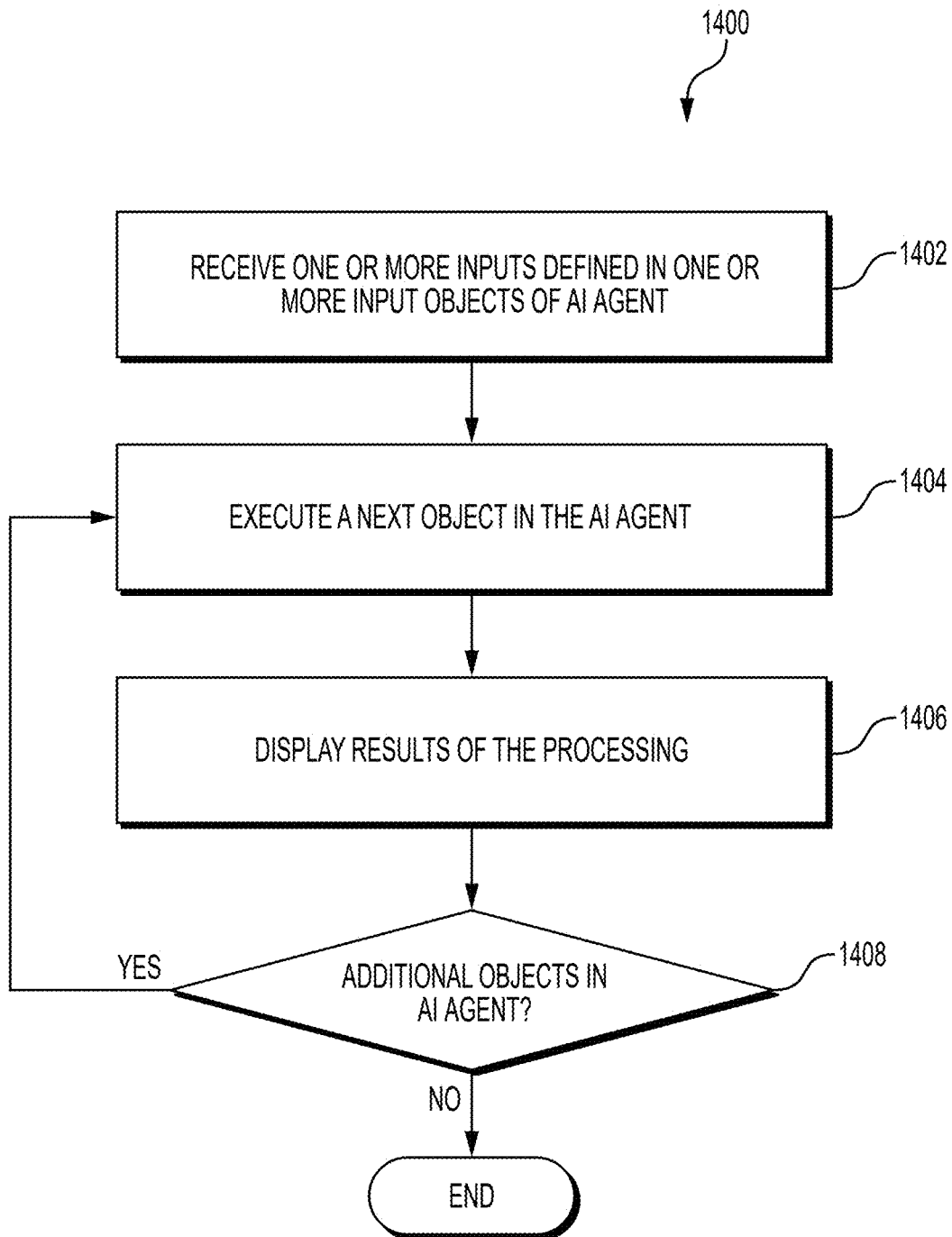
FIG. 14 is a flow diagram of method steps for debugging an AI agent, according to various embodiments.

FIG. 14 is a flow diagram of method steps for debugging an AI agent, according to various embodiments. Although the method steps are described in conjunction with the systems of FIGS. 1-10, persons skilled in the art will understand that any system configured to perform the method steps in any order falls within the scope of the present embodiments.

As shown, a method 1400 begins at step 1402, where the AI platform application 115 receives one or more inputs that are defined in one or more input objects of an AI agent.

At step 1404, the AI platform application 115 executes a next object in the AI agent. That is, the AI platform application 115 "steps through" objects of the AI agent and executes the objects one by one.

At step 1406, the AI platform application 115 causes results of the execution at step 1404 to be displayed to a user.

At step 1408, if there are no additional objects in the AI agent, then the method 1400. On the other hand, if there are additional objects in the AI agent, then the method 1400 returns to step 1404, where the AI platform application 115 again executes a next object in the AI agent.

Figure 15:
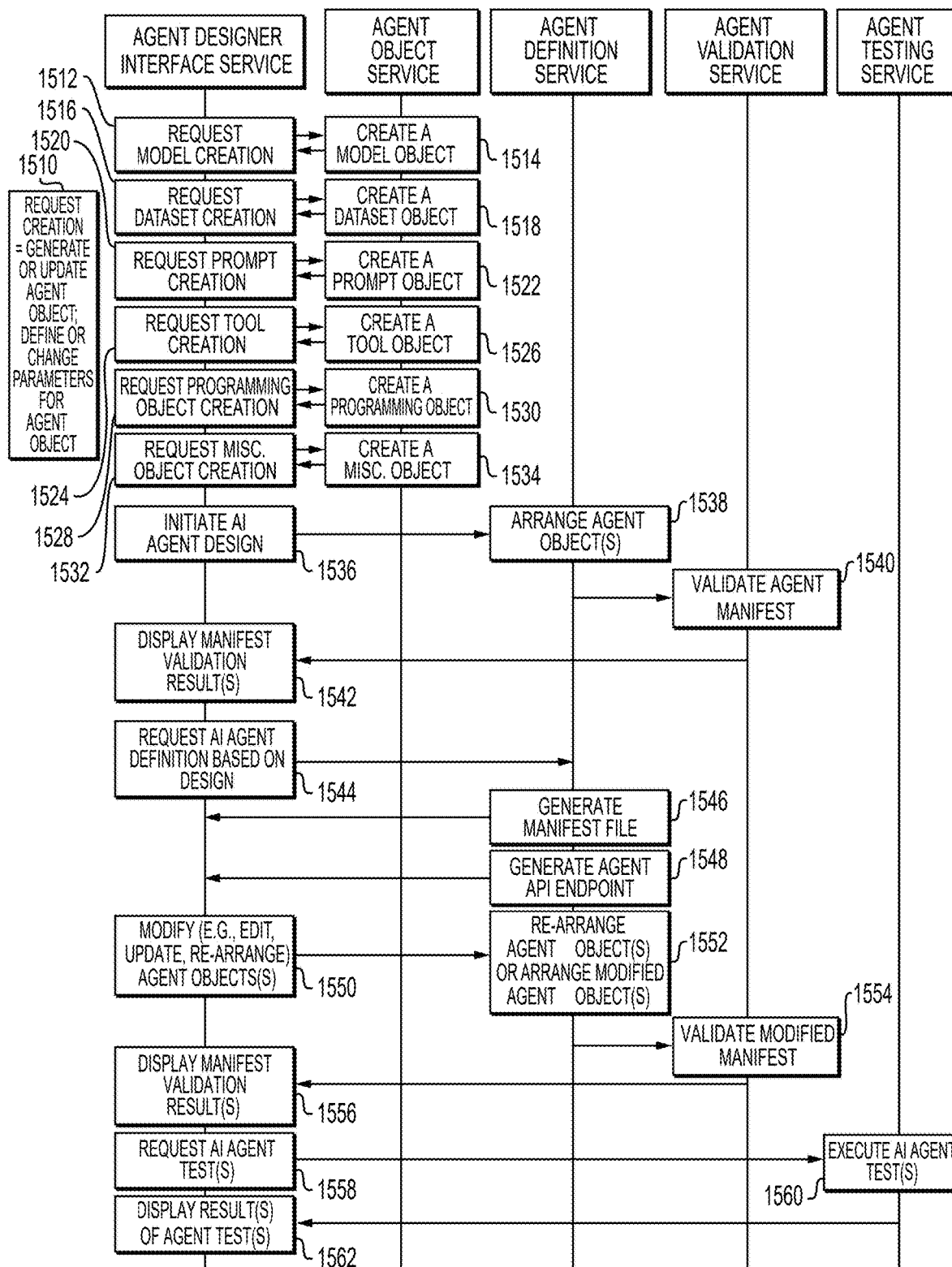
FIG. 15 is a sequence diagram of method steps for designing an AI agent, according to various embodiments.

FIG. 15 is a sequence diagram of method steps for designing an AI agent, according to various embodiments. Various services are displayed at the top. These services can execute on a server device 110, 170 or on a computing device 140.

A series of stages are performed as part of a request to update agent objects. The edit could be any change to parameters of the agent object or the AI agent itself. The stages can be invoked based on a request to create or update an AI agent at stage 1510. This can include a request to define or change parameters for the agent object.

At stage 1512, the agent designer interface service can receive a request for model creation. This can mean dragging a model icon into the UI, in an example. In another example, the model is created using a UI interface such as in FIG. 8. Various parameters discussed in connection with FIG. 8, such as display name and model name can be part of the model creation request.

The request can also include things like dependencies and management policies that the administrator applies to the model. Using the UI, the user can define which dependencies and management policies apply.

In response to the request, an agent object service can create the model object at stage 1514. This can include ensuring that the user and device are compliant with the management policies and have permission to create the model object.

At stage 1516, the agent designer interface service can receive a request for dataset creation. The request can be based on the UI discussed in FIG. 9. Alternatively, a dataset can be dragged onto the UI from a dropdown menu of potential datasets, in an example.

In response to the request, an agent object service can create the dataset object at stage 1518. This can include ensuring that the user and device are compliant with the management policies and have permission to create the dataset object.

At stage 1520, the agent designer interface service can receive a request for prompt creation. The request can be based on the UI discussed in FIG. 10. Prompt packages can have a maximum number of prompts that can be dictated based on user profile attributes, in an example. Alternatively, the maximum number of prompts can be based on current allowable query sizes for AI models being utilized by the AI agent.

In response to the request, an agent object service can create the prompt object at stage 1522. This can include ensuring that the user and device are compliant with the management policies and have permission to create the prompt object.

At stage 1524, the agent designer interface service can receive a request for tool creation. The tool can be a third-party tool that is ingested by the AI platform through an ingestion agent. The ingestion can include creating code for interacting with an API of the tool in an example. Any of the various tool parameters discussed herein can be utilized.

In response to the request, an agent object service can create the tool object at stage 1526. This can include ensuring that the user and device are compliant with the management policies and have permission to create the tool object.

At stage 1528, the agent designer interface service can receive a request for creating a programming object. The programming object can be code that is uploaded to the AI platform through, such as in an ingestion agent. The ingestion can include creating code for insertion into the agent.

In response to the request, an agent object service can create the tool object at stage 1530. This can include ensuring that the user and device are compliant with the management policies and have permission to create the tool object.

A similar process works for onboarding miscellaneous objects. The agent designer can define the miscellaneous object at stage 1532, and the agent object service can create the miscellaneous object at stage 1534.

At stage 1536, the agent designer interface service can initiate agent design. This can occur from opening a preexisting agent, selecting an option for a new agent, or saving a new agent.

At stage 1538, the agent distribution service can arrange the agent objects for display at the UI. This can also include creating a manifest file that represents the agent and object arrangement. Manifest Files (also called "configuration files" or "manifest files") are structured documents that formally define an AI Agent's composition and behavior. Typically written in XML, JSON, or YAML formats, these files specify the included Agent Objects, execution order and workflow sequencing, conditional rules governing operation, authentication details and permission scopes, and component parameter configurations. Manifest Files serve as both documentation and operational blueprints, enabling the Execution Engine to instantiate and run the AI Agent with consistent behavior across environments while facilitating version control of agent configurations.

An example manifest file is shown below:

```
{
  "id": "6b2daba2-cdab-4ef8-99fc-98c70f70d41c",
  "name": "Test dataset agent",
  "executionName": "test_dataset_agent",
  "description": "",
  "version": 0,
  "steps": [
    {
      "stepType": "inputStep",
      "stepId": "589b8d3d-5073-4348-bc62-7a8ac39901ad",
      "position": {
        "id": "a24fc8c1-29a1-421e-9aa1-72116bf3b7b7",
        "x": 200,
        "y": 450,
        "tenantId": "2ce49ae0-c3ff-421a-91b7-830d0c73b348",
        "createdAt": "2024-06-07T22:02:57.085196Z",
        "updatedAt": "2024-06-07T22:02:57.085196Z"
      },
      "dependencies": [ ],
      "agentId": "6b2daba2-cdab-4ef8-99fc-98c70f70d41c",
      "tenantId": "2ce49ae0-c3ff-421a-91b7-830d0c73b348",
      "createdAt": "2024-06-07T22:02:57.084561Z",
      "updatedAt": "2024-06-07T22:02:57.084561Z"
    },
    {
      "dataSource": "6ebb6214-de23-4245-9430-77308d28fce5",
      "topK": 5,
      "relevanceThreshold": 50,
      "databaseType": "pinecone",
      "pineconeApiKey": "f8803-4c5d-9a6d-34a4fb543fc7",
      "pineconeIndexName": "",
      "stepType": "dataSearch",
      "stepId": "8836c64a-3db7-4d1f-ac5d-be920cba1eca",
      "position": {
        "id": "d050338f-6a10-4e23-98bf-8a2dd46747ac",
        "x": 472,
        "y": 391,
        "tenantId": "2ce49ae0-c3ff-421a-91b7-830d0c73b348",
        "createdAt": "2024-06-07T22:02:57.090006Z",
        "updatedAt": "2024-06-07T22:02:57.090006Z"
      },
      "dependencies": [
        "589b8d3d-5073-4348-bc62-7a8ac39901ad"
      ],
      "agentId": "6b2daba2-cdab-4ef8-99fc-98c70f70d41c",
      "tenantId": "2ce49ae0-c3ff-421a-91b7-830d0c73b348",
      "createdAt": "2024-05-23T16:51:18.662126Z",
      "updatedAt": "2024-05-23T16:51:18.714447Z"
    },
    {
      "stepType": "outputStep",
      "stepId": "c51e30e9-bcfe-4703-8a77-62863fffe7ce",
      "position": {
        "id": "155e601d-6dd5-48d6-9889-28b44fc91719",
        "x": 800,
        "y": 450,
        "tenantId": "2ce49ae0-c3ff-421a-91b7-830d0c73b348",
        "createdAt": "2024-06-07T22:02:57.08659Z",
        "updatedAt": "2024-06-07T22:02:57.08659Z"
      },
      "dependencies": [
        "8836c64a-3db7-4d1f-ac5d-be920cba1eca"
      ],
      "agentId": "6b2daba2-cdab-4ef8-99fc-98c70f70d41c",
      "tenantId": "2ce49ae0-c3ff-421a-91b7-830d0c73b348",
      "createdAt": "2024-06-07T22:02:57.08644Z",
      "updatedAt": "2024-06-07T22:02:57.08644Z"
    }
  ],
  "tenantId": "2ce49ae0-c3ff-421a-91b7-830d0c73b348",
  "createdAt": "2024-06-07T22:02:57.079139Z",
  "updatedAt": "2024-06-07T22:02:57.079139Z"
}
```

The manifest can be a JSON or other format. In this example, the "id" is a unique identifier to reference the agent. "Name" indicates an agent name defined by an administrator, in this case "Test dataset agent." The executionName indicates what the agent is called in an execution environment, and can also be defined by an administrator. Additional description and version fields can track additional information about the AI agent Each step can refer to an agent object. In this example, the manifest file includes steps for inputStep (an input object), a dataSearch of a dataSource (searching a dataset object), and an outputStep (an output object). Each step can have an identifier such that it can be accessed from a datastore by the agent designer or agent executor during agent deployment.

The position of the step can also be stored, with an identifier of the position, and coordinates for placing an icon on the UI to represent the step. The position coordinates can include an X location and a Y location that correspond to placement of the agent object within the UI. This can allow for recalling the visual arrangement of the agent at a future time. For example, the position coordinates for the data source in the above example manifest are x: 472 and y: 391, which indicate X and Y screen positions within the UI.

The steps in the example manifest also include a dependencies field. This field can contain multiple identifiers, which the agent executor and validation service can use to determine which other steps or actions the current step (agent object) must wait on before completion. Zero, one, or multiple dependencies can be assigned to an agent object. The agent executor can look up the dependencies using the identifiers in the dependencies field.

The dependencies can include conditional events. For example, searching a dataset can be dependent on ingesting the dataset first. However, if a threshold period of time passes before the dataset is ingested, and a prior version of the dataset is already ingested at a date that falls after a recency threshold, then the step can move forward with searching the previously ingested prior version of the dataset.

Another example dependency is as follows. The agent executor can check with the ingestion service to get an estimate of how long it will take for the dataset to be ingested. That estimate can be compared against a threshold maximum waiting time, which can be based on a timing parameter for how long the agent can take to complete. A synchronous agent will typically have a much shorter time requirement than an asynchronous agent, such as an agent that can run at off-peak times in the night. If the estimate is within a percentage, such as 80%, of the maximum waiting time, then the agent executor can wait on the ingestion. However, if that time period elapses, the agent executor can check again with the ingestion service to determine how much longer the ingestion will take. This can be compared against an additional fallback threshold to determine whether to keep waiting. For example, if the ingestion is nearly complete, such as more than the percentage (e.g., 80%) of time waited so far, then the agent executor can continue to wait for the ingestion to complete. Otherwise, the agent executor can at that point decide to search the prior version of the dataset. The thresholds in this example can all be configured by an administrator when creating or editing dependency rules.

Nested dependencies such as this can exist for steps other than dataset ingestion as well. Dependencies can relate to current costs and execution times for AI models. For example, in an asynchronous agent, the agent executor can check projected costs to use a model at different times within the maximum execution window. These costs can be obtained by a cost agent that polls the AI services at intervals for current and future cost estimates. The dependency can cause the agent executor to wait until a lowest cost time, or until the soonest time when the cost is projected to be below a maximum cost threshold.

As yet another example dependency, if four different LLMs are available for use to perform a single step within an AI agent, the AI agent can check average execution times and costs for the LLMs within a most recent time period. These numbers can be polled and stored by a cost agent running at the platform. A first LLM (selected as preferred) can be used dependent on its cost and execution time being within a threshold closeness to cheaper costs and/or times of the other available LLMs. Otherwise, the cheapest or fastest LLM is selected.

Continuing with the manifest file, each step (agent object) can also include a tenant ID. Multiple tenant IDs are possible. The tenant ID can be used to determine which tenants can access the agent object. The platform can be multi-tenant, such that tenant assets can be easily segmented and isolated from other tenants. When a tenant utilizes the platform, they can create their own agents and agent objects that are stored with the corresponding tenant ID. These objects are not accessible by other tenants unless the creator elects to allow such accessibility.

A tenant can be an enterprise customer. Alternatively, the tenant ID can represent a subtenant of the enterprise customer. This can allow the enterprise customer to white label the platform and provide the AI design and administration capabilities to its own customers. These subtenants can be limited to less agent objects than the enterprise customer itself. For example, the enterprise customer can have its own prompt packages, but its subtenants can still create additional prompt packages that are not shared with the other subtenants. Separate AI agent collections can be maintained per tenant.

The manifest steps can also include dates that track when the step was created and modified, such as in the createdAt and updatedAt fields.

At stage 1540, the agent validation service can validate the manifest file. This can involve ensuring that the manifest, which defines the agent objects (e.g., steps) of an AI agent, adheres to the required format, contains valid configurations, and meets the predefined standards for successful execution. This can include syntax validation, validation of the manifest format against a schema, and validation that all required parameter fields are in the manifest. Values of the parameter fields can be checked to ensure that they fall within an acceptable range for that parameter. The AI agent can also ensure values match the expected types (e.g., strings, integers, lists). A management policy can also specify whether a particular data object, such as a dataset, can be used in conjunction with public-facing agent objects, such as a publicly available AI model. This can prevent data loss in an enterprise setting.

In addition, the agent validation service can ensure all referenced objects (e.g., data sources, processing steps, models) are defined and available to the user or tenant within the AI platform. The agent validation can also check for compatibility, including that agent objects (and particularly adjacent objects are compatible with each other (e.g., input/output data formats).

The agent validation service can also ensure that all dependencies between objects are properly defined and resolvable. Dependencies can include prerequisite execution and preprocessing that must occur before executing a particular object, in an example. Dependencies can be configured according to administrative rules. And then these rules can be referenced when validating the dependencies of the AI agent. Additionally, the AI agent can ensure that the execution order respects dependencies (e.g., a model cannot be trained before the data preprocessing step is completed).

By implementing these validation steps, an AI platform can ensure that the AI manifest file is correctly defined, properly configured, and ready for execution, minimizing the risk of errors and ensuring smooth operation.

At stage 1542 the designer interface service can display the manifest file validation results in the UI.

At stage 1544 the UI can request an agent definition from the agent definition service based on the user selecting the agent design. This can include sending an agent identifier to the agent definition service. In response, at stage 1546, the agent definition service can generate the manifest file. The agent definition service can also generate an agent API endpoint at stage 1548. A corresponding URL and key can be sent back to the agent designer interface in an example.

The agent then displays in the UI. At stage 1550, the user can modify the AI agent. The modification can be an edit, update, or rearrangement of agent objects or parameters. Even dragging one of the agent objects to a different place on the UI is a modification.

Agent UI builder can suggest blocks, connections, prompts, and other agent objects in real time as autocomplete suggestions. For example, the UI can offer to automatically link a dataset and an LLM when dragging blocks on the UI canvas. Additionally, the UI can offer to use a specific prompt for the selected LLM.

The modifications are sent to the agent definition service. At stage 1552, that service can rearrange agent objects or arrange modified agent objects. This can include changing parameters, AI services, and coordinate values in the manifest. At stage 1554, the agent validation service validates the modified manifest. The manifest file is regenerated as the modified manifest.

At stage 1556, the manifest file validation results are displayed on the UI.

At stage 1558, a request is made to test the agent. This could be as a result of selecting a playground or battlefield button. An agent testing service is notified. The agent testing service can execute the AI agent at stage 1560. Again, this can be a playground or battleground, both of which have been discussed previously. The results of the tests then display at stage 1562.

Figure 16:
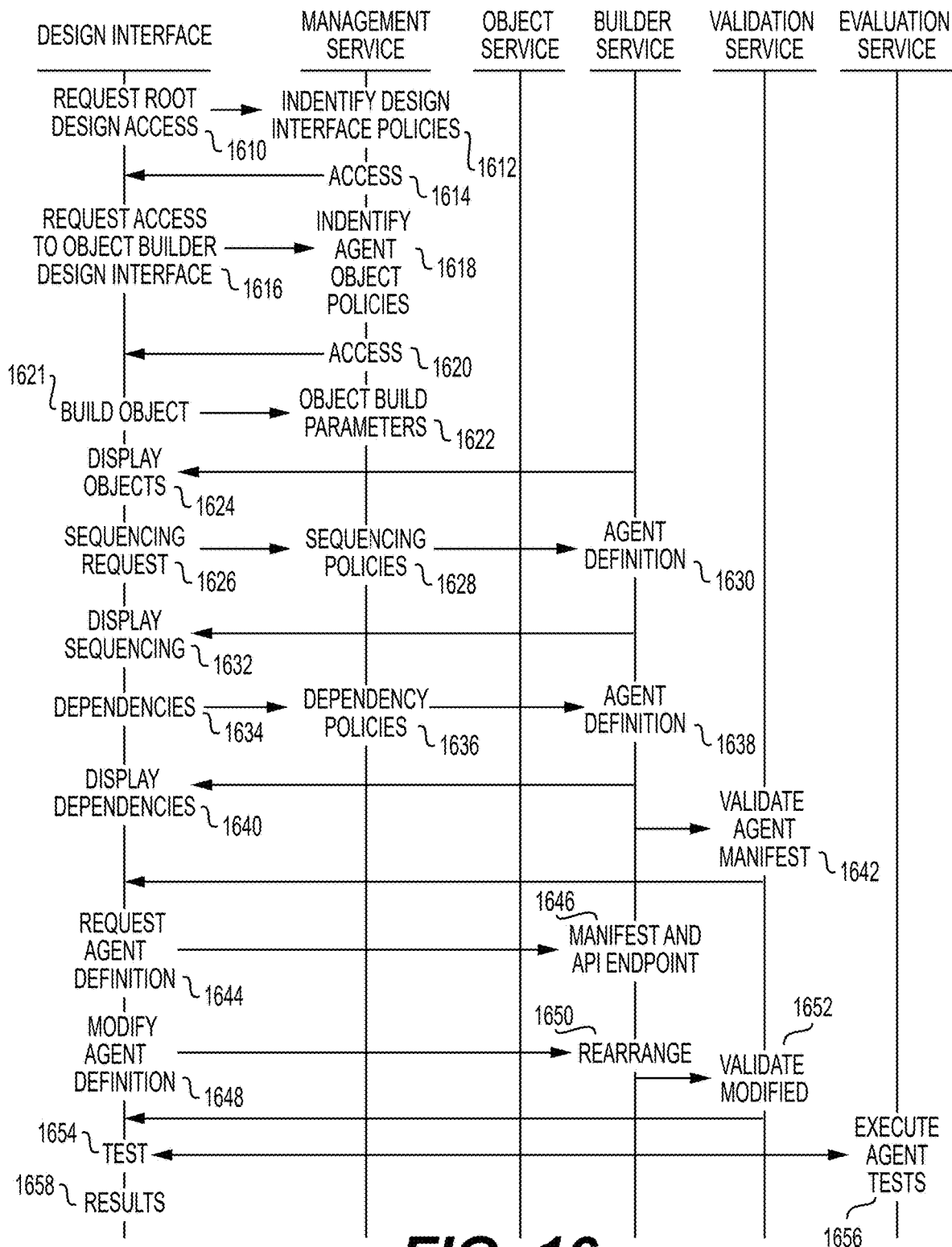
FIG. 16 is a sequence diagram of method steps for designing an AI agent, according to various embodiments.

FIG. 16 is a sequence diagram of method steps for designing an AI agent, according to various embodiments. A UI for designing agents (the design interface), a management service, object service, builder service, validation service, and evaluation service all execute at an AI platform.

At stage 1610, the AI design interface requests root access from a management service. This can include seeking the highest level of permissions within the design UI. This access can grant the administrative user full control over all agent objects, policies, and parameters. The permission can also include access to editing management policies and user permissions, modifying global settings, and accessing all advanced tools and features.

At stage 1612, the management service can identify design interface policies. The management service can identify the relevant management policies based on contextual data, such as the user making the request, the user's role in the enterprise, groups the user belongs to, the tenant, and the user's device configuration and state. Both historical and current device configurations can be considered by the management service. Other compliance information, such as the platform infrastructure configuration and state, network configuration and state, and any other compliance information explained herein can be considered by the management service.

Based on these considerations, the management service can grant varying levels of access at stage 1614. The design interface can then display the access level and execute various security measures. The design interface can authorize a connection to the user's computing device 140. Again, based on the access level, different portions of the design interface may be available to the user.

At stage 1616, the design interface can identify a request to access an object builder design interface. The object builder interface can be used for creating, modifying, updating, or deleting agent objects and parameters. In response, the management service can identify agent object policies associated with the access request at stage 1618. Similar information can be considered as in stage 1614. An agent object policy can be used to determine authorized agent object design parameters. The determination can be based on the user's credentials, device configuration, and compliance information.

Varying levels of access can be granted at stage 1620. The UI can then display the access level. The object builder interface allows users to create and configure specific components or objects within the AI platform, such as AI models, AI agents, and preprocessing steps. Users can define the properties, parameters, and relationships of these objects, tailoring them to fit specific requirements and workflows.

At stage 1621, a request to build one or more agent objects can be received at the design interface. The request can be defined by inputs of object parameters in the UI. The request can be based on the upload of a dataset, the integration of a toolset, or any other request to create a new agent object.

At stage 1622, the management service identifies an agent object policy associated with the request. The policy can be based on the request itself, the user profile information (e.g., group, role, tenant, etc.), device configuration and state, the device type, platform processing configuration and state, platform storage configuration and state, and network configuration and state.

Based on the identified agent object policy, authorized object build parameters are determined at stage 1622 and passed to an object service.

The object service returns information to the UI that allows for the display of the requested created object at stage 1624.

At stage 1626, the UI requests sequencing for the agent objects. A request to establish sequencing among AI agent objects involves defining the order in which components or steps within an AI agent are executed. This sequencing ensures that data flows correctly through the agent and that each processing step occurs in the correct order. For example, data preprocessing must occur before a query is sent to an LLM in some agents. Sequencing can also take into account dependencies.

Implementing sequencing can be done using configuration files (e.g., YAML, JSON) or workflow orchestrators to manage and enforce the sequence. The UI can allow users to define the sequence by connecting components in the desired order. Proper sequencing ensures data integrity, reduces the risk of errors, and improves the reliability and maintainability of the AI agent. By clearly defining the order of execution, each step receives the correct input and produces the expected output, facilitating a smooth and efficient agent operation.

In response to the sequencing request, the management service identifies and effectuates sequencing policies at stage 1628. The sequencing is then used to create or modify an agent definition by a builder service at stage 1630. Although not shown in the figure, this can also cause modification to the manifest file, which can be revalidated by the validation service.

At stage 1632, the UI displays the sequencing. This can include displaying the various agent objects of the AI agent, with connections between the input and output of the agent.

At stage 1634, the user can add dependencies to objects in the agent, or an object parameter or policy object can indicate a dependency. At stage 1636, the management service applies dependency policies (also called "dependency rules") to one or more of the agent objects.

Designing an AI agent can include establishing various dependency policies that define how components or steps interact and rely on each other to ensure efficient and correct operation. Sequential dependencies mandate that one step must be completed before the next begins, ensuring tasks are executed in a specific order, such as data preprocessing before feature engineering. Conditional dependencies execute steps based on specific criteria or conditions, like querying a model only if the dataset in the agent is done being ingested. Data availability dependencies ensure that a step starts only when the necessary data or inputs are available from a previous step, ensuring that model training waits for the completion of feature engineering.

Resource-based dependencies manage the execution of steps based on the availability of computational resources, optimizing performance by scheduling tasks when required resources such as CPU or GPU are available. Concurrency constraints allow for the parallel execution of multiple steps while respecting dependencies, improving agent efficiency by running non-dependent tasks simultaneously, such as running data ingestion and initial data cleaning in parallel. Time-based dependencies schedule steps to execute at specific times or intervals, suitable for agents requiring periodic updates, like running data ingestion every night at midnight.

Error handling dependencies define the agent's response to errors or failures in specific steps, incorporating retry policies, fallback procedures, or stopping the agent. Manual approval dependencies ensure that critical stages requiring human oversight proceed only after receiving manual approval, such as deploying a trained model to production after successful evaluation and team lead approval. These dependency policies, implemented through configuration files, workflow orchestrators, and visual interfaces, help create robust, efficient AI agents capable of handling complex workflows by clearly defining the interactions and prerequisites for each step.

At stage 1638, the agent definition is updated to reflect the dependencies. This can include adding the dependencies to the manifest file. The dependency can be identified in the manifest in connection with the step (e.g., agent object) that has the dependency. The dependencies can be displayed at the design interface at stage 1640.

The validation service can then validate the updated manifest file at stage 1642. This can include ensuring that the manifest adheres to required formats, contains valid configurations, and meets predefined standards for successful execution. This process can include multiple layers of validation to ensure both syntactic correctness and functional integrity.

Firstly, the syntax validation checks that the manifest file conforms to the expected schema, which can be defined using tools like JSON Schema or YAML Schema. This involves verifying that all required fields are present, data types are correct, and the structure of the manifest is as expected. Format checking and linting are also part of this step to enforce coding standards and detect common formatting errors.

Secondly, semantic validation ensures the manifest's content makes logical sense. This involves checking that all referenced components, such as data sources, preprocessing steps, and models, are defined and available to the tenant. It also includes validating that the specified parameters and configurations are within acceptable ranges and types. Additionally, dependency resolution ensures that the sequence of steps respects the required order and that all necessary prerequisites are met. This process can simulate the agent execution to identify any issues before actual deployment.

Security validation ensures that sensitive information is managed correctly, and access controls are properly configured. This includes verifying that credentials, API keys, and other sensitive data are securely handled and not exposed in the manifest. The validation results can be displayed.

When the AI agent is loaded in the UI, at stage 1644 the UI can request an agent definition from the builder service. The builder service can generate and return the manifest and an API endpoint at stage 1646.

The user can modify the AI agent in the UI at stage 1648. When the user saves the modification, the builder service can rearrange the manifest at stage 1650. The modified manifest is validated by the validation service at stage 1652.

The UI can then test the agent, such as in a playground, battlefield, or QA environment at stage 1654. At stage 1656, the evaluation service executes agent tests. Comprehensive validation, including testing and dry runs, ensures that the AI agent is ready for execution, reducing the risk of errors and ensuring robust and reliable agent operation.

The agent tests can include running a batch of inputs and comparing the outputs to expected outputs. The comparison can be a semantic comparison based on vectorizing the output and performing a vector comparison to a vectorized expected output. Alternatively, and LLM can compare the results to expected results and alert an administrator to divergence. The test results can display in the UI at stage 1658.

The test results are one type of execution metric (also called "performance metric"). The results can include an output from the agent that displays onscreen. The results can also include outputs of one or more of the agent objects, allowing the administrator to trace outputs at each stage of the agent. Other execution metrics can include cost, number of tokens used, and the time to execute the agent or each stage of the agent.

Figure 17:
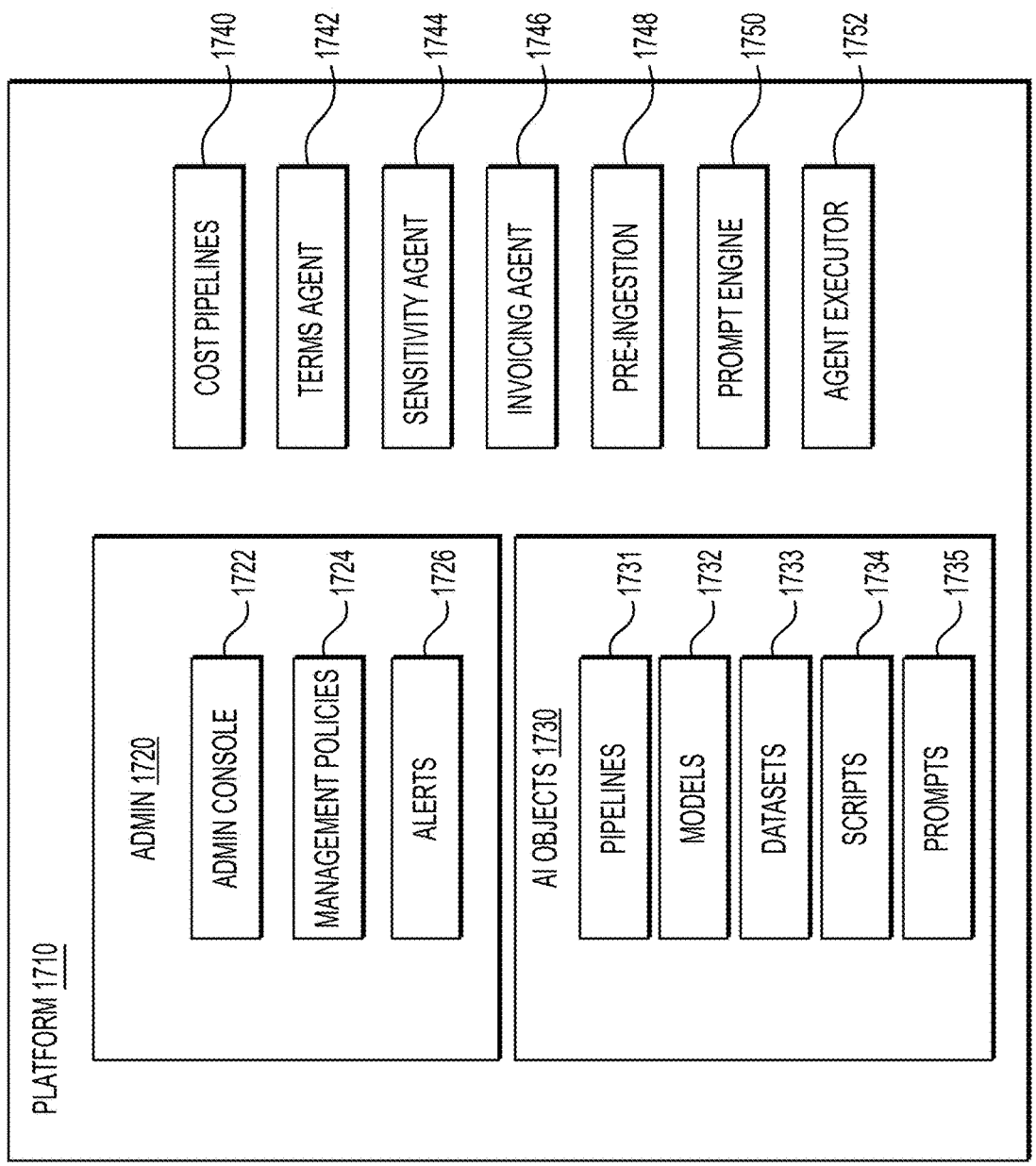
FIG. 17 is an illustration of system components for administration aspects of an AI platform application, according to various embodiments.

FIG. 17 is an illustration of system components for administration aspects of an AI platform 1710, according to various embodiments. The AI platform 1710 can include various administrative agents for determining the costs of AI services, the information sensitivities of agents, and invoicing, among other administrative features. Pre-ingestion tools and prompt engines ensure that the AI agents continue to operate with minimal disruption, as will be explained.

Administrative features 1720 can include an admin console 1722, management policies 1724, and alerts 1726. The admin console 1722 can include the previously described UI for designing and testing AI agents. AI objects 1730 are pictured for this purpose, with agents 1731, AI models 1732, AI datasets 1733, code 1734, and prompts 1735 all being available for inclusion in the agent design.

The administrative console can operate in at least two modes. A first mode is a Developer version. This can be useful to software developers, since the Develop version includes deep debugging capabilities. A second version is tailored towards laymen. The Layman version avoids presenting information at a code level, and instead provides concepts that are understandable and that get translated to particular code and parameters based on selections the user makes.

The administrative features of the AI platform can determine what is permitted at various third-party models and what is the cost both now and in the future. With this information compared to requirements for the AI agent, the agent executor 1752 can determine when and wear to execute some stages of an AI agent. Additionally, invoicing can occur automatically based on the costs of running the AI agent.

An administrator can set management policies 1724, such as agent policies, that define cost and timing boundaries of an AI agent's operation.

The AI agent can operate either synchronously or asynchronously. Synchronous operation runs upon receipt of an input to the agent. However, asynchronous agents run independently of an input, and instead can wait for a different triggering condition. For example, a customer might not care when a large image manipulation job occurs, so long as it is within a threshold number of hours. This can allow for flexibility in where the job runs, such as in a low cost market overnight to save money.

To surface infrastructure costs, a cost agent 1740 asynchronously executes at the AI platform 1710. The cost agent 1740 can periodically poll hyperscalers to determine costs currently and historically at different times. A hyperscaler can be a large-scale cloud service provider that offers extensive and scalable infrastructure for computing, storage, and networking. These hyperscalers, such as Amazon Web Services (AWS), Microsoft Azure, and Google Cloud Platform (GCP), are capable of supporting vast amounts of data and high-performance computing tasks required for AI workloads. They provide the necessary resources to deploy and manage complex AI models at scale.

Polling a hyperscaler to determine the costs of running an AI service can include querying the cloud service provider's pricing APIs to retrieve real-time pricing information for the resources utilized by the AI service. The process starts by identifying the specific resources required, such as compute instances, storage, data transfer, and specialized AI services like machine learning models or data preprocessing tools.

To perform the polling, the AI platform 1710 can authenticate with the hyperscaler's pricing API using appropriate credentials, such as API keys or tokens. Once authenticated, the agent executor 1752 can send requests to the pricing API, specifying the types and configurations of resources needed. These requests can be built into the cost agent 1740, in an example. The API responds with detailed cost information, including current prices for various resource types and any applicable discounts or usage tiers.

By storing historical pricing data, the cost agent 1740 can also forecast the likely cost of each AI service at various times during a day. This can allow the agent executor 1752 to schedule asynchronous AI agents based around the times with cheaper costs. In another example, the AI agent can allow flexibility in where to execute an AI service, such as an LLM. This can allow the cost agent 1740 to consider costs across all eligible AI services for an AI agent.

The system then aggregates this pricing data to calculate the total estimated cost of running the AI service. This involves summing up the costs of all individual resources over the expected usage duration. For a comprehensive cost estimate, the system may also factor in additional costs such as data ingress and egress, persistent storage, and any ancillary services. This aggregated cost information can be presented to users or system administrators to inform budgeting and resource allocation decisions.

Finally, the polling process can be automated to run at regular intervals, ensuring that cost estimates remain up to date with any changes in pricing or resource usage patterns. This continuous monitoring helps in managing and optimizing the operational expenses associated with running AI services on a hyperscaler platform.

As an example of cost awareness, GPU workloads on AWS can run $4.00/hour, but same hardware from smaller vendors can be had for $0.70/hour. The cost agent 1740 can continuously evaluate and lower cost for customers by choosing where to run their models, all things being otherwise equal, to achieve the lowest cost. The cost agent 1740 or agent executor 1752 can allow the both upon run of agent and throughout its execution switching to alternate execution environment upon a significant/threshold deviation from the current execution environment.

GPU workloads are most efficient when multi-thread operations are being executed, so making cost-aware decisions on how to sub-divide an entire processing load of an agent across X array of GPUs can have a significant impact on the total cost to run the agent (e.g., images are best run as batches as to optimize the cost when 1M images are run through a new, more capable model, as opposed to sequentially, as well as the optimal batch size being a significant factor in workload execution optimization)

A sensitivity agent 1744 can run at the AI platform 1710 to identify data sensitivity levels of customer agents and datasets. The sensitivity can be relevant because different agent objects may need to be suggested to ensure the data remains confidential. The sensitivity agent 1744 can review the prompts in a user's AI agent to determine what kind of information is being shared. Alternatively, the AI platform can ask the user can be asked questions about the agent or dataset, and based on those questions the agent or dataset can be labelled as sensitive.

Different AI services have different terms of service, making some AI services unsuitable for particular use cases. For example, a health application might violate terms of an AI service that forbids health applications. Because these terms change periodically, a terms agent 1742 can periodically execute and poll the eligible AI services for their terms of service.

High sensitivity agents can be more likely to violate terms of service. The terms of service agent 1742 or another process can surface conflicts with existing agents, in the form of alerts 1726. To determine if a terms of service changed, the service can be polled, the terms of service can be hashed and compared to a prior hash of the terms of service. If a difference exists, the AI platform can perform a semantic meaning comparison between the two versions of the terms of service. If the terms of service have become more or less restrictive with regard to any category of service, then the terms agent 1742 can re-compare against existing agents to reassess which AI agents are now allowed or disallowed based on the new terms of service.

Different providers have varying levels of restrictiveness in their terms of service. The terms agent 1742 can distill down the disallowed topics or topics that require approval prior to an agent using the provider. For example, health questions may be disallowed. The prompt engine 1750 can analyze user prompt packages to determine whether any agents are using the provider for health advice. If so, then an alert 1726 can be surfaced to an administrator.

In one example, AI platform can download and vectorize a terms of service. For example, the terms can be downloaded from a company website. The terms agent 1742 can then determine whether the terms are violated by the intended use of the AI agent. Based on the combination of eligible AI services with non-conflicting terms and with cost schedules in place, the agent executor 1752 can select an AI service and operation time. This allows for dynamically adjusting the execution of asynchronous AI agents to save money for the customer.

Additionally, an agent can be multithreaded to harness graphical processing unit (GPU) power better. This can particularly help with large jobs. For example, several threads, such as ten, can simultaneously run for image ingestion. In one example, the size or volume of the dataset can be used to determine whether to multithread the job.

Likewise, if an agent is taking too long to execute compared to polled data regarding execution times at another hyperscaler, the agent executor can stop execution and resume execution at the faster hyperscaler. Likewise, if another hyperscaler is polling with similar execution times but a lower price, the agent executor 1752 can switch the next portion of the workflow to the other hyperscaler. This can particularly be relevant for large batch jobs, such as processing a hundreds of gigabytes of images.

The agent executor 1752 can report each AI service that runs in the agents. The AI platform can track which AI service ran, when it ran, and the cost. Additionally, the platform can track what could have run and how much that would have cost.

An invoicing agent 1746 can use this tracked data to periodically tally a customer's current balance. Invoices can be created according to scheduled time periods. The cost savings of the dynamically scheduled asynchronous AI agents can be calculated and displayed on the invoice. For example, in addition to adding up line items about which services the customer used and how much that cost, the invoicing agent 1746 can sum up which services the customer could have run or even would have run without the platform's dynamic agent adjustments. The cost difference can be shown on the invoice, which helps the customer understand their overall savings by continuing to use the AI platform 1710.

The invoicing agent 1746 (also called billing agent) can calculate infrastructure consumption, such as compute and storage costs. The invoice itself can also be broken down by AI agent, in an example. The average costs of the AI agents during the billing period can be shown. Additionally, average costs of individual agent objects can be shown. This can allow the user to know how to tweak agents to lower costs.

In one example, the cost agent 1740 polls alternative prices at other hyperscalers. When another hyperscaler offers savings above a threshold as compared to a user's current configuration, an alert 1726 can be sent to the user. The user can review the per-day or per-hour cost difference. The user can decide whether to switch to the other hyperscaler. The user can also establish the cost threshold and select and option that authorizes the AI agent to pick the hyperscaler with the best price when the threshold is exceeded. The user can also be presented with an option of whether to apply this to asynchronous agents, synchronous agents, or both. In one example, the user can approve a list of potential hyperscalers. From this list, the cheapest hyperscalers can be selected by the AI agent.

In one example, a prompt engine 1750 can automate a battleground for an AI agent at multiple hyperscalers, including new hyperscalers that are not yet on the user's approved list. The prompt engine 1750 can use one or more conversations that are repeated at each hyperscaler. At each step of the conversation, the semantic similarity of the results can be analyzed by the prompt engine 1750. If the semantics diverge at a step, the prompt engine 1750 can request a new prompt for use at the new hyperscaler that will result in the conversation maintaining semantic similarity at the step where the semantic meaning diverged. The new prompt can be stored for use at that hyperscaler.

The battleground can be repeated, using the new prompt. If the semantic similarity remains the same through multiple battlegrounds, then the AI platform can indicate on the UI that the hyperscaler has been battleground tested. The UI can also indicate how many new prompts were created to maintain semantic similarity. The user can review the new prompts and decide whether to add the new hyperscaler to the approved list, along with the new prompts.

A pre-ingestion module 1748 can inspect new content that the user attempts to upload to the AI platform 1710 for ingestion. The AI platform can also include a marketplace where third parties can monetize and optionally deploy their agent modules (e.g., AI models, data sets, python scripts, identity provider hooks, etc.).

Management policies can dictate which users can purchase the agent modules, in an example. Additionally, a customer deposit or credit account can be charged. In one example, AI models and entire agents can be purchased and integrated into client agents and other workflows. The agent modules can incur a monthly charge, a per use charge, or any other payment configuration. Authorized users can implement the agent modules and payments can be deducted from the user account. The purchased agent modules can be tested in a battleground against existing AI models.

A prompt workbench engine, also called prompt engine 1750, can compare outputs from prompt packages on a single model or across different models. The user can request help guiding the AI model to a type of answer, and the AI platform can request that the model generate prompts that are likely to result in the user's desired output. The user can then test those prompts against an existing prompt package and continue refining the prompts accordingly.

The agent builder UI of the AI platform 1710 can track versions of an agent. This can allow an administrator user to make changes, such as to try a new AI model or now conditional parameters or management policies, and revert to a prior version of the AI agent if needed.

The agent builder UI can support if/then code blocks. This can allow the user to drag and drop conditions into the agent. The conditional block can include multiple And and OR conditions in an example. The conditions can be selected from any of the extensive parameters, management policies, and compliance settings discussed herein. For example, the agent path can split in any number of paths based on a conditional block that checks user group, user compliance, device configuration, network settings, object parameters, and any of the settings discussed herein. The AI platform 1710 can also periodically rotate API keys for the AI agents.

Additional information related to the examples, including FIG. 1A, is discussed below.

An administrative user can approve an agent object as an alternative AI agent or agent object for use during times when costs or execution times of the primary AI agent or primary agent object exceed a threshold. In this way, the marketplace agent module can be a cheaper or quicker backup for times when an existing agent does not meet customer criteria. Prior to doing so, the new agent object can be tested by comparing two agents in the battleground.

An AI model library designed with user-friendly organization and detailed information displays can enhance the user experience. One effective way to organize such a library is by grouping models by type. This categorization helps users quickly locate models suited to their specific needs, whether they are looking for models focused on natural language processing, computer vision, time series analysis, or other specialized tasks. By presenting the models in well-defined categories, the library becomes a valuable resource for users to efficiently navigate and select the appropriate tools for their AI projects.

Each model within the AI model library can be accompanied by a comprehensive set of details that provide users with all the necessary information to make informed decisions. For example, the library interface might include fields to display the source of the model, which indicates where the model was developed or originally published. The owner's information identifies the individual or organization responsible for maintaining the model, providing users with a point of contact for support or collaboration. Additionally, the license information is crucial as it informs users about the legal terms and conditions under which they can use, modify, and distribute the model.

To further assist users in evaluating and selecting models, the library can include details about the cost associated with each model. This might cover aspects such as one-time purchase fees, subscription models, or pay-per-use pricing structures. Additionally, a "More Info" section can provide links to detailed documentation, research papers, or user guides, offering users deeper insights into the model's capabilities, performance benchmarks, and potential use cases. This ensures that users have access to all the relevant information needed to thoroughly understand and effectively utilize the models.

The library can also offer a straightforward deployment option for each model, making it easier for users to integrate the chosen model into their own applications or workflows. This can involve providing pre-configured deployment scripts, compatibility with popular machine learning platforms, or seamless integration with cloud services. By incorporating a "Deploy" button or similar functionality, the library simplifies the process of moving from model selection to implementation, enabling users to quickly and efficiently put their chosen models to work.

An external dependency object is another agent object available in the Agent Builder UI. The object can list one or more dependencies that an agent executor should wait on prior to executing an agent object. The external dependency can include the ingestion of content by an external service. Any dependency rule can be included in the dependency object.

External dependencies can encompass the various libraries, frameworks, and services that the agent relies on to function correctly. These dependencies include widely used libraries such as TensorFlow, PyTorch, and scikit-learn, which provide essential tools for building and deploying machine learning models. Beyond libraries, external dependencies also involve cloud services and APIs that facilitate data storage, processing power, and model deployment. Platforms like Amazon Web Services (AWS), Google Cloud Platform (GCP), and Microsoft Azure offer scalable infrastructure that supports large-scale data processing and model training. These services often include specialized AI and machine learning tools that can accelerate development and deployment. However, reliance on these external services introduces considerations such as cost, latency, data privacy, and security, all of which can impact the overall effectiveness and feasibility of the AI agent.

The UI can also include an option to define agent execution location. For example, the agent can execute on-premises or in an SaaS configuration, such as with a cloud connector. An agent scheduler can be a process that schedules when an agent will run, causing execution of the agent at that time. Some agents can be triggered by an event, such as by receiving an input. These and other agents, particularly asynchronous agents, can be scheduled for execution. The schedule can be a one-time execution or a periodic execution.

The Embedding Model subobject defines how text data is transformed into numerical vectors that can be used by machine learning models. This subobject might allow users to choose from various pre-trained models (e.g., Word2Vec, GloVe, BERT) or to specify custom embeddings. The embedding model determines the representation of the text data, which is critical for the performance of NLP tasks.

A vector stores parameter provide options for users to select or define the storage mechanism for the vectors generated by the embedding model. This could include choices like in-memory storage, databases, or specialized vector stores like FAISS. The user interface would allow configuration of the storage parameters, ensuring that the vectors can be efficiently retrieved and utilized in the agent.

Chunking parameters enable users to define how large datasets should be divided into smaller, manageable chunks for processing. The UI can include options for specifying chunk sizes and strategies for chunking, ensuring smooth and efficient data processing.

A data sources parameter allows users to specify and configure the sources of the data being used in the agent. Options could include file uploads, database connections, API endpoints, or streaming data sources. The user interface can provide fields and options for entering the necessary connection details and credentials, making it easy to integrate diverse data sources into the agent. An API Keys Object can allow users to securely input and manage API keys required for accessing external services and resources.

A memory object in the user interface can enable users to configure memory management aspects of the AI agent. This can involve setting up cache mechanisms, defining memory limits, and selecting memory storage options. The interface can offer sliders, input fields, and drop-down menus to adjust memory settings and optimize the performance of the agent, ensuring efficient handling of data and intermediate results without exceeding available system resources.

Different chunking techniques have been selected. Recursive chunking and semantic chunking are two distinct approaches to dividing data into smaller, manageable pieces for processing in AI and machine learning agents. Recursive chunking focuses on the structural aspects of data, repeatedly breaking it down into smaller chunks until each piece is of a manageable size. This method does not consider the content or meaning of the data, making it suitable for scenarios where data size and structure are the primary concerns. For instance, a large document might be recursively divided into sections, paragraphs, and sentences to ensure it fits into memory constraints and can be processed in parallel.

In contrast, semantic chunking involves dividing data based on its meaning or semantic content. This method ensures that each chunk is a coherent unit of information that makes sense on its own, which is important in natural language processing tasks. Semantic chunking maintains the integrity of the context within each chunk, making it suitable for applications like text summarization, question answering, and document clustering. For example, a document might be divided into sections based on topics or themes, with further divisions based on subtopics or logical units of meaning.

Recursive chunking can be used in preprocessing stages where the primary goal is to handle large volumes of data efficiently. It ensures that the data is split into uniform, smaller parts that can be processed independently. This method is beneficial when the focus is on data size and structure rather than the preservation of meaning, making it ideal for scenarios where computational efficiency is paramount. On the other hand, semantic chunking is effective for tasks that require comprehension and preservation of the meaning within each chunk.

Agent management rules can enforce personal data privacy. In one example, endpoint device filtering can effectuate PII redaction and filter sensitive content so it never leaves the user's computing device 140. Agent management rules can trigger the blurring of text in photos containing SSN's, credit card numbers, bank account numbers, prescription numbers, names, addresses, and more. Similarly, an agent can blur sensitive information recognized in video. Functions can be added to blur faces. A setting can be selected for whether the blur applies to all people, specific people, kids only, or more specific requirements.

To implement split agents, the UI could provide options to define branching logic, enabling users to specify conditions under which the agent splits into different paths. This can be useful for handling different types of data or processing requirements within the same overarching agent. Furthermore, the UI can incorporate functionality to assign specific agent segments to be executed on endpoint devices. This can be achieved by allowing users to tag certain blocks or sections of the agent with an "endpoint execution" label. These labeled sections would include preprocessing steps, lightweight model inference, or any operations that benefit from being closer to the data source to reduce latency or bandwidth usage. The UI could offer settings for each block, where users can specify the target environment for execution—whether it be a centralized server, cloud infrastructure, or an endpoint device such as a mobile phone or IoT device. To enhance usability, the agent builder UI might include visualization tools that clearly delineate which parts of the agent are executed locally versus on the endpoint. For example, it could use different colors or icons to represent server-side and endpoint-side processing.

As explained before, tools can be automatically ingested for use in AI agents (e.g., with an AI model). Some example tool functions are described below. Tools can be specific to an application or industry. However, some tools, such as invoicing tools, can more broadly apply across industries.

General-purpose tools for billing and invoicing enable AI models or agents to assist with financial document management, including the creation, updating, deletion, and retrieval of invoices and associated line items, payments, discounts, taxes, and notes. Such tools may also support invoice submission, approval workflows, cloning, voiding, crediting, applying late fees, and managing recurring invoices. Template application, custom field definition, merging, splitting, and exporting of invoices may also be supported, enabling flexible and automated invoicing functionality.

Tools for time and expense tracking allow agents to record and manage time entries, expenses, timesheets, and related categories. These tools may support approval and rejection workflows, tagging, receipt management, and the generation of reports. Configuration options may include user assignments, rate setting, template usage, data import/export, and the creation of custom fields, providing comprehensive control over personnel and operational cost tracking.

Calendar and scheduling tools enable the management of events, meetings, and tasks, including creating, updating, deleting, and sharing items. These tools may facilitate attendee invitations and responses, agenda and note management, task tracking, reminders, availability checking, and scheduling rule enforcement. They may also integrate with external calendars and support booking and conflict resolution features, allowing for dynamic and automated schedule coordination.

Reporting and analytics tools provide agents with capabilities to generate and manage reports, dashboards, and visualizations. These may include adding filters, groupings, tables, charts, and executing custom queries. Reports and dashboards may be scheduled, exported, shared, or integrated with data sources. The tools may also support data transformation, profiling, enrichment, anomaly detection, outcome prediction, and action recommendation, thereby enabling intelligent analytics workflows.

Notification and alert tools permit the creation and management of rules, templates, and delivery logic for both system-generated and user-defined notifications or alerts. These may include priority setting, suppression of duplicates, snoozing, escalation, topic subscription, sound control, and correlation of related items. Such tools allow an AI agent to monitor, triage, and communicate system events in a contextual and actionable manner.

Communication and collaboration tools support various messaging modalities including email, SMS, instant messaging, and chat. They may enable campaign creation, group messaging, content moderation, forum and blog management, and document collaboration. Additional capabilities may include file sharing, bookmarks, wikis, annotations, and real-time co-authoring, facilitating agent participation in dynamic team environments and shared workspaces.

Tools for authentication and authorization manage identity verification, including password-based login, two-factor authentication, biometric methods, and token management. Agents may use these tools to retrieve and enforce access permissions, assign roles, and validate identity through knowledge-based authentication or document review, ensuring secure and role-appropriate system access.

External service integration tools enable interoperability with third-party platforms by facilitating API-based authentication, data synchronization, file exchange, and webhook registration. These tools allow AI models and agents to interact with external applications, retrieve or update data, and trigger real-time events in connected systems.

Cybersecurity tools provide agents with mechanisms for identifying and responding to vulnerabilities, performing risk assessments, managing controls, and integrating with security information and event management (SIEM) systems. These tools also allow agents to generate compliance reports, detect incidents, and track the resolution of cybersecurity events, enhancing the security posture of any deployed solution.

Business intelligence tools allow for the aggregation, transformation, and visualization of data from various sources. Agents may use these tools to create dashboards, perform data mining, apply machine learning models, and generate alerts and reports. Integration with data warehouses and BI platforms supports enterprise-level analytics and strategic decision-making.

In the context of customer and loyalty management, tools may be used to manage customer profiles, preferences, visits, and rewards. Agents may segment and target customers, collect feedback, administer loyalty programs, and produce satisfaction reports, enabling personalized and data-driven customer engagement.

Tools for marketing and advertising allow for the planning, execution, and analysis of campaigns and promotions. These tools support asset management, audience targeting, channel configuration, and performance tracking. Integration with automation platforms and the ability to manage promotional codes provide agents with capabilities to execute and refine marketing strategies.

Website and content management tools enable agents to manage digital content, including pages, blog posts, media, and metadata. These tools may support SEO optimization, file management, navigation structure control, analytics integration, and content publishing workflows across internal or public-facing web properties.

Human resources and payroll tools provide features for managing employee records, job postings, compensation, benefits, time tracking, and performance data. These tools may also handle onboarding and offboarding processes, payroll execution, tax documentation, and compliance reporting, supporting workforce management functions.

Regulatory and compliance management tools allow agents to track regulations, manage filing obligations, monitor deadlines, and maintain audit trails. These tools may provide alerts for policy changes, assist with report generation, and integrate with governance and risk frameworks, ensuring adherence to industry and legal standards.

Equipment and maintenance management tools enable tracking of equipment inventory, maintenance schedules, repairs, spare parts, and operational metrics such as downtime and utilization. These tools may also integrate with asset management systems and generate maintenance logs and analytics.

Inventory and supply chain tools manage item catalogs, quantities, locations, costs, and reorder points. Agents may handle inventory transactions, transfers, counts, and reconciliations. These tools may also support integration with supply chain systems, cost tracking, and real-time inventory analytics.

Tools for purchasing and vendor management allow for the handling of purchase orders, invoices, vendor catalogs, and contracts. These tools may track performance, manage compliance, analyze spending, and support integration with procurement systems.

Financial and accounting tools facilitate management of accounts, transactions, budgets, forecasts, tax records, and journals. Agents may interact with charts of accounts, cost centers, payable and receivable systems, and financial reporting modules, including ERP integrations.

Appointment and scheduling tools may manage reservations, time slots, confirmations, reminders, staff availability, and resource allocation. These tools provide agents with capabilities to coordinate service appointments and generate utilization metrics, with optional calendar integration.

To onboard a user and tenant, the AI platform can ask profile creation questions. For example, the user can be asked what their use case is, what problem AI can help solve, what industry they work in, how sensitive their data is, and how accurate their output must be.

The collected information can trigger creation of a base or demo AI agent. The base AI agent can be created for based on a user template identified based on the user's answers to the profile creation questions. The base AI agent can include an appropriate model based on the user template. For example, for a high sensitivity template, the AI model can be open source (e.g., llama3, mistral). The AI model can be hosted on AI platform or on the customer's infrastructure for a "high sensitivity" user template. Alternatively, the model can be a most recently trained AI model (e.g., mistral, new versions of any model) for a "high accuracy" user template.

As another example, the model can be selected as most capable (e.g., GPT4o, Claude Opus) for a "most capable" user template.

The user's account can also be initiated with sample prompts based on the selected user template. For example, a legal "use case" can include a prompt package that instructs the AI model to behave as an expert in law. But in other verticals, the sample prompts are different. In one example, a system AI agent of the AI platform asks an LLM to create at least one of the prompts based on the user's unique responses.

One embodiment of the platform enables the configuration of AI agents using template-driven onboarding. A profile creation interface collects user-specific data, including their industry, use case, data sensitivity, and accuracy requirements. This profile is used to select a matching configuration template from a library of domain-specific options. The selected template guides automatic generation of an initial agent, including appropriate AI models, toolsets, and sample prompts. The system may further tailor tool and model selection based on data sensitivity—favoring open-source or private models for high-sensitivity applications—and may employ a language model to generate or refine prompts according to user needs. These agents may be customized further but are pre-populated to accelerate configuration and reduce errors.

The system may adjust agent configurations according to the sensitivity of the user's data. For instance, templates marked as high sensitivity may limit tool recommendations to open-source or locally executable tools and prefer models with enhanced privacy controls or on-premise execution capability. Template selection and resulting toolsets may vary by industry vertical, such as including legal research and contract review tools for law firms, diagnostic image tools for healthcare, or financial modeling packages for investment analysis. Based on responses in the onboarding profile, a language model may generate or refine initial prompt templates that are contextually appropriate for the user's use case, vertical, and objectives.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. The stages of the flowcharts can operate in different orders.

What is claimed is:

1. A method for automatic tool ingestion for artificial intelligence ("AI") agents, comprising:
 discovering a first tool specification corresponding to a first tool, wherein the first tool specification comprises a tool action and a toot description, and wherein the first tool comprise service that an AI agent uses to perform specific actions;
 ingesting the first tool specification to create a first tool object in an AI platform, wherein the first tool object comprises the tool action and a tool endpoint where the tool action can be invoked;
 determining a plurality of tool labels that are associated with the first tool specification;
 applying the plurality of tool labels to the first tool object;
 causing a user interface ("UI") of the AI platform to display the first tool object, including at least one of the plurality of tool labels;
 generating, by the AI platform, a manifest file for the AI agent, comprising the first tool object, wherein the manifest file further comprises the tool action and the tool endpoint; and
 deploying the AI agent for execution, wherein the AI agent is executed according to the manifest file, comprising:
  determining that the AI agent is authorized to perform the tool action; and
  causing a tool credential to be transmitted to the tool endpoint, wherein the tool credential authenticates the AI agent to initiate the tool action.

2. The method of claim 1, wherein determining the plurality of tool labels comprises determining a semantic meaning of the first tool specification.

3. The method of claim 1, wherein determining the plurality of tool labels is based on tool labels of other tool objects with semantically similar actions to the tool action of the first tool object.

4. The method of claim 1, wherein the plurality of tool labels comprises a name for the first tool object and a description of the tool action.

5. The method of claim 1, wherein the plurality of tool labels comprises a system prompt that is used during execution of the AI agent to determine when to perform the tool action.

6. The method of claim 1, wherein the tool object comprises the tool credential.

7. The method of claim 1, wherein the ingestion is performed by an ingestion agent, wherein the ingestion agent receives the tool specification and determines a semantic meaning of an application programming interface ("API") description of the tool specification.

8. The method of claim 1, wherein the ingestion comprises ingesting code for local execution in performing the tool action.

9. The method of claim 1, wherein a first tool label of the plurality of the tool labels indicates an industry vertical.

10. The method of claim 1, wherein discovering the first tool specification comprises identifying the endpoint.

11. The method of claim 1, wherein discovering the first tool specification comprises scraping tool documentation from a website.

12. The method of claim 1, wherein discovering the first tool specification comprises making an application programming interface ("API") call to request the first tool specification.

13. The method of claim 1, wherein discovering the first tool specification comprises subscribing to a service that provides tool specifications.

14. The method of claim 1, wherein the tool action is one of multiple application programming interface ("API") calls included in an API definition of the first tool object.

15. The method of claim 1, wherein a system prompt is created as part of ingestion, and wherein, during execution, the AI agent determines whether to use the action based on the system prompt.

16. The method of claim 1, wherein the tool action is one of multiple tool actions viewable in the UI for the first tool object, and wherein the tool action is described by the at least one of the plurality of tool labels.

17. The method of claim 1, wherein the manifest file is automatically generated based on a UI selection to add the first tool object to the AI agent.

18. The method of claim 1, further comprising:
 receiving user information from a first platform user;
 automatically selecting a first template from a plurality of templates based on the user information; and
 generating the AI agent based on the first template, including automatically adding the first tool object to the AI agent,
 wherein the first tool object is part of an industry-specific toolset that applies to the first template.

19. A non-transitory, computer-readable medium including instructions are executed by a processor and cause the processor to perform stages for automatic tool ingestion for artificial intelligence ("AI") agents, the stages comprising:
 discovering a first tool specification corresponding to a first tool, wherein the first tool specification comprises a tool action and a tool description, and wherein the first tool comprise service that an AI agent uses to perform specific actions;
 ingesting the first tool specification to create a first tool object in an AI platform, wherein the first tool object comprises the tool action and a tool endpoint where the tool action can be invoked;
 determining a plurality of tool labels that are associated with the first tool specification;
 applying the plurality of tool labels to the first tool object;
 causing a user interface ("UI") of the AI platform to display the first tool object, including at least one of the plurality of tool labels;
 generating, by the AI platform, a manifest file for the AI agent, comprising the first tool object, wherein the manifest file further comprises the tool action and the tool endpoint; and
 deploying the AI agent for execution, wherein the AI agent is executed according to the manifest file, comprising:
  determining that the AI agent is authorized to perform the tool action; and
  causing a tool credential to be transmitted to the tool endpoint, wherein the tool credential authenticates the AI agent to initiate the tool action.

20. A system for automatic tool ingestion for artificial intelligence ("AI") agents, comprising:

a memory storage including a non-transitory, computer-readable medium comprising instructions; and at least one hardware-based processor that executes the instructions to carry out stages comprising:

discovering a first tool specification corresponding to a first tool, wherein the first tool specification comprises a tool action and a tool description, and wherein the first tool comprise service that an AI agent uses to perform specific actions;

ingesting the first tool specification to create a first tool object in an AI platform, wherein the first tool object comprises the tool action and a tool endpoint where the tool action can be invoked;

determining a plurality of tool labels that are associated with the first tool specification;

applying the plurality of tool labels to the first tool object;

causing a user interface ("UI") of the AI platform to display the first tool object, including at least one of the plurality of tool labels;

generating, by the AI platform, a manifest file for the AI agent, comprising the first tool object, wherein the manifest file further comprises the tool action and the tool endpoint; and deploying the AI agent for execution, wherein the AI agent is executed according to the manifest file, comprising:

determining that the AI agent is authorized to perform the tool action; and causing a tool credential to be transmitted to the tool endpoint, wherein the tool credential authenticates the AI agent to initiate the tool action.

* * * * *